(12) United States Patent
Sherman et al.

(10) Patent No.: US 11,674,902 B2
(45) Date of Patent: Jun. 13, 2023

(54) SYSTEM AND METHOD FOR USE IN FRET MICROSCOPY

(71) Applicant: Yissum Research Development Company of the Hebrew University of Jerusalem Ltd., Jerusalem (IL)

(72) Inventors: Eilon Sherman, Mevaseret-Zion (IL); Shai Tsipshtein, Jerusalem (IL)

(73) Assignee: YISSUM RESEARCH DEVELOPMENT COMPANY OF THE HEBREW UNIVERSITY OF JERUSALEM LTD., Jerusalem (IL)

(*) Notice: Subject to any disclaimer, the term of this patent is extended or adjusted under 35 U.S.C. 154(b) by 4 days.

(21) Appl. No.: 17/149,586

(22) Filed: Jan. 14, 2021

(65) Prior Publication Data

US 2021/0140889 A1 May 13, 2021

Related U.S. Application Data

(63) Continuation-in-part of application No. PCT/IL2019/050794, filed on Jul. 15, 2019, and a
(Continued)

(51) Int. Cl.
*G01N 21/64* (2006.01)

(52) U.S. Cl.
CPC ..... *G01N 21/6428* (2013.01); *G01N 21/6458* (2013.01); *G01N 21/6486* (2013.01); *G01N 2021/6441* (2013.01)

(58) Field of Classification Search
CPC .............. G01N 21/6428; G01N 2021/6441
See application file for complete search history.

(56) References Cited

U.S. PATENT DOCUMENTS 7,301,158 B1 * 11/2007 Hoang ............... G01N 21/6486
250/573
7,456,954 B2 * 11/2008 Weiss ................. G01N 21/6445
356/417

(Continued)

OTHER PUBLICATIONS

Richards et al. FRET-enabled optical modulation for high sensitivity fluorescence imaging, Journal of the American Chemical Society vol. 132, No. 18, pp. 6318-6323 (Year: 2010).*

(Continued)

*Primary Examiner* — David P Porta
*Assistant Examiner* — Jeremy S Valentiner
(74) *Attorney, Agent, or Firm* — Vorys, Sater, Seymour and Pease LLP; Anthony P. Venturino; Maryellen Feehery Hank

(57) ABSTRACT

A system and method are presented, for monitoring and/or imaging of a sample. The system comprises: a light unit configured for illuminating the sample in at least two different wavelength ranges; a collection unit configured for collecting a light emitted from the sample in at least a third wavelength range and directing said emitted light towards at least one detector; and an activation unit configured for providing activation signal to selectively activate at least a portion of fluorescent substance in the sample; and a processing circuitry configured for operating the light unit to determine a selected temporal illumination profile of said at least two different wavelength ranges and for operating the activation unit for controllable activation.

13 Claims, 21 Drawing Sheets

Related U.S. Application Data continuation-in-part of application No. PCT/IL2020/050075, filed on Jan. 16, 2020.

(60) Provisional application No. 62/698,395, filed on Jul. 16, 2018.

(56) References Cited

U.S. PATENT DOCUMENTS

| | | |
|---|---|---|
| 2005/0164160 A1 | 7/2005 | Gunter et al. |
| 2012/0140317 A1* | 6/2012 | Kleppe .............. G02B 21/0076 359/385 |
| 2013/0345391 A1 | 12/2013 | Knutson et al. |
| 2014/0340482 A1* | 11/2014 | Kanarowski ........... G01N 21/64 348/46 |
| 2017/0370847 A1 | 12/2017 | Ghadiali |

OTHER PUBLICATIONS

Helm Proposal of a new method for measuring Forster Resonance Energy Transfer (FRET) rapidly, quantitatively and non-destructively, International Journal of Molecular Sciences vol. 13, No. 10, pp. 12367-12382 (Year: 2012).*

Bunt et al: "Visualization of molecular activities inside living cells with fluorescent labels", International Review of Cytology, Academic Press, US, vol. 237, Jan. 1, 2004 (Jan. 1, 2004), pp. 205-277, XP009125229.

Helm. Proposal of a New Method for Measuring Forster Resonance Energy Transfer (FRET) Rapidly, Quantitatively and Non-Destructively. International journal of molecular sciences, 2012, 13.10: 12367-12382.

Kramer et al: "Single-Pair Forster Resonance Energy Transfer With Multiparametric Excitation and Detection", IEEE Journal of Selected Topics in Quantum Electronics, IEEE Service Center, Piscataway, NJ, US, vol. 13, No. 4, Jul. 1, 2007 (Jul. 1, 2007), pp. 984-989, XP011192031.

Reingewertz et al: "Mapping tne Vit-A3G interaction using peptide arrays: A basis for anti-HIV lead peptides", Bioorganic & Medicinal Chemistry : A Tetrahedron Publication for the Rapid Dissemination of Full Original Research Papers and Critical Reviews on Biomolecular Chemistry, Medicinal Chemistry and Related Disciplines, Elsevier, NL, vol. 21, No. 12, Mar. 14, 2013 (Mar. 14, 2013), pp. 3523-3532, XP028553073.

Richards et al. FRET-enabled optical modulation for high sensitivity fluorescence imaging. Journal of the American Chemical Society, 2010, 132.18: 6318-6323. Apr. 16, 2010 (Apr. 16, 2010).

Ruttinger et al: "Accurate single-pair Forster resonant energy transfer through combination of pulsed interleaved excitation, time correlated single-photon counting, and fluorescence correlation spectroscopy", Journal of Biomedical Optics, vol. 11, No. 2, Jan. 1, 2006 (Jan. 1, 2006), p. 024012, XP055345852.

Xu et al: "Frustrated FRET for high-contrast high-resolution two-photon imaging", Optics Express, vol. 21, No. 12, Jun. 5, 2013 (Jun. 5, 2013), p. 14097, XP055631059.

* cited by examiner

| 852 | Controlling a portion of activated fluorophores in a sample |

| 854 | Illuminating the sample with temporal profile of a first illumination wavelength range |

| 856 | Illuminating the sample with temporal profile of a second illumination wavelength range |

| 858 | Collecting and detecting emitted light from the sample |

| 860 | Generating image data over time based on the detected emitted light |

Fig. 8A

| 852 | Controlling a portion of photoactivated fluorophores in a sample |

| 854 | Illuminating the sample with temporal profile of a first illumination wavelength range |

| 856 | Illuminating the sample with temporal profile of a second illumination wavelength range |

| 858 | Collecting and detecting emitted light from the sample |

| 860 | Generating image data over time based on the detected emitted light |

| 862 | Processing the image data and identifying FRET events therein |

Fig. 8B

| 850 | Providing a sample and mixing it with a population of donor and acceptor fluorophores |

| 852 | Controlling a portion of photoactivated fluorophores in the sample |

| 854 | Illuminating the sample with temporal profile of a first illumination wavelength range |

| 856 | Illuminating the sample with temporal profile of a second illumination wavelength range |

| 858 | Collecting and detecting emitted light from the sample |

| 860 | Generating image data over time based on the detected emitted light |

| 862 | Processing the image data and identifying FRET events therein |

| 864 | Outputting data indicative of the detected FRET events |

Fig. 8C

SYSTEM AND METHOD FOR USE IN FRET MICROSCOPY

TECHNOLOGICAL FIELD

The present invention relates to techniques for detection of molecular structures and/or interactions, the invention specifically relates to detection techniques using fluorescence spectroscopy and microscopy.

BACKGROUND

Majority of the modern (bio)molecular techniques used in pathogen detection are based upon sequence-based recognition of DNA, structural recognition of pathogens or pathogen biomarkers. However, the selection of the pathogen biomarkers introduces a serious challenge in the development of the sensors for detection of the biological pathogens. This is because most of the pathogen biomarkers have low selectivity and can distinguish between general classes of microorganisms but are not able to identify the specific species or strain of organism. For example, calcium dipicolinate is a unique component of endospores. Dipicolinic acid can therefore be used to indicate the presence of endospores, but it cannot be able to distinguish between the very dangerous *Bacillus* anthraces spores and other nontoxic *Bacillus* spores. The presence of the DNA as an additional indicator will be able to determine that the unknown material is biological in nature but will not be able to identify its source (unless extensive sequence-based analysis is used). Also, cell metabolites are generally common to many different cell types and therefore extremely difficult to use for discrimination between specific microorganisms. In view of the above, there is a long-felt need for new methods and devices to detect and identify biological pathogens.

GENERAL DESCRIPTION

The present technique provides a system and method for inspecting a sample, e.g. by monitoring and/or imaging of at least a region of the sample. Generally, the present technique utilizes detection of fluorescence resonance energy transfer (FRET) events occurring within the sample. Additionally, the present technique may be used for analysis of parameters of such FRET events, such as interaction distances, detection of existence and/or amount of selected molecular structures such as DNA/RNA sequence, pathogens etc.

More specifically, to determine existence and/or location of selected molecular structures/sequences within a sample, selected molecular probes including donor fluorophores and acceptor fluorophores are introduced into the sample. The molecular probes are selected as having affinity to attach/adsorb onto corresponding molecular binding sites, and the respective fluorophores provide optical fluorescence in response to exciting illumination. To provide accurate detection of selected molecular structures, the probes associated with the donor and acceptor fluorophores are selected to attach to respective parts of the target structure. Generally the term binding site as used herein, and binding of molecular probe into selection structure of a target molecule may include specific binding site, such as specific DNA, RNA or protein sequences, as well as non-specific binding where the probe is selected to adsorb onto selected molecules while not specifically to a selected sequence therein. When attached to the target structure, the donor and acceptor fluorophores are at close proximity between them, enabling FRET process between the fluorophores, while when not attached to the selected structures, the fluorophores are statistically arranged and generally relatively farther from one another (typically at distances of over 10 nm, 20 nm or over 50 nm). Generally, such close proximity between the donor and acceptor fluorophores can be detected by detecting respective FRET events, however these events may be masked by the high fluorescence emission of the donor and acceptor fluorophores that do not take part in FRET events. To this end the present technique utilizes detection of single frustrated FRET events enabling to properly detect the selected molecular structure over the high fluorescence background.

The system of the present disclosure includes a light unit configured for illuminating the sample with at least two different wavelength ranges. The first wavelength range is selected to provide optical excitation of a first, donor fluorophore used in the sample and the second wavelength range is selected to provide excitation of a second, acceptor fluorophore used in the sample. As indicated above, the fluorophores are provided to the sample in combination with selected molecular probes and are selected such to allow FRET interaction between the donor and acceptor fluorophores at certain range of distances between them.

Generally, the term "fluorophore" refers to any substance or molecule that emits light of emission wavelength in response to illumination with light of a corresponding first excitation wavelength. Various Fluorophores are known and may be used in the framework of the present technique, and preferably fluorophores capable to be switched on or off by external optical and/or chemical signal including for example: quantum dots (e.g. semiconductor QD's), Fluorescein, Rhodamine, lipophilic fluorescent stains, Fluorescein Isothiocyanate (FITC), fluorescent proteins, Photoactivatable or photoswitchable fluorescent proteins, quantum rods, quenchers, caged fluorophores, bioluminescent emitters, nanodiamonds, chemiluminescent emitters or phosphorescent emitters.

Fluorescence resonance energy transfer (FRET) or Förster resonance energy transfer, relates to a mechanism in which energy absorbed by one (donor) fluorophore is transferred by non-radiation mechanism, to another (acceptor) fluorophore resulting in optical emission from the acceptor fluorophore. The efficiency of this energy transfer is inversely proportional to the sixth power of the distance between donor and acceptor, making FRET extremely sensitive to small changes in distance. In this connection it should be noted that the terms "donor fluorophore" and "acceptor fluorophore" may be referred to throughout the application merely as "donor" or "acceptor". Generally, the sample is prepared by introducing selected probes carrying or associated with suitable fluorophores including donor and acceptor fluorophores. The selected probes are used for detecting one or more molecular structure/sequences in the sample.

As indicated above, the present technique and corresponding system are configured to detect the existence of selected molecular structures in the sample using detection of FRET events. Such structures may be DNA sequences, RNA sequences, various epitopes recognized by antibodies, etc. To properly identify FRET events over emission associated with direct excitation of the fluorophores, the present technique operates for collection of light emitted from the donor fluorophores, namely a fluorescence illumination in response to illumination of the first wavelength range. The collection may utilize optical arrangement for imaging a selected plane in the sample and generating image data corresponding with light emission from fluorophores in the sample. Additionally or alternatively, collection of light emitted by fluorophores in the sample may include collection of light from one region of the sample without actual imaging, and providing data on variation in intensity of emission from the relevant region. Thus, the present technique utilizes illumination of the sample with at least a first, donor excitation wavelength range, and a second acceptor excitation wavelength range. The second, acceptor exciting wavelength range is temporally modulated (e.g. intensity modulated), thereby causing shifts between FRET events and frustrated FRET, i.e. a situation in which the acceptor fluorophore is already excited and therefore cannot take part in FRET event. Light emitted from the sample is collected and filtered to allow detection of emitted light at wavelength range associated with donor emission. When probes associated with the donor fluorophores are located at sufficiently close proximity with probes associated with acceptor fluorophores, the emission of the donor fluorophore is modulated between FRET and frustrated FRET. Such modulation can be detected by collection of emission light at the wavelength range associated with donor emission, and identifying modulation having similar profile to the modulation of illumination at the second, acceptor exciting wavelength range.

Further, to avoid significant background noise of emission of the whole population of the donor fluorophores, the donor fluorophores used in the sample are selected from a group of fluorophores having switchable photoactivity. More specifically, the fluorescence activity of at least the donor fluorophores is controllable or varies in a predictable way such that the number of active donor fluorophores at any time of the monitoring/imaging is controlled to be a very small quantity. For example, the technique may utilize photoactivated donor fluorophores, such that the donors in the sample are inactive and become active in response to illumination of a certain (third, activation) illumination wavelength range. Alternatively, the technique may utilize chemically activated donor fluorophores, i.e. donor fluorophores that are activated in response to interaction with selected chemical reactants introduced into the sample.

To this end, the present technique utilizes single molecule localisation microscopy (SMLM) techniques, by activating very small amount of donor fluorophores in the sample, combined with detection of FRET events (generally modulated between frustrated and non-frustrated modes) in the sample to identify selected molecular structures (e.g. DNA sequence, RNA sequences, antigens or various epitopes as detected by antibodies).

A first aspect of the present disclosure provides a system for monitoring and/or imaging a sample. The system includes a light unit, which may include one or more light sources, configured for illuminating the sample in at least two different wavelength ranges. The system includes an activation unit configured for controlling the portion of activated fluorescent substances in the sample, in particular donor fluorophores suitable for FRET interaction with a suitable acceptor fluorophores.

The system includes a collection unit configured for collecting a light emitted from the sample in at least a third wavelength range and directing said emitted light towards at least one detector. A processing circuitry of the system is configured for operating the light unit to determine a selected temporal illumination profile of said at least two different wavelength ranges and for operating the activation unit for obtaining controlled population of selected activated fluorophores in the sample. It should be understood that the processing circuitry represents one or more distributed processors that operate the system and perform its functionality.

The collection unit generally comprises a spectral filter selected for transmitting light of a third wavelength range, typically associated with emission of the donor fluorophores in the sample. The collection unit may further comprise an optical arrangement (e.g. one or more lenses, apertures, prisms) configured and positioned for imaging a selected region of the sample onto a selected detection plane, where a detector unit may be positioned. This configuration enables detection of location of the fluorophores associated with emission of the collected light. The collection unit may alternatively comprise optical arrangement configured for transmitting collected light while not providing imaging of the sample, indicating general variation in intensity of emitted light without indicating location of each emitter.

In some embodiments of the system, the at least two wavelength ranges comprise a first donor fluorophore excitation wavelength range, for exciting donor fluorophores, and a second, acceptor fluorophore excitation wavelength range, for exciting acceptor fluorophores.

In some embodiments of the system, the light unit includes at least a donor illumination light source for providing the donor fluorophore excitation light wavelength range and an acceptor illumination light source for providing the acceptor fluorophore excitation light wavelength range.

In some embodiments of the system, the activation unit includes a photoactivation light source configured to illuminate a fourth, photoactivating illumination wavelength range for photoswitching a selected population of fluorophores in the sample, e.g. donor fluorophores, to active mode in which they can exhibit fluorescence.

In some embodiments of the system, the processing circuitry is configured for operating the activation light source to provide a selected temporal photoactivation illumination intensity profile of the fourth wavelength range. The intensity of the illumination is selected such that a desired portion of fluorophores are switched from inactive mode to active mode.

In some embodiments of the system, the temporal photoactivation illumination of the fourth wavelength range includes at least one of: a pulse temporal pattern and continuous illumination pattern.

In some embodiments of the system, the activation unit is configured for controllably releasing activating reactant for obtaining the desired portion of fluorophores are switched from inactive mode to active mode.

In some embodiments of the system, the light unit includes an optical arrangement adapted for directing the at least three different wavelength ranges towards a common selected region of the sample.

In some embodiments of the system, the third wavelength range is different from the at least two different wavelength ranges. In some embodiments, the fourth different wavelength range is different from the first, second and third wavelength ranges.

In some embodiments of the system, the third wavelength range comprises one or more donor fluorescence emission wavelengths.

In some embodiments of the system, the processing circuitry is configured for controlling the light unit to provide the selected temporal illumination profile of the first and the second wavelength ranges. In some embodiments, the temporal illumination profile is selected from any one of: a pulse temporal pattern, namely any known illumination pattern over time, and continuous illumination. For example, the illumination of the first wavelength range may be substantially continuous and the illumination intensity profile of the second wavelength range may be of a any selected time-varying pattern.

In some embodiments of the system, the selected temporal photoactivation illumination intensity profile is configured for photoactivating, i.e. photoswitching between non-active and active mode of donor fluorophore, a portion of respective donor fluorophore population for activating a relatively low and desired number of fluorophores to avoid significant background noise.

In some embodiments, the activation unit is configured for activating small number of fluorophores within a region of diffraction limited spot in the sample for a given activation signal. For example, the activation unit may be configured for providing activation signal having activation probability of $1:10^{10}$-$1:10^{23}$. For example, the activation unit is configured for activating up to 1, 2, 3, 4, 5, 6, 7, 8, 9, or 10 fluorophores in each activation signal. The diffraction limited spot is determined by the characteristics of the optical elements used in the collection unit. In some embodiments, the portion of activated fluorophores is sufficiently low such that up to 10 fluorophores at any single diffraction limited spot.

In some embodiments of the system, the selected intensity of the fourth illumination wavelength range is temporally modified to maintain a desired number of photoactivated (or photoswitched) fluorophores in the detected area of the sample.

In some embodiments of the system, the selected intensity of the fourth illumination wavelength range is increasing gradually over time.

In some embodiments of the system, the processing circuitry is configured for controlling the light unit to provide the selected temporal illumination profile of the first and second wavelength ranges. In some embodiments, the processing circuitry is configured for controlling the light unit to provide a selected temporal intensity modulation pattern of the second, acceptor excitation wavelength range. The second, acceptor excitation wavelength range temporal intensity modulation pattern is selected for saturating the acceptor fluorophores at a known and desired time.

In some embodiments, the system includes a detector configured for detecting light collected by the collection unit and generate at least one stream of data pieces collected at a selected and sufficient sampling rate. The stream of data pieces includes intensity profile of the collected light over time. Generally, the stream of data pieces may be in the form of sequence of intensity measurements, sequence of image frames of the sample, video sequence of emission from the sample etc.

In some embodiments of the system, the detector includes a pixel array positioned at an image plane with respect to at least a region of the sample.

In some embodiments of the system, the processing circuitry is configured for receiving and processing the at least one stream of data pieces (interchangeably referred to as "detection data" or "detection data pieces" throughout the application) to identify modulated intensity profile of the collected light within one or more time-windows to provide output data thereof.

In some embodiments of the system, the processing circuitry is configured to select said one or more time-windows by identifying variation of intensity profile over time in said at least one stream of data pieces. The variation of the intensity indicates potential FRET events that result in response to the illumination modulation of the second illumination wavelength. The processing circuitry is configured to identify a match between the variation of the detected intensity and the modulated illumination pattern of the second illumination wavelength range, such matching is correlated with a FRET event.

In some embodiments of the system, the processing circuitry is configured to determine in the at least one stream of data pieces FRET interaction distances, namely inter fluorophore distances down to sub-nanometers scale. Therefore, the distances between the interacted fluorophores can be determined, which may be indicative of the relative binding sites of the fluorophores to the substance of interest, e.g. a DNA or RNA sequence of a pathogen or a protein, or an epitope thereof.

In some embodiments of the system, the one or more time-windows is associated with a selected duration following illumination of a pulse of a fourth, photoactivation illumination wavelength range.

In some embodiments of the system, the processing circuitry is configured to apply frequency-time domain manipulation on the data pieces in said one or more time windows. The frequency-time domain manipulation may be selected, but not limited to, any one of: temporal Fourier Transform, matched filters, Wigner filters and machine learning. The manipulation serves to enhance the signal to noise of the time-modulated frustrated FRET signal (which is indicative of FRET events).

In some embodiments, the system includes a sample mount configured for placement of the sample. The sample mount may be either a physical element that is configured to be attached to a sample chamber including the sample or a location with respect to the system that is suitable for placement of a sample to be monitored and/or imaged.

In some embodiments, the system includes a sample chamber containing the sample and mounted on the sample mount.

Another aspect of the present disclosure provides a method for monitoring and/or imaging a sample. The method includes providing a selected portion of activated fluorophores in the sample. In other words, the method includes controlling of the portion of selected activated fluorophores in the sample at any time. The controlling may be either active or passive according to the selected fluorophores. For example, active control may be by illuminating the sample with illumination suitable for photoactivation of the selected fluorophores or reacting the fluorophores with activating reactants. For example, in the case of caged fluorophores, a fluorophore becomes active after (photo or chemical) removal of the caging moiety optically or chemically. In some embodiments, the controlling is performed passively, namely by including a selected number/concentration of fluorophores in the sample that photoswitching to active mode spontaneously. The number/concentration of the fluorophores is selected such that a desired number of fluorophores are active at any time.

The method further includes illuminating at least a region of the sample with a first illumination wavelength range and a temporally modulated second wavelength range. The method includes collecting and detecting light of a third wavelength range emitted from the sample to provide data pieces associated with intensity profile of emission from the sample.

In some embodiments, the method includes processing the data pieces and identifying modulated intensity profile of the collected light within one or more time windows in one or more regions of the sample.

In some embodiments of the method, the one or more time windows are associated with a duration following a respective pulse illumination of a fourth wavelength range that is suitable for photoactivation of a portion of fluorophores in the sample.

In some embodiments of the method, the one or more time windows are associated with a time variation of intensity profile of the detected third wavelength range. In other words, the time windows of interest are these with a variation of intensity of the detected light that may be indicative of a FRET event.

In some embodiments of the method, said identifying modulated intensity profile of the collected light within one or more time windows includes identifying a modulation of the intensity at a certain modulation pattern corresponding to the temporal modulated illumination of the second wavelength range.

In some embodiments of the method, the processing includes identifying FRET events and/or FRET interaction distances.

In some embodiments, the method includes activating a desired portion of fluorophores in the sample.

In some embodiments of the method, the activating includes illuminating the at least a region of the sample with a temporal photoactivating intensity profile of a fourth illumination wavelength range.

In some embodiments of the method, the photoactivating intensity profile is selected from at least one of: a pulse temporal pattern and continuous illumination pattern.

In some embodiments, the method includes reacting the sample with activating reactants.

In some embodiments of the method, the intensity profile of the pulse pattern of the fourth wavelength range is selected to provide activation of a portion of respective donor fluorophore population.

In some embodiments, the method includes providing output data associated with said identified modulated intensity profile. The output data is indicative of FRET events and/or their parameters.

In some embodiments of the method, the first wavelength range includes a selected donor fluorophore excitation wavelength for exciting donor fluorophores.

In some embodiments of the method, the second wavelength range includes a selected acceptor fluorophore excitation wavelength for exciting acceptor fluorophores.

In some embodiments of the method, the fourth wavelength range includes a selected donor photoactivation wavelength for photoswitching the donor fluorophores to active mode, in which they can perform fluorescence.

In some embodiments, the portion is sufficiently low to activate up to 1, 2, 3, 4, 5, or 10 fluorophores within a region of diffraction limited spot in the sample for a given activation signal, the diffraction limited spot is determined by the characteristics of the optical elements used in the collection unit.

In some embodiments of the method, the third wavelength range is associated with selected donor fluorescence emission wavelength.

In some embodiments, the method includes providing a sample that includes a selected population of donor and acceptor fluorophores. In other words, the method includes providing a sample that includes a desired types of donors and acceptors and their desired number/concentration/ratio.

In some embodiments of the method, the donor and acceptor fluorophores are adapted for association with selected binding sites of substances in the sample. The association with the selected binding sites may be specific or non-specific. It is to be understood that binding sites may be specific binding sites in a molecules, e.g. a DNA/RNA sequence, an epitope, etc., or non-specific binding sites, namely the fluorophores may be suitable for general association with a target substance (e.g. a molecule) that can be at various sites on the substance.

In some embodiments, the method includes providing a sample and mixing it with a desired population of donor and acceptor fluorophores.

In some embodiments, the sample includes a biological matter, e.g. a urine sample, a blood sample, biopsies, body fluids such as saliva/sweat or any sample containing biological matter to be detected. In some embodiments the sample may include organic matter, that may not necessarily be biological.

In some embodiments of the method, the population of donor and acceptor fluorophores includes at least one of quantum dots, Fluorescein, Rhodamine, lipophilic fluorescent stains, Fluorescein Isothiocyanate (FITC), fluorescent proteins, Photoactivatable or photoswitchable fluorescent proteins, quantum rods, quenchers, caged fluorophores, bioluminescent emitters, nanodiamonds, chemiluminescent emitters or phosphorescent emitters.

Yet another aspect of the present disclosure provides a program storage device readable by machine, tangibly embodying a program of instructions executable by the machine to perform a method for monitoring a sample. The method includes: (a) providing a selected portion of activated fluorophores in said sample; (b) operating a light unit for illuminating at least a region of the sample with (i) a first illumination wavelength range and (ii) a temporally modulated second wavelength range; (c) operating a detector unit for collecting light of a third wavelength range and generating data pieces associated with intensity profile of the collected light; (d) processing said data pieces for identifying modulated intensity profile of said collected light within one or more time windows; and (e) generating output data indicative of said modulated intensity profile.

Yet another aspect of the present disclosure provides a computer program product comprising a computer useable medium having computer readable program code embodied therein for monitoring a sample. The computer program product includes: (a) providing a selected portion of activated fluorophores in said sample; (b) operating a light unit for illuminating at least a region of the sample with (i) a first illumination wavelength range and (ii) a temporally modulated second wavelength range; (c) operating a detector unit for collecting light of a third wavelength range and generating data pieces associated to with intensity profile of the collected light; (d) processing said data piece for identifying modulated intensity profile of said collected light within one or more time windows; and (e) generating output data indicative of said modulated intensity profile.

Yet another aspect of the present disclosure provides a control unit connectable to illumination unit and a detector unit. The control unit includes: at least one processing circuitry including (a) operation module configured for operating the light unit for illuminating at least a region of the sample with (i) a first illumination wavelength range and (ii) a temporally modulated second wavelength range, and providing a selected portion of activated fluorophores in said; (b) detection module configured for operating the detector unit for collecting light of a third wavelength range and generating data pieces associated with intensity profile of the collected light; and (c) a processing module configured for receiving and processing said data pieces for identifying modulated intensity profile of said collected light within one or more time windows, and generating output data indicative of said modulated intensity profile.

Yet, another aspect of the present disclosure relates to an optical device suitable for acquiring and measuring efficiency of the Förster resonance energy transfer (FRET) between a donor fluorophore and an acceptor fluorophore in a sample (10) to thereby resolving molecular interactions between said donor fluorophore and said acceptor fluorophore, said optical device comprising:

A. An excitation module comprising:
 a) a first (11) and second (12) excitation source configured to emit a donor fluorophore excitation light (b) and an acceptor fluorophore excitation light (r), respectively, for exciting said donor fluorophore and said acceptor fluorophore in the sample (10);
 b) a first excitation monochromator (14) configured to convert said donor fluorophore excitation light (b) into a donor fluorophore monochromatic excitation light beam (b'), and transmit said donor fluorophore monochromatic excitation light beam (b') to a beam combiner (13);
 c) a second excitation monochromator (15) configured to convert said acceptor fluorophore excitation light (r) into an acceptor fluorophore monochromatic excitation light beam (r'); and transmitting said acceptor fluorophore monochromatic excitation light beam (r') to a modulation unit (16);
 d) the modulation unit (16) characterised in that it is designed to:
  (i) modulate excitation intensity of said acceptor fluorophore monochromatic excitation light beam (r') by tuning excitation intensity of said acceptor fluorophore monochromatic excitation light beam (r') from complete blocking to at least about 30% transmission, preferably at least about 50%, more preferably at least about 70%, thereby optically saturating said acceptor fluorophore to frustrate said FRET, and
  (ii) direct the obtained modulated acceptor fluorophore monochromatic excitation light beam ($r^{\#}$) to said beam combiner (13); and
 e) the beam combiner (13) designed to combine said donor fluorophore monochromatic excitation light beam (b') and said modulated acceptor fluorophore monochromatic excitation light beam ($r^{\#}$) into a single dichromatic excitation light beam (e);
B. A sample chamber containing a sample holder designed to hold said sample (10), to which said dichromatic excitation light beam (e) is directed; and
C. An acquisition module comprising:
 a) an emission monochromator (18) configured to scan and transmit a predefined wave-length range of a donor fluorophore emission (g), or donor and acceptor emission in a sequence;
 b) a detector (19) configured to perform acquisition of the fluorescence emission (g) of said donor fluorophore, to measure intensity of the fluorescence emission (g) and to transfer the obtained fluorescence emission intensity data to a computing unit (20); and
 c) the computing unit (20) characterised in that:
  (i) said computing unit (20) is designed to:
   be synchronised with said detector (19) and with said modulation unit (16),
   analyse the fluorescent emission intensity data transferred from said detector (19),
   optionally display said fluorescence emission intensity data in a readable format, and
   transfer said data to an external memory,
  (ii) said computing unit (20) comprising:
   (1) a fast data logger;
   (2) a FRET (first) algorithm characterised in that it is designed to acquire and measure the FRET efficiency between said donor fluorophore and said acceptor fluorophore in said sample (10), adapted for a lock-in detection and suitable for resolving weak and rare molecular interactions between the donor and acceptor in the sample (10); and
   (3) a fast Fourier transform (FFT) algorithm for either a whole time-trajectory or part of it, said FFT algorithm is characterised in that it is designed to resolve molecular interactions between said donor fluorophore and said acceptor fluorophore in the sample (10), and to output information on said molecular interactions in a readable format to an external memory or user's interface.

In one embodiment, the computing unit (20) is further designed to control the modulation unit (16) by providing a feedback to said modulation unit (16) for further modulating excitation intensity of the acceptor fluorophore monochromatic excitation light beam (r') and thereby modulating fluorescence emission intensity of said donor fluorophore in a predetermined frequency domain, resulting in reversible saturation of said acceptor fluorophore and consequently, frustration of the FRET process.

The optical device of the present aspect is modular and may be configured to operate as a portable and highly sensitive fluorescence spectrophotometer (fluorometer), luminometer, fluorescence microscope or combinations thereof. The excitation module, the sample chamber and the acquisition module of the optical device can be configured according to a desired application and adapted for the particular application. For example, the sample chamber (B) may be chosen as a fluorescence multiplate reader for laboratory high-throughput and rapid, multiplexing analysis of multiple samples for point-of-care diagnostics.

In some embodiments, the detector (19) and the computing unit (20) are combined in a single unit designed to perform acquisition of the fluorescence emission (g), to measure its intensity, to process the fluorescent emission data and optionally display it in a readable format and/or output it to an external memory or user's interface. In another specific embodiment, the acquisition module (C) may be a part of a smartphone or any other mobile device or gadget suitable for performing the desired measurements.

In yet further specific embodiment, the sample chamber (B) combined with the acquisition module (C) constitutes a fluorescence microscope, or said optical device is a combined fluorometer and a fluorescence microscope installed in a single case, or said optical device is incorporated inside a fluorescence microscope. Said microscope is designed to generate raw data from single-molecule localisation as a video or as a series of static images and to further process said raw data generated by the microscope, to integrate said fluorescence emission (g) intensity data and said microscope raw data and to provide information on the molecular interactions and on the nanometre proximity of single molecules in a readable format or to output said information to an external memory or user's interface. In a particular embodiment, said sample chamber is a multiplexing spectrophotometric or imaging device, or part thereof, suitable for multiplexing multiple samples (10). An example of such multiplexing device is a microplate reader.

In case of the fluorometer functionality, the excitation sources (11) and (12) may be selected from a wide-spectrum halogen lamp, an arc-lamp or a mercury-vapour lamp, configured to emit said donor fluorophore excitation light (b)

and said acceptor fluorophore excitation light (r) in a predetermined wavelength range or near peak wavelength of said donor fluorophore or said acceptor fluorophore, respectively. The excitation monochromators (14, 15) in this case may be photomultiplier tubes (PMTs), and the emission monochromator (18) may be a diffraction grating.

In case of a microscope functionality, the first and second excitation monochromators (14, 15) are first and second excitation filters (14, 15), respectively, designed to select and transmit a narrow-wavelength beam of the excitation wavelength of light from the corresponding excitation source (11, 12), while said emission monochromator (18) is the emission filter (18) designed to transmit a narrow-wavelength beam of said donor fluorophore emission (g).

Dependent on a particular application, the optical device of the invention may further comprise a filter cube (17) installed between the excitation module (A), the sample chamber (B) and the acquisition module (C) in optical communication with said excitation module (A), said sample chamber (B) and said acquisition module (C), wherein said filter cube (17) comprises a two-channel dichroic mirror (41) configured to direct the modulated dichromatic excitation light beam (e) to the sample (10). The acquisition module (C) may further comprise one or two mirrors (21, 21'), for example two-channel dichroic mirrors, configured to transmit the light emitted from the sample (10) to the emission filter (18). Optionally, the filter cube (17) may further comprise an excitation filter (42) and at least one optional emission filter (43) having two transmission windows, said emission filter (43) is configured to optionally filter out the light emitted from the sample (10) and to transfer it to the acquisition module (C).

In a particular embodiment, the modulation unit (16) may be a modulating half-wave plate suitable for modulating polarisation of said acceptor fluorophore monochromatic excitation light beam (r'), or an acousto-optic modulator (AOM) suitable for modulating the frequency of said acceptor fluorophore monochromatic excitation light beam (r') using oscillating sound waves, or a vibrating mirror suitable for modulating the frequency of said acceptor fluorophore monochromatic excitation light beam (r') by mechanical diversion of the mirror.

In another particular embodiment, the sample chamber (B) of the optical device of the invention is further equipped with an objective configured to gather the fluorescence emission light (g) from the sample (10) to produce a fluorescence image, and optionally focus the excitation light beam (e) on the sample (10). In addition, when the microscope functionality of the optical device is required, the detector (19) may be equipped with a magnification eyepiece (ocular) for viewing, imaging, focusing and increasing the overall magnification of a fluorescent image.

In a certain embodiment, the detector (19) is an electron-multiplying charge-coupled device (EMCCD) imager, a charge-coupled device (CCD) imager, an avalanche photo-diode (APD), a photomultiplier tube (PMT), scientific complementary metal-oxide-semiconductor (sCMOS) imager, or CMOS imager of a smartphone camera, a stand-alone camera, or a camera of any mobile device or gadget, said detector (19) optionally having a focusing apparatus and a computer link. In a specific embodiment, the detector (19) is a CMOS imager of a smartphone camera.

In some embodiments, to achieve the functionality of a microscope, the computing unit (20) of said microscope further comprises:
  a second algorithm for analysing said microscope raw data images obtained from single-molecule localisation, said second algorithm is characterised in that it is designed to localise the donor fluorophore in the sample (10) and to transmit data on the localisation of said donor fluorophore molecules in said sample (10) to a third algorithm;
  the third algorithm designed to receive and integrate the analytical data produced by, and received from the FRET (first) algorithm, the FFT algorithm and the second algorithm, and to output information on the molecular interaction and on nanometre proximity of the single donor and acceptor fluorophore molecules, in a readable format or to output said information to an external memory or user's interface.

The optical device of the present aspect may further comprise a third excitation source suitable for photoactivation or photoswitching of the donor fluorophore.

As mentioned above, the optical device of the present aspect may be used in various applications, due to its modular versatility. Thanks to its fluorometer's functionality, the optical device can be used in a method for resolving inter- or intramolecular interactions between a first molecular target labelled with a donor fluorophore and a second molecular target labelled with an acceptor fluorophore suitable for forming the FRET interactions with said donor fluorophore in the sample (10). This method is carried out by placing said sample (10) in the sample chamber of the optical device of the present invention, and comprises the following steps:

(i) exciting said sample (10) with the dichromatic excitation light beam (e) having two wavelengths corresponding to the excitation wavelength of said donor fluorophore and to the excitation wavelength of said acceptor fluorophore;

(ii) collecting the fluorescence emission (g) intensity of said donor fluorophore during the FRET and measuring the fluorescence emission (g) intensity with the detector unit (19) of said optical device;

(iii) transferring the measured fluorescence emission (g) intensity data to the computing unit (20) of said optical device and optionally displaying said fluorescence emission intensity data in a readable format;

(iv) modulating the excitation intensity of said acceptor fluorophore in a predetermined frequency domain and intensity range, considering the predetermined saturation curve of said acceptor fluorophore and the bleaching time of said donor and said acceptor fluorophores, based on the processed fluorescence emission intensity data, for reversible acceptor fluorophore saturation that leads to said FRET frustration;

(v) measuring said FRET frustration by modulating the excitation intensity of said acceptor fluorophore thereby modulating said donor fluorophore emission;

(vi) lock-in detection of said frustrated FRET for said donor fluorophore labelling said first molecular target, for distinguishing between donor fluorophore molecules labelling said first molecular target and free donor fluorophore molecules in said sample (10); and (vii) interpreting the distance between said first molecular target labelled with said donor fluorophore and said second molecular target labelled with said acceptor fluorophore according to a model of number and positioning of said donor fluorophore and said acceptor fluorophore, thereby resolving molecular interactions between said first molecular target and said second molecular target, and outputting information on said molecular interactions in a readable format to an external memory or user's interface.

Thanks to its combined fluorometer-microscope functionality, the optical device of the present invention can be used in a method for increasing resolution of a fluorescence microscope suitable for single-molecule localisation microscopy (SMLM) and imaging single molecular interactions by detecting single inter- or intramolecular interactions between a first molecular target labelled with a donor fluorophore and a second molecular target labelled with an acceptor fluorophore capable of forming the FRET interactions with said donor fluorophore, or measuring the nanometre proximity between said first and second molecular targets, in the sample (10). This method is carried out by placing said sample (10) on a microscope slide in the sample holder of the optical device, and comprises the following steps:

(i) exciting the sample (10) with a dichromatic excitation light beam (e) having two wavelengths corresponding to the excitation wavelength of said donor fluorophore and to the excitation wavelength of said acceptor fluorophore;

(ii) imaging said sample (10) with said microscope to thereby generate, using a super-resolution microscopy technique, microscope raw data, and transfer said microscope raw data to the computing unit (20) of said microscope;

(iii) analysing said microscope raw data for localisation of molecules of said first molecular target labelled with said donor fluorophore;

(iv) measuring fluorescence emission (g) intensity of said localised donor fluorophore molecules during the FRET process, transferring the measured fluorescence emission (g) intensity data to the computing unit (20), and optionally displaying said fluorescence emission intensity data and/or single molecule localisation data in a readable format;

(v) modulating the excitation intensity of said acceptor fluorophore in a predetermined frequency domain and intensity range, considering the predetermined saturation curve of said acceptor fluorophore and the bleaching time of the donor and acceptor fluorophores, based on the analysed fluorescence emission intensity data, for reversible acceptor fluorophore saturation that leads to said FRET frustration;

(vi) measuring said FRET frustration by modulating the excitation intensity of said acceptor fluorophore, thereby modulating said donor fluorophore emission;

(vii) lock-in detection of said frustrated FRET for said donor fluorophore labelling said first molecular target, for distinguishing between donor fluorophore molecules labelling said first molecular target and free donor fluorophore molecules (without the acceptor) in said sample, and (viii) interpreting the distance between said first molecular target labelled with said donor fluorophore and said second molecular target labelled with said acceptor fluorophore according to a model of number and positioning of said donor fluorophore and said acceptor fluorophore, thereby detecting single inter- or intramolecular interactions between said first molecular target and said second molecular target, and outputting information on the nanometre proximity between said first and second molecular targets in a readable format to an external memory or user's interface;

wherein said donor fluorophore is either:

a photoactivatable fluorophore capable of switching from a non-emissive to an emissive state upon excitation with the third excitation source at an activating wavelength and then emitting fluorescence upon excitation at an excitation wavelength in a defined region of space at a given interval of time, or a photoswitchable fluorophore capable of switching from one emissive state to another emissive state upon excitation with the third excitation source at an activating wavelength.

The important step in the above methods is the lock-in detection, which comprises the following steps:

(A) performing a fast Fourier transform (FFT) on fluorescence emission of said donor fluorophore over time for either the whole-time trajectory of said donor fluorophore emission or a part of it, to obtain the FFT spectrum;

(B) detecting the spectral peak of said FFT spectrum at a modulation frequency of said acceptor fluorophore; and (C) calculating the Figure of Merit (FOM) of said fluorescence emission.

The first molecular target and the second molecular target can be fragments of the same molecule, thereby undergoing intramolecular interactions, or different molecules, thereby undergoing intermolecular interactions. These first and second molecular targets are selected each independently selected from an antigen, antibody, antibody fragment, enzyme, substrate or inhibitor, receptor, protein or organic molecule, lectin, sugar, DNA, RNA and aptamer. In a specific embodiment, the first and the second molecular targets are hybridization, hydrolysis or similar (e.g. Scorpion® or Molecular Beacon) probes suitable for binding closely to a common target DNA or RNA template, thereby facilitating the FRET between them and detecting the target. In another specific embodiment, the first and second molecular targets are a primary antibody and a secondary antibody, or a primary antibody and a fluorescent target, or antibody fragments (e.g. Fabs) acting as either primary and/or secondary antibody.

Various embodiments may allow various benefits and may be used in conjunction with various applications. The details of one or more embodiments are set forth in the accompanying figures and the description below. Other features, objects and advantages of the described techniques will be apparent from the description and drawings and from the claims

EMBODIMENTS

The following are non-limiting embodiments of the system and the method of the present disclosure:

1. An optical device suitable for acquiring and measuring efficiency of the Förster resonance energy transfer (FRET) between a donor fluorophore and an acceptor fluorophore in a sample to thereby resolving molecular interactions between said donor fluorophore and said acceptor fluorophore, said optical device comprising:

A. An excitation module comprising:

a) a first and second excitation source configured to emit a donor fluorophore excitation light and an acceptor fluorophore excitation light, respectively, for exciting said donor fluorophore and said acceptor fluorophore in the sample;

b) a first excitation monochromator configured to convert said donor fluorophore excitation light into a donor fluorophore monochromatic excitation light beam, and transmit said donor fluorophore monochromatic excitation light beam to a beam combiner;

c) a second excitation monochromator configured to convert said acceptor fluorophore excitation light into an acceptor fluorophore monochromatic excitation light beam; and transmitting said acceptor fluorophore monochromatic excitation light beam to a modulation unit;
d) the modulation unit characterised in that it is designed to:
  (i) modulate excitation intensity of acceptor fluorophore monochromatic excitation light beam by tuning excitation intensity of said acceptor fluorophore monochromatic excitation light beam from complete blocking to at least about 30% transmission, preferably at least about 50%, more preferably at least about 70%, thereby optically saturating said acceptor fluorophore to frustrate said FRET, and
  (ii) direct the obtained modulated acceptor fluorophore monochromatic excitation light beam to said beam combiner; and
e) the beam combiner designed to combine said donor fluorophore monochromatic excitation light beam and said modulated acceptor fluorophore monochromatic excitation light beam into a single dichromatic excitation light beam;
B. A sample chamber containing a sample holder designed to hold said sample (10), to which said dichromatic excitation light beam is directed; and
C. An acquisition module comprising:
a) an emission monochromator configured to scan and transmit a predefined wave-length range of a donor fluorophore emission;
b) a detector configured to perform acquisition of the fluorescence emission of said donor fluorophore, to measure intensity of the fluorescence emission and to transfer the obtained fluorescence emission intensity data to a computing unit; and
c) the computing unit characterised in that:
  (i) said computing unit is designed to:
    be synchronised with said detector and with said modulation unit,
    analyse the fluorescent emission intensity data transferred from said detector,
    optionally display said fluorescence emission intensity data in a readable format, and
    transfer said data to an external memory,
  (ii) said computing unit comprising:
    (1) a fast data logger;
    (2) a FRET (first) algorithm characterised in that it is designed to acquire and measure the FRET efficiency between said donor fluorophore and said acceptor fluorophore in said sample, adapted for a lock-in detection and suitable for resolving weak and rare molecular interactions between the donor and acceptor in the sample; and
    (3) a fast Fourier transform (FFT) algorithm for either a whole time-trajectory or part of it, said FFT algorithm is characterised in that it is designed to resolve molecular interactions between said donor fluorophore and said acceptor fluorophore in the sample, and to output information on said molecular interactions in a readable format to an external memory or user's interface.

2. The optical device of embodiment 1, wherein said computing unit is further designed to control the modulation unit by providing a feedback to said modulation unit for further modulating excitation intensity of the acceptor fluorophore monochromatic excitation light beam and thereby modulating fluorescence emission intensity of said donor fluorophore in a predetermined frequency domain, resulting in reversible saturation of said acceptor fluorophore and consequently, frustration of the FRET process.

3. The optical device of embodiment 1, wherein the first excitation source and the second excitation source each independently is a laser, a light-emitting diode (LED) or a laser diode.

4. The optical device of embodiment 1 further comprising a filter cube installed between the excitation module, the sample chamber and the acquisition module in optical communication with said excitation module, said sample chamber and said acquisition module, wherein said filter cube comprises a two-channel dichroic mirror configured to direct the modulated dichromatic excitation light beam to the sample.

5. The optical device of embodiment 4, wherein said acquisition module further comprises one or two mirrors configured to transmit the light emitted from the sample to the emission filter.

6. The optical device of embodiment, wherein said one or two mirrors is each independently a two-channel dichroic mirror.

7. The optical device of embodiment 4, wherein said filter cube further comprises an excitation filter and at least one optional emission filter having two transmission windows, said emission filter is configured to optionally filter out the light emitted from the sample and to transfer it to the acquisition module.

8. The optical device of embodiment 7, wherein said acquisition module further comprises one or two mirrors configured to transmit the emitted light from the filter cube to the emission monochromator.

9. The optical device of embodiment 8, wherein said one or two mirrors is each independently a two-channel dichroic mirror.

10. The optical device of any one of embodiments 1-9, wherein:
said first and second excitation monochromators are first and second excitation filters, respectively, designed to select and transmit a narrow-wavelength beam of the excitation wavelength of light from the corresponding excitation source; and
said emission monochromator is the emission filter designed to transmit a narrow-wavelength beam of said donor fluorophore emission.

11. The optical device of embodiment 1, wherein said first excitation source is a wide-spectrum halogen lamp, an arc-lamp or a mercury-vapour lamp, configured to emit said donor fluorophore excitation light in a predetermined wavelength range or near peak wavelength of said donor fluorophore.

12. The optical device of embodiment 11, wherein the first excitation monochromator is suitable for collimating said donor fluorophore excitation light to obtain a donor fluorophore collimated excitation light beam, converting said donor fluorophore collimated excitation light beam into a donor fluorophore monochromatic excitation light beam, and transmitting said donor fluorophore monochromatic excitation light beam to the beam combiner.

13. The optical device of embodiment 1, wherein said second excitation source is a wide-spectrum halogen lamp, an arc-lamp or a mercury-vapour lamp, configured to emit said acceptor fluorophore excitation light in a predetermined wavelength range or near peak wavelength of said acceptor fluorophore.

14. The optical device of embodiment 13, wherein the second excitation monochromator is suitable for collimating said acceptor fluorophore excitation light to obtain an acceptor fluorophore collimated excitation light beam, converting said acceptor fluorophore collimated excitation light beam into an acceptor fluorophore monochromatic excitation light beam, and transmitting said acceptor fluorophore monochromatic excitation light beam to the modulation device.
15. The optical device of embodiment 10, further comprising a first polariser adjacent to said first excitation filter and designed to convert said donor fluorophore monochromatic excitation light beam to a plane-polarised donor fluorophore monochromatic excitation light beam and direct said beam to the beam combiner; and a second polariser adjacent to said second excitation filter and designed to convert said acceptor fluorophore monochromatic excitation light beam to a plane-polarised acceptor fluorophore monochromatic excitation light beam and direct said beam to said modulation unit.
16. The optical device of embodiment 15, wherein at least one of said first and second polarisers independently comprises an adjustable Nicole prism suitable for producing linearly-polarised excitation light beam from said plane-polarised excitation light beam.
17. The optical device of embodiment 16, wherein at least one of said polarisers independently further comprises a half-wave plate suitable for shifting, and consequently for adjusting, the polarisation direction of said linearly-polarised excitation light beam, and wherein said Nicole prism is adjustable by rotating said half-wave plate to collimate said plane-polarised excitation light beam.
18. The optical device of embodiment 1, wherein said modulation unit is a modulating half-wave plate suitable for modulating polarisation of said acceptor fluorophore monochromatic excitation light beam, thereby suitable for modulating the excitation intensity of said acceptor fluorophore in said sample.
19. The optical device of embodiment 1, wherein said modulation unit is an acousto-optic modulator (AOM) suitable for modulating the frequency of said acceptor fluorophore monochromatic excitation light beam using oscillating sound waves, thereby suitable for modulating the excitation intensity of said acceptor fluorophore in said sample.
20. The optical device of embodiment 1, wherein said modulation unit is a vibrating mirror suitable for modulating the frequency of said acceptor fluorophore monochromatic excitation light beam by mechanical diversion of the mirror, thereby suitable for modulating the excitation intensity of said acceptor fluorophore in said sample.
21. The optical device of embodiment 1, wherein said sample chamber further comprises a temperature control unit.
22. The optical device of embodiment 1, wherein said sample holder is a coverslip, slide, cuvette suitable for use in any available fluorometer or spectrofluorometer, a slide suitable for use in any available microscope, capillary tube or microfluidic chip.
23. The optical device of embodiment 1, wherein said sample chamber is further equipped with an objective configured to gather the fluorescence emission light from the sample to produce a fluorescent image.
24. The optical device of embodiment 23, wherein said objective is further configured to focus the excitation light beam on the sample.
25. The optical device of embodiment 23, wherein said objective is a single lens or mirror, or combinations of several optical elements.
26. The optical device of embodiment 1, wherein said detector is further equipped with a magnification eyepiece (ocular) for viewing, imaging, focusing and increasing the overall magnification of a fluorescent image.
27. The optical device of embodiment 1, wherein said detector is an electron-multiplying charge-coupled device (EMCCD) imager, a charge-coupled device (CCD) imager, an avalanche photodiode (APD), a photomultiplier tube (PMT), scientific complementary metal-oxide-semiconductor (sCMOS) imager, or CMOS imager of a smartphone camera, a stand-alone camera, or a camera of any mobile device or gadget, said detector optionally having a focusing apparatus and a computer link.
28. The optical device of embodiment 27, wherein said detector is a CMOS imager of a smartphone camera.
29. The optical device of embodiment 1, wherein said emission monochromator is a diffraction grating monochromator.
30. The optical device of embodiment 29, wherein said emission monochromator further comprises dichroic mirrors and/or two polarisation filters for allowing anisotropy measurements.
31. The optical device of any one of embodiments 1 to 30, further comprising a set of mirrors configured to direct said excitation light beam to said beam combiner and/or said excitation light beam to said modulation unit.
32. The optical device of any one of embodiments 1 to 31, wherein the detector unit and the computing unit are combined in a single unit designed to perform acquisition of the fluorescence emission, to measure its intensity, to process the fluorescent emission data and optionally display it in a readable format and/or output it to an external memory or user's interface.
33. The optical device of claim 32, wherein said single unit is a smartphone or any other mobile device or gadget suitable for performing said tasks.
34. The optical device of claim 1, wherein said optical device is a fluorometer or luminometer.
35. The optical device of embodiment 1, wherein said sample chamber combined with the acquisition module constitutes a fluorescence microscope, or said optical device is a combined fluorometer and a fluorescence microscope installed in a single case, or said optical device is incorporated inside a fluorescence microscope.
36. The optical device of embodiment 1, wherein said sample chamber is a multiplexing spectrophotometric or imaging device, or part thereof, suitable for multiplexing multiple samples.
37. The optical device of embodiment 1, wherein said sample chamber is a microplate reader.
38. The optical device of embodiment 35, wherein said microscope is designed to generate raw data from single-molecule localisation as a video or as a series of static images.
39. The optical device of embodiment 38, wherein the computing unit of said microscope is further designed to process said raw data generated by the microscope, to integrate said fluorescence emission intensity data and said microscope raw data and to provide information on the molecular interactions and on the nanometre proximity of single molecules in a readable format or to output said information to an external memory or user's interface.
40. The optical device of embodiment 39, wherein said computing unit of said microscope further comprises:
(1) a second algorithm for analysing said microscope raw data images obtained from single-molecule localisation, said second algorithm is characterised in that it is designed to localise the donor fluorophore in the sample and to transmit data on the localisation of said donor fluorophore molecules in said sample to a third algorithm;

(2) the third algorithm designed to receive and integrate the analytical data produced by, and received from the FRET (first) algorithm, the FFT algorithm and the second algorithm, and to output information on the molecular interaction and on nanometre proximity of the single donor and acceptor fluorophore molecules, in a readable format or to output said information to an external memory or user's interface.

41. The optical device of any one of embodiments 1 to 40, further comprising a third excitation source suitable for photoactivation or photoswitching of the donor fluorophore.

42. A method for resolving inter- or intramolecular interactions between a first molecular target labelled with a donor fluorophore and a second molecular target labelled with an acceptor fluorophore suitable for forming Förster Resonance Energy Transfer (FRET) interactions with said donor fluorophore in the sample, said method being carried out by placing said sample in the sample chamber of the optical device of any one of embodiments 1-34, and comprising:

(i) exciting said sample with the dichromatic excitation light beam having two wavelengths corresponding to the excitation wavelength of said donor fluorophore and to the excitation wavelength of said acceptor fluorophore;

(ii) collecting the fluorescence emission intensity of said donor fluorophore during the FRET and measuring the fluorescence emission intensity with the detector unit of said optical device;

(iii) transferring the measured fluorescence emission intensity data to the computing unit of said optical device and optionally displaying said fluorescence emission intensity data in a readable format;

(iv) modulating the excitation intensity of said acceptor fluorophore in a predetermined frequency domain and intensity range, considering the predetermined saturation curve of said acceptor fluorophore and the bleaching time of said donor and said acceptor fluorophores, based on the processed fluorescence emission intensity data, for reversible acceptor fluorophore saturation that leads to said FRET frustration;

(v) measuring said FRET frustration by modulating the excitation intensity of said acceptor fluorophore thereby modulating said donor fluorophore emission;

(vi) lock-in detection of said frustrated FRET for said donor fluorophore labelling said first molecular target, for distinguishing between donor fluorophore molecules labelling said first molecular target and free donor fluorophore molecules in said sample; and (vii) interpreting the distance between said first molecular target labelled with said donor fluorophore and said second molecular target labelled with said acceptor fluorophore according to a model of number and positioning of said donor fluorophore and said acceptor fluorophore, thereby resolving molecular interactions between said first molecular target and said second molecular target, and outputting information on said molecular interactions in a readable format to an external memory or user's interface.

43. A method for increasing resolution of a microscope suitable for single-molecule localisation (SMLM) and imaging single molecular interactions by detecting single inter- or intramolecular interactions between a first molecular target labelled with a donor fluorophore and a second molecular target labelled with an acceptor fluorophore capable of forming the FRET interactions with said donor fluorophore, or measuring the nanometre proximity between said first and second molecular targets, in the sample, said method being carried out by placing said sample on a microscope slide in the sample holder of the microscope of embodiments 35-39, and comprising:

(i) exciting the sample with a dichromatic excitation light beam having two wavelengths corresponding to the excitation wavelength of said donor fluorophore and to the excitation wavelength of said acceptor fluorophore;

(ii) imaging said sample with said microscope to thereby generate, using a super-resolution microscopy technique, microscope raw data, and transfer said microscope raw data to the computing unit of said microscope;

(iii) analysing said microscope raw data for localisation of molecules of said first molecular target labelled with said donor fluorophore;

(iv) measuring fluorescence emission intensity of said localised donor fluorophore molecules during the FRET process, transferring the measured fluorescence emission intensity data to the computing unit, and optionally displaying said fluorescence emission intensity data and/or single molecule localisation data in a readable format;

(v) modulating the excitation intensity of said acceptor fluorophore in a predetermined frequency domain and intensity range, considering the predetermined saturation curve of said acceptor fluorophore and the bleaching time of the donor and acceptor fluorophores, based on the analysed fluorescence emission intensity data, for reversible acceptor fluorophore saturation that leads to said FRET frustration;

(vi) measuring said FRET frustration by modulating the excitation intensity of said acceptor fluorophore, thereby modulating said donor fluorophore emission;

(vii) lock-in detection of said frustrated FRET for said donor fluorophore labelling said first molecular target, for distinguishing between donor fluorophore molecules labelling said first molecular target and free donor fluorophore molecules (without the acceptor) in said sample, and (viii) interpreting the distance between said first molecular target labelled with said donor fluorophore and said second molecular target labelled with said acceptor fluorophore according to a model of number and positioning of said donor fluorophore and said acceptor fluorophore, thereby detecting single inter- or intramolecular interactions between said first molecular target and said second molecular target, and outputting information on the nanometre proximity between said first and second molecular targets in a readable format to an external memory or user's interface.

44. A method for increasing resolution of a microscope suitable for single-molecule localisation (SMLM) and imaging single molecular interactions by detecting single inter- or intramolecular interactions between a first molecular target labelled with a donor fluorophore and a second molecular target labelled with an acceptor fluorophore capable of forming the FRET interactions with said donor fluorophore, or measuring the nanometre proximity between said first and second molecular targets, in the sample, said method being carried out by placing said sample on a microscope slide in the sample holder of the microscope of embodiment 40, and comprising:
(i) exciting the sample with a dichromatic excitation light beam having two wavelengths corresponding to the excitation wavelength of said donor fluorophore and to the excitation wavelength of said acceptor fluorophore;
(ii) imaging said sample with said microscope to thereby generate, using a super-resolution microscopy technique, microscope raw data, and transfer said microscope raw data to the computing unit of said microscope;
(iii) analysing said microscope raw data for localisation of molecules of said first molecular target labelled with said donor fluorophore;
(iv) measuring fluorescence emission intensity of said localised donor fluorophore molecules during the FRET process, transferring the measured fluorescence emission intensity data to the computing unit, and optionally displaying said fluorescence emission intensity data and/or single molecule localisation data in a readable format;
(v) modulating the excitation intensity of said acceptor fluorophore in a predetermined frequency domain and intensity range, considering the predetermined saturation curve of said acceptor fluorophore and the bleaching time of the donor and acceptor fluorophores, based on the analysed fluorescence emission intensity data, for reversible acceptor fluorophore saturation that leads to said FRET frustration;
(vi) measuring said FRET frustration by modulating the excitation intensity of said acceptor fluorophore, thereby modulating said donor fluorophore emission;
(vii) lock-in detection of said frustrated FRET for said donor fluorophore labelling said first molecular target, for distinguishing between donor fluorophore molecules labelling said first molecular target and free donor fluorophore molecules (without the acceptor) in said sample, and
(viii) interpreting the distance between said first molecular target labelled with said donor fluorophore and said second molecular target labelled with said acceptor fluorophore according to a model of number and positioning of said donor fluorophore and said acceptor fluorophore, thereby detecting single inter- or intramolecular interactions between said first molecular target and said second molecular target, and outputting information on the nanometre proximity between said first and second molecular targets in a readable format to an external memory or user's interface;
wherein said donor fluorophore is a photoactivatable fluorophore capable of switching from a non-emissive to an emissive state upon excitation with the third excitation source at an activating wavelength and then emitting fluorescence upon excitation at an excitation wavelength in a defined region of space at a given interval of time, and/or said donor fluorophore is a photoswitchable fluorophore capable of switching from one emissive state to another emissive state upon excitation with the third excitation source at an activating wavelength.

45. The method of any one of embodiments 41-44, wherein said lock-in detection comprises:
(i) performing a fast Fourier transform (FFT) on fluorescence emission of said donor fluorophore over time for either the whole-time trajectory of said donor fluorophore emission or a part of it, to obtain the FFT spectrum;
(ii) detecting the spectral peak of said FFT spectrum at a modulation frequency of said acceptor fluorophore; and
(iii) calculating the Figure of Merit (FOM) of said fluorescence emission.

46. The method of embodiment 45, where said FOM is calculated by optionally removing a non-modulated part of said FFT spectrum, followed by comparison of said spectral peak to its median value, wherein said non-modulated part of said FFT spectrum corresponds to a direct current (DC) signal or a non-synchronised signal resulting from a non-specific background, noise of the detector or fluorescence emission of free donor fluorophore molecules (without the acceptor).

47. The method of embodiments 45 or 46, wherein said FOM is suitable for detection of molecular interactions and calculated by setting a threshold value for said FOM, which is based on a negative control sample for rejecting false positive FRET signals, and wherein said negative control sample comprises either only said donor fluorophore, or a mixture of said donor fluorophore and an acceptor fluorophore incapable of forming the FRET interactions with said donor fluorophore.

48. The method of any one of embodiments 41-47, wherein said first molecular target and said second molecular target are fragments of the same molecule, thereby undergoing said intramolecular interactions.

49. The method of any one of embodiments 41-47, wherein said first molecular target and said second molecular target are different molecules, thereby undergoing said intermolecular interactions.

50. The method of any one of embodiments 41-49, wherein said first and second molecular targets each independently selected from an antigen, antibody, antibody fragment, enzyme, substrate or inhibitor, receptor, protein or organic molecule, lectin, sugar, DNA, RNA and aptamer.

51. The method of any one of embodiments 41-49, wherein said first and the second molecular targets are hybridization, hydrolysis or similar (e.g. Scorpion® or Molecular Beacon) probes suitable for binding closely to a common target DNA or RNA template, thereby facilitating the FRET between them and detecting the target.

52. The method of any one of embodiments 41-49, wherein said first and second molecular targets are a primary antibody and a secondary antibody, or a primary antibody and a fluorescent target, or antibody fragments (e.g. Fabs) acting as either primary and/or secondary antibody.

53. A system for monitoring a sample, comprising:
a light unit configured for illuminating the sample in at least two different wavelength ranges;
a collection unit configured for collecting a light emitted from the sample in at least a third wavelength range and directing said emitted light towards at least one detector;
an activation unit configured for providing activation signal to selectively activate at least a portion of fluorescent substance in the sample; and
a processing circuitry configured for operating the light unit to determine a selected temporal illumination profile of said at least two different wavelength ranges and for operating the activation unit for controllable activation.

54. The system of embodiment 53, wherein said at least two wavelength ranges comprise a first donor fluorophore excitation wavelength range and a second, acceptor fluorophore excitation wavelength range.

55. The system of embodiment 53 or 54, wherein the light unit comprises at least a donor illumination light source for providing the donor fluorophore excitation light wavelength range and an acceptor illumination light source for providing the acceptor fluorophore excitation light wavelength range.

56. The system of any one of embodiments 53-55, wherein the activation unit comprises an activation light source configured to provide illumination with a fourth, activating illumination wavelength range.

57. The system of embodiment 56, wherein the processing circuitry is configured for operating said activation light source to provide a selected temporal activation illumination intensity profile of the fourth wavelength range.

58. The system of embodiment 57, wherein said temporal activation illumination of the fourth wavelength range comprising at least one of: a pulse temporal pattern and continuous illumination pattern.

59. The system of any one of embodiments 56-58, wherein said activation light source is configured to provide illumination at intensity sufficient for activating up to 10 fluorophores within a region of diffraction limited spot in the sample for a given activation signal, the diffraction limited spot is determined by optical elements used of the collection unit.

60. The system of any one of embodiments 53-55, wherein the activation unit is configured for controllably releasing chemical reactant into said sample to provide chemical activation of fluorophores in the sample.

61. The system of embodiment 60, wherein said activation unit is configured for releasing chemical reactant into said sample at amount sufficient for activating up to 10 fluorophores within a region of diffraction limited spot in the sample for a given activation signal, the diffraction limited spot is determined by optical elements used of the collection unit.

62. The system of any one of embodiments 53-61, wherein the light unit comprises an optical arrangement adapted for directing said at least two different wavelength ranges towards a common selected region of the sample.

63. The system of any one of embodiments 53-62, wherein said third wavelength range is different from said at least two different wavelength ranges.

64. The system of any one of embodiments 53-63, wherein said third wavelength range comprises wavelength associated with donor fluorescence emission.

65. The system of any one of embodiments 53-64, wherein the processing circuitry is configured for controlling the light unit to provide said selected temporal illumination profile.

66. The system of embodiment 65, wherein said temporal illumination profile is selected from any one of: a pulse temporal pattern and continuous illumination.

67. The system of any one of embodiments 53-66, wherein said processing circuitry is configured for controlling the light unit to provide said selected temporal illumination profile comprising a selected temporal intensity modulation of said second, acceptor excitation wavelength range of a selected modulation pattern.

68. The system of any one of embodiments 53-67, wherein said selected temporal illumination profile of said first wavelength range is of lower modulation frequency and temporally overlapping with respect to modulation frequency of the second wavelength range.

69. The system of any one of embodiments 53-68, comprising a detector configured for detecting light of said third wavelength range, collected by said collection unit and generate at least one stream of data pieces indicative of intensity pattern of collected light at a selected sampling rate.

70. The system of embodiment 69, wherein the detector comprises a pixel array positioned at an image plane with respect to at least a region of the sample.

71. The system of embodiment 69 or 70, wherein the processing circuitry is configured for receiving and processing said at least one stream of data pieces associated with intensity of collected light to identify modulated intensity profile of said collected light within one or more time windows to provide output data thereof 72. The system of embodiment 71, wherein the processing circuitry is configured to select said one or more time windows by identifying time variation of intensity profile in said at least one stream of data pieces associated with intensity of collected light.

73. The system of embodiment 71 or 72, wherein said one or more time windows is associated with a selected duration following provision of activation signal for activation of fluorophores in the sample.

74. The system of any one of embodiments 71-73, wherein said modulated intensity profile is associated with a FRET event.

75. The system of any one of embodiments 71-74, wherein the processing circuitry is configured to determine FRET interaction distances in said identified modulated intensity profile utilizing level of modulation of the collected light.

76. The system of any one of embodiments 71-75, wherein the processing circuitry is configured to determine temporal frequency components of said collected data piece in said one or more time windows.

77. The system of embodiment 76, wherein said frequency-time domain manipulation is selected from any one of: temporal Fourier Transform, matched filters, Wigner filters and machine learning.

78. The system of any one of embodiments 53-77, comprising a sample mount configured for placement of the sample.

79. The system of embodiment 78, comprising a sample chamber mounted on said sample mount for holding the sample.

80. A method for monitoring a sample, comprising:
providing activation signal to the sample for activating a selected amount of fluorophores in the sample;
illuminating at least a region of the sample with a first illumination wavelength range and a temporally modulated second wavelength range;
collecting and detecting from the region of the sample light of a third wavelength range to provide data pieces associated with intensity profile of emission from said region of the sample.

81. The method of embodiment 80, comprising processing said data pieces and identifying modulated intensity profile of said collected light within one or more time windows.

82. The method of embodiment 81, wherein said one or more time windows are associated with a duration following providing said activation signal to the sample.

83. The method of embodiment 81 or 82, wherein said one or more time windows are associated with a time variation of intensity profile of said detected third wavelength range.

84. The method of any one of embodiments 81-83, wherein said identifying modulated intensity profile of said collected light within one or more time windows comprises identifying a modulation intensity at a certain modulation pattern associated with pattern of said temporal modulated second wavelength range.
85. The method of any one of embodiments 81-84, wherein said processing comprises identifying FRET events between donor fluorophores and acceptor fluorophores in the sample.
86. The method of embodiment 85, wherein said processing comprises determining number of fluorophores taking part in a detected FRET event and determining distance between the donor and acceptor fluorophores in accordance with level of modulation of collected donor emission intensity.
87. The method of any one of embodiments 80-86, wherein said activation signal to the sample for activating a selected amount of fluorophores in the sample comprises providing illumination of a fourth wavelength range selected for photoactivating a portion of fluorophore in the sample.
88. The method of embodiment 87, wherein said providing illumination of a fourth wavelength range comprising providing selected illumination pattern and intensity profile selected for activating up to 10 fluorophore molecules within a region of diffraction limited spot in the sample for a given activation signal, the diffraction limited spot is determined by optical elements used of the collection unit.
89. The method of embodiment 88, wherein activation intensity profile of said pulse pattern of the fourth wavelength range is selected to provide photoactivation of a portion of respective donor fluorophore population.
90. The method of any one of embodiments 80-86, wherein said activation signal to the sample for activating a selected amount of fluorophores in the sample comprises providing a selected amount of activation reagent to the sample.
91. The method of any one of embodiments 80-90, further comprising providing output data associated with said identified modulated intensity profile.
92. The method of any one of embodiments 80-91, wherein said first wavelength range comprises a selected donor fluorophore excitation wavelength.
93. The method of any one of embodiments 80-92, wherein said second wavelength range comprises a selected acceptor fluorophore excitation wavelength.
94. The method of any one of embodiments 80-93, wherein said third wavelength range comprises a selected donor emission wavelength.
95. The method of any one of embodiments 80-94, wherein said third wavelength range is associated with selected donor fluorescence emission wavelength.
96. The method of any one of embodiments 80-95, comprising providing a sample that comprises a selected population of molecular probes associated with donor and acceptor fluorophores.
97. The method of embodiment 96, wherein said molecular probes are adapted for association with selected binding sites of substances in the sample.
98. The method of any one of embodiments 80-97, comprising providing a sample and mixing said sample with a population of molecular probes associated with selected donor and acceptor fluorophores.
99. The method of any one of embodiments 96-98, wherein said population of donor and acceptor fluorophores comprises at least one of quantum dots, Fluorescein, Rhodamine, lipophilic fluorescent stains, Fluorescein Isothiocyanate (FITC), fluorescent proteins, Photoactivatable or photoswitchable fluorescent proteins, quantum rods, quenchers, caged fluorophores, bioluminescent emitters, nanodiamonds, chemiluminescent emitters or phosphorescent emitters.
100. The method of any one of embodiments 80-99, wherein said sample comprises a biological or organic matter.
101. A program storage device readable by machine, tangibly embodying a program of instructions executable by the machine to perform a method for monitoring a sample, comprising:
providing activation signal to the sample for activating a selected amount of fluorophores in the sample;
operating a light unit for illuminating at least a region of the sample with (i) a first illumination wavelength range and (ii) a temporally modulated second wavelength range;
operating a detector unit for collecting light of a third wavelength range and generating data pieces associated with intensity profile of the collected light;
processing said image data piece for identifying modulated intensity profile of said collected light within one or more time windows; and generating output data indicative of said modulated intensity profile.
102. A computer program product comprising a computer readable medium having computer readable program code embodied therein for monitoring a sample, the computer program product comprising:
providing activation signal to the sample for activating a selected amount of fluorophores in the sample;
operating a light unit for illuminating at least a region of the sample with (i) a first illumination wavelength range and (ii) a temporally modulated second wavelength range;
operating a detector unit for collecting light of a third wavelength range and generating image data pieces associated with intensity profile of the collected light;
processing said image data piece for identifying modulated intensity profile of said collected light within one or more time windows; and generating output data indicative of said modulated intensity profile.
103. A control unit connectable to illumination unit, activation unit and a detector unit and comprising:
at least one processing circuitry comprising
operation module configured for operating the light unit for illuminating at least a region of the sample with (i) a first illumination wavelength range and (ii) a temporally modulated second wavelength range, and operating the activation unit for providing one or more activation signals for activating selected portion of fluorophores in said sample;
detection module configured for operating the detector unit for collecting light of a third wavelength range and generating data pieces associated with intensity profile of the collected light;
a processing module configured for receiving and processing said image data pieces for identifying modulated intensity profile of said collected light within one or more time windows, and generating output data indicative of said modulated intensity profile.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 6A shows the modulated excitation of both the donor and the acceptor during the imaging; FIG. 6B schematically shows the detected emission of the donor fluorophore in response to the illumination profile demonstrated in FIG. 6A.

FIGS. 8A-8C are flow diagrams of non-limiting examples of the method of the present disclosure;

FIG. 9A shows an exemplary image collected from a sample, FIG. 9B shows variation in collected donor emission intensity for a selected signal donor, FIG. 9C shows temporal frequencies of the collected intensity variations of FIG. 9B, and FIG. 9D shows histogram exemplifying uncertainty in localization of detected molecules;

FIG. 10A shows for 'donor-acceptor', FIG. 10B shows magnification of a selected area of FIG. 10A, FIG. 10C shows 'donor only' field and FIG. 10D shows magnification of the selected region, FIG. 10E shows histogram of FRET efficiency E, and FIG. 10F shows histogram of donor/acceptor distance distribution; FIG. 11A exemplifies a model arrangement of single donor D associated with a molecular structure in vicinity to three acceptor fluorophores A, FIG. 11B is a histogram showing distribution of possible intermolecular donor-acceptor distances, FIG. 11C shows scattering graph of energy transfer efficiency and errors of the models in determining FRET efficiency, FIGS. 11D and 11E show prediction errors of the two models, and FIG. 11F exemplifies an error plot for determining donor-acceptor distance.

DETAILED DESCRIPTION OF EMBODIMENTS

Figure 1A:
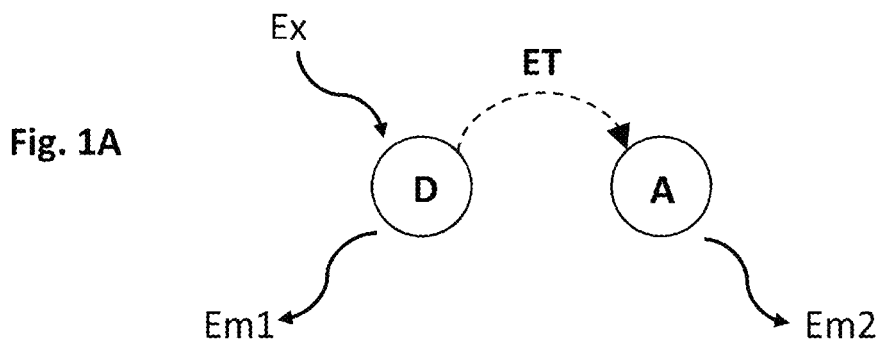
FIGS. 1A-1C are schematic illustrations of exemplifying FRET process.
Figure 1B:
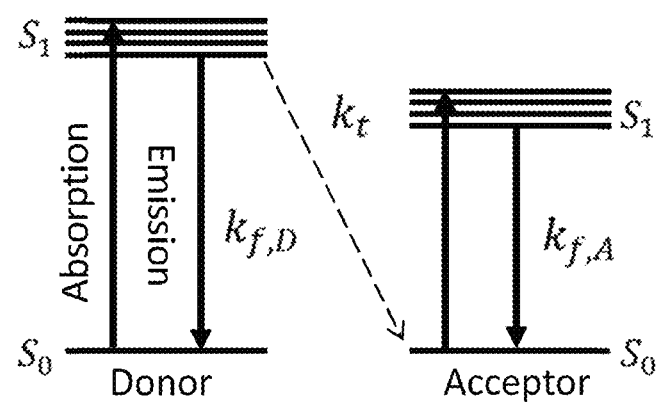
Figure 1C:
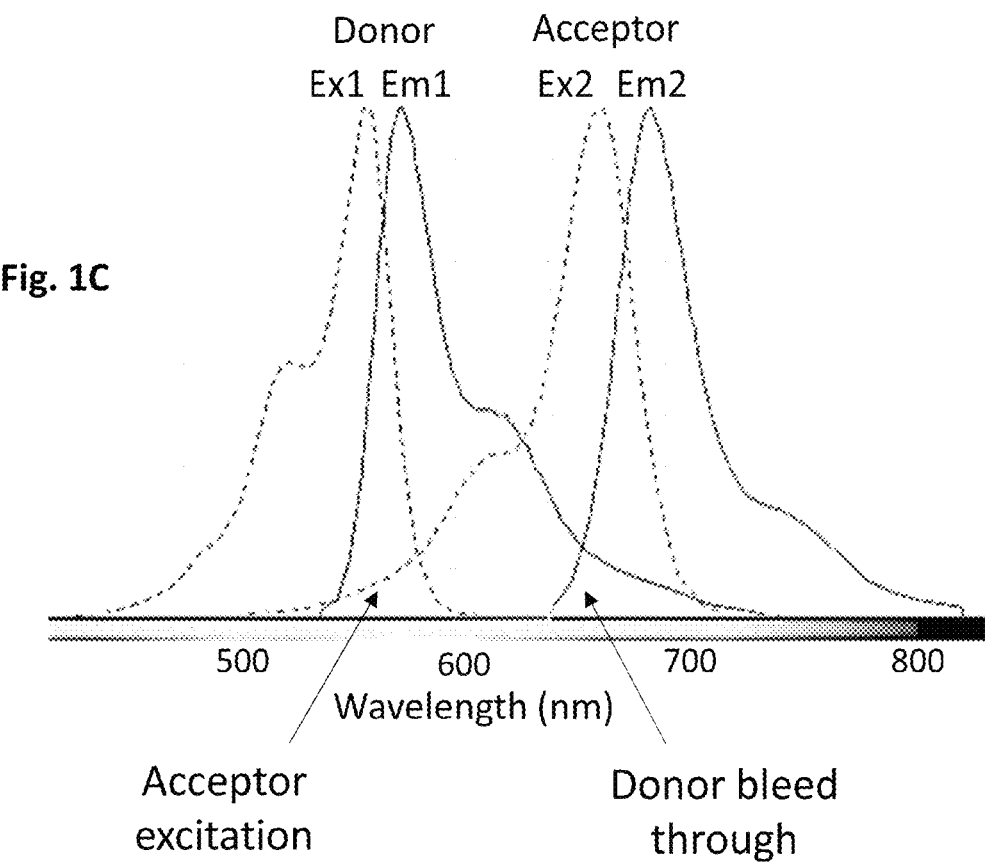

As indicated above, the present technique utilizes FRET and frustrated FRET detection to determine existence, amount and/or location of selected molecular structures in a sample. Reference is first made to FIGS. 1A-1C, exemplifying certain concepts of FRET interactions between a donor fluorophore D and an acceptor fluorophore A. FIG. 1A exemplify excitation of donor D, e.g. green fluorescent protein (GFP), by exciting energy Ex, e.g. blue light. As shown, the donor may relax by fluorescent emission Em1 or transfer the energy ET to a nearby acceptor fluorophore A, causing the acceptor fluorophore A to relax by fluorescent emission Em2. FIG. 1B illustrates electronic states of the donor and acceptor fluorophores, and the energy transfer in FRET process. Generally, the Donor is excited from electronic ground state $S_0$ to an excited state $S_1$ by absorption light of the first wavelength range. Generally, the donor very quickly relaxes from a high excited state by interconversion or preparative relaxation to the first electron excited state. From there the donor can go back to the ground state either through the non-radiative decay interconversion, or through the radiative pathway by emitting a photon. In when a suitable acceptor molecule, having sufficiently overlapping orbitals is nearby, the energy may be transferred non-radiatively to the acceptor, exciting it from the ground state $S_0$ of the acceptor to an excited state $S_1$, resulting in fluorescent emission by the acceptor fluorophore.

Generally, the acceptor fluorescence increases in the presence of donor, whereas the donor fluorescence decreases in the presence of the acceptor. The ratiometric change of fluorescence intensity can then be used to measure the FRET. This is the most straight-forward approach to measuring the process of the FRET. It is generally possible to determine existence and level of FRET events from the change in the emission of the donor or the acceptor. The major parameter that is used to quantify in detection of FRET events the FRET efficiency E, which is basically the number of excited donors that transfer the energy to the acceptor, divided by the number of photons absorbed by the donor. So, this is basically a fraction of donors that transfer their energy to the acceptor. The FRET efficiency E can also be expressed as the following ratio:

$$E = \frac{R_0^6}{R_0^6 + r^6}$$

where R is the Förster radius (typically in the order of nanometres) that represents the distance between the donor and acceptor at which the FRET efficiency is 50% (when half of the excited donor molecules transfer their energy to the acceptor), and r is the distance between the donor and acceptor. Since it is $r^6$, it makes the dependence very steep. So, measuring the FRET efficiency E allows to assess the distance r between the donor and acceptor. Generally, the present technique may utilize selective activation of very few of the fluorophores (e.g. few donor fluorophores) to enable single molecule detection and thus determine the donor-acceptor distance r from the level of donor emission modulation.

FIG. 1C shows an example of the excitation spectra Ex1 and Ex2 (dashed line) and emission spectra (solid line) Em1 and Em2 of exemplary donor and acceptor fluorophores respectively. As shown, the spectrum lines are at least partially overlapping forming spectrum regions associated with direct acceptor excitation by the donor excitation and donor bleed through into the acceptor detection wavelength range. These overlapping spectra introduce crosstalk between donor and acceptor excitation and emission wavelengths that limit direct detection accuracy. The crosstalk between excitation and emission wavelength of the donor and acceptor fluorophores may typically prohibit, or at least significantly limit accuracy of, detection of single FRET events (separated donor-acceptor interactions) over a large background of non-interacting donor or acceptor fluorophores, using the traditional FRET measuring approaches (e.g. via sensitized emission). An alternative in the conventional technique utilizes lower fluorophores' density (i.e. low amounts of donor and acceptor fluorophores) providing fluorophores' density at a level enabling single molecule detection. The present technique however, allows detection of single FRET events in densely labelled samples, without the need to dilute the donor and acceptor densities. To this end the present technique may generally utilize detection of shifts between frustrates and non-frustrated FRET events, while typically utilizing fluorophore that are switchable between on and off states.

Figure 2A:
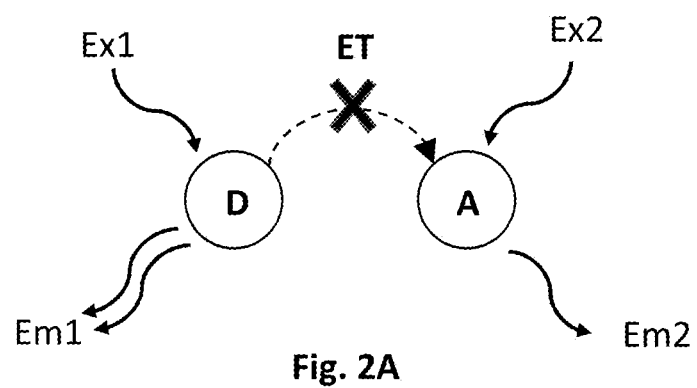
FIGS. 2A-2B are schematic illustrations of exemplifying frustrated FRET process.
Figure 2B:
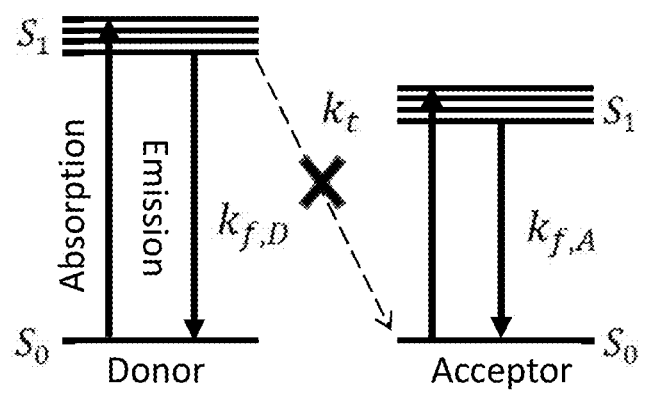

FIGS. 2A-2B shows an example of frustrated (interchangeably used with the term "saturated") FRET events/process. FIG. 2A exemplify excitation Ex1 of the donor D simultaneously with excitation Ex2 of the acceptor A such that the energy ET from the donor D cannot be transferred to the acceptor A since it is already excited. This result in donor emission Em1 and acceptor emission Em2, where the donor emission is not reduced by energy transmission ET. FIG. 2B schematically illustrates the energy levels and the transitions therebetween in frustrated FRET process, marked by blockage of energy transmission between the donor and acceptor. As can be appreciated the energy transfer from an excited state of the donor to the acceptor is not permitted as the acceptor is saturated.

Fluorophores suitable for being used in the technique of the present disclosure may include, but are not limited to generic or proprietary emitters listed in Table 1 below:

TABLE 1

Generic or proprietary exemplary emitters suitable for use in the present disclosure

| | |
|---|---|
| Type 1 | Fluorescein and derivatives thereof, Rhodamine and derivatives thereof, Cyanines and derivatives thereof, Coumarin and derivatives thereof, Xanthene derivatives, Squaraine derivatives, Naphthalene derivative, oxadiazole derivatives, Anthracene derivatives, Pyrene derivatives, Oxazine derivatives, Acridine derivatives, Arylmethine derivatives, Tetrapyrrole derivatives, Alexa Fluor ® dyes, DyLight Fluor ® dyes, Cyanine Cy ™ dyes, ATTO ® dyes, Abberior STAR ® dyes, Dyomics ® dyes, DNA fluorescent stains (for example, DAPI or 4',6-diamidino-2-phenylindole), membrane fluorescent stains (for example, DiI or DiIC$_{18}$(3), DiO or DiOC$_{18}$(3), DiD and DiR, which constitute a family of lipophilic fluorescent stains for labelling membranes and other hydrophobic structures). |
| Type 2 | A subset of Type 1 emitters that can be used for SMLM (dSTORM), for example, Abberior fluorophores, Alexa fluorophores (Alexa Fluor ® 488, Alexa Fluor ® 555, Alexa Fluor ® 568, Alexa Fluor ® 647, Alexa Fluor ® 750, Alexa Fluor ® 790), Atto fluorophores (ATTO ® 488, ATTO ® 520, ATTO ® 565, ATTO ® 647, ATTO ® 647N, ATTO ® 655, ATTO ® 680, ATTO ® 740), Bella fluorophores, Bodipy, Cy fluorophores (Cy2, Cy3, Cy3B, Cy3.5, Cy5, Cy5.5, Cy7), DyLight fluorophores (e.g. DyLight Fluor ® 750), Everfluor fluorophors, Fluorescein Isothiocyanate (FITC), Dyomics ® 654 and IRDye ® 800CW, HiLyte fluorophores, Seta fluorophores, Quasar and Cal Fluor dyes, SureLight Dyes, APC, APCXL, RPE, BPE, Vio Dyes. These dyes may change their fluorescent properties upon changes in the polarity of their environment. |
| Type 3 | Fluorescent proteins may include, but are not limited to, CFP, CyPET, GFP, YFP, YPET, RFP, and their mutants. |
| Type 4 | Photoactivatable or photoswitchable fluorescent proteins include, but are not limited to, PAGFP, Dronpa (and mutants such as Dronpa2, Dronpa3, Padron), rsFastLime, PAmCherry (and mutants PAmCherry1, PAmCherry2, or PAmCherry3, reCherry, rsCerryRev), PS-CFP1, PS-CFP2, Dendra1, Dendra2, Kaeda, KikGR, mKikGR, EosFP, mEos2, and KFP1. |
| Type 5 | Quantum dots, quantum rods. |
| Type 6 | Quenchers, for example the DYQ series by Dyomics ®, Black Hole Quencher Dyes by BioSearch Technologies ®, and the QSY series by ThermoFisher Scientific ®. |
| Type 7 | Caged fluorophores that can include, but not limited to, fluorophores that become fluorescent upon illumination with UV light. |
| Type 8 | Bioluminescent emitters may include, but are not limited to, Luciferase derived chimeras. |
| Type 9 | Chemiluminescent emitters. |
| Type 10 | Phosphorescent emitters may include, but are not limited to, lanthanides with or without sensitizers. |
| Type 11 | Nano diamonds |

Figure 3A:
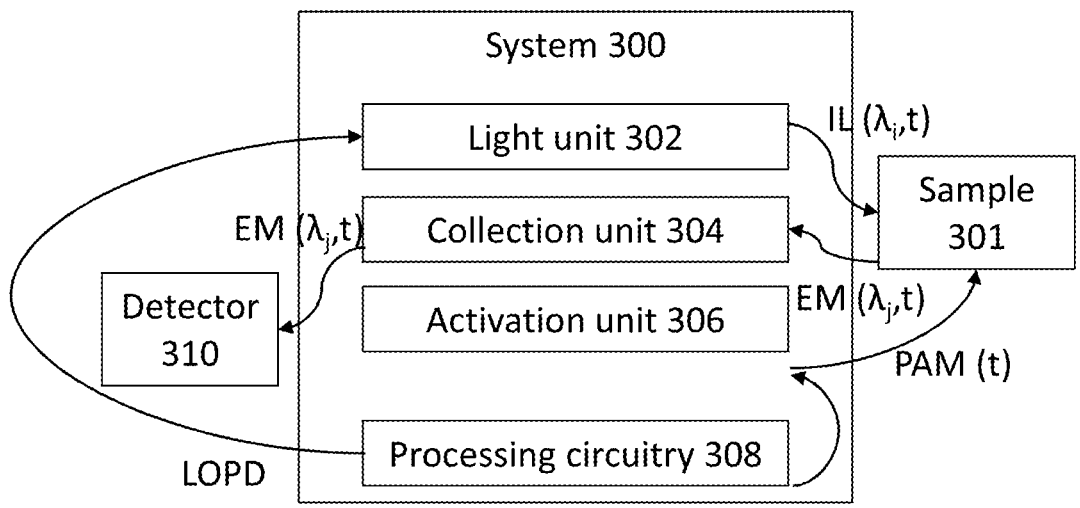
FIGS. 3A-3C are block diagrams of non-limiting examples of different embodiments of the system according to an aspect of the present disclosure.
Figure 3B:
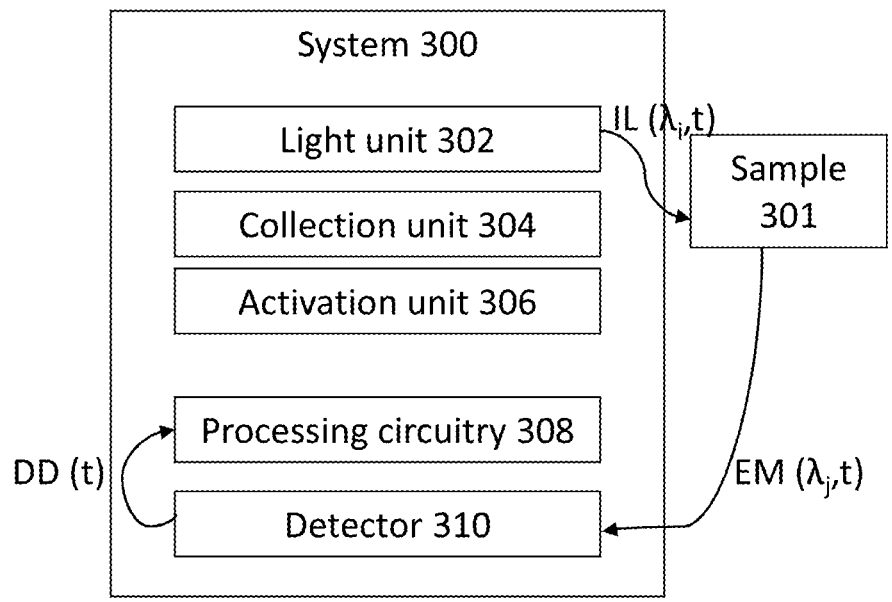
Figure 3C:
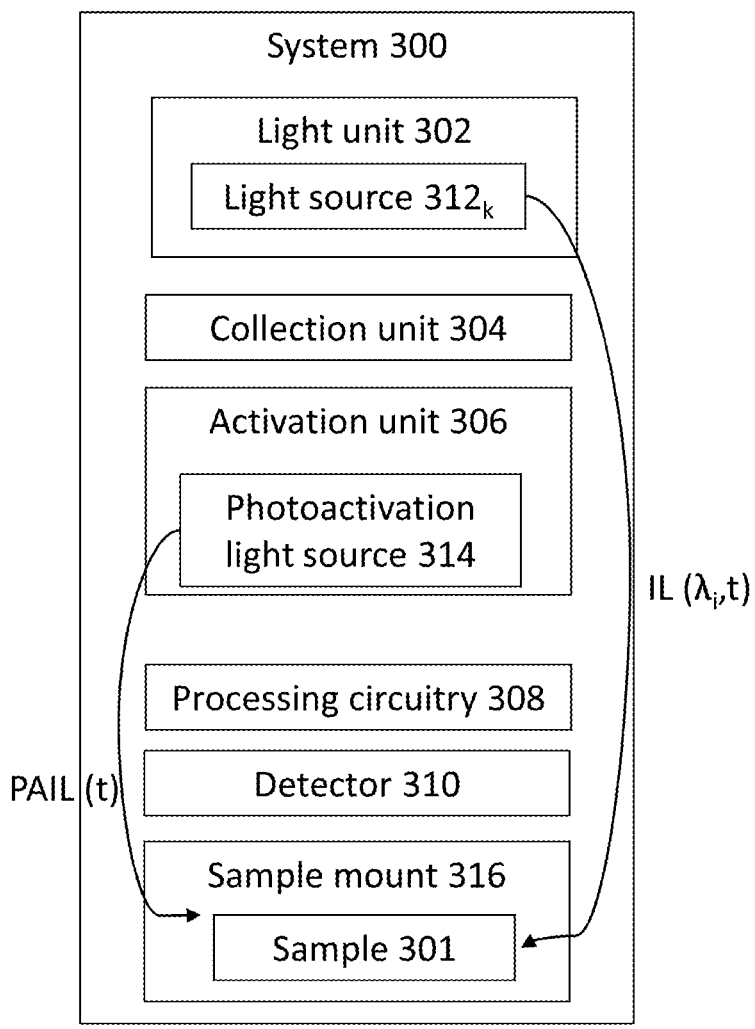

FIGS. 3A-3C show block diagrams exemplifying selected embodiments of the system of the present disclosure. FIG. 3A shows a system 300 that includes a light unit 302 that is configured for providing a selected temporal profile of illumination $IL(\lambda_i, t)$ of at least two different wavelength ranges towards a sample 301 for excitation of selected donor and acceptor fluorophores. The system further includes an activation unit 306 (e.g. photoactivation or chemical activation) for providing a desired temporal profile of activation means PAM(t) for selectively switching population of fluorophores in the sample 301 between active and inactive states. The selected population of fluorophores may be a selected portion of either the donor or the acceptor population. In some embodiments, the activation unit 306 is configured to provide activating means for activating a relatively small portion of the donor fluorophores population. The means of activating may be selected, for example, from chemical or optical means. Generally, the activation unit 306 is adapted to provide one or more activation signals, e.g. illumination pulse in activation wavelength range, drop of solution with activation chemicals, etc. The activation signal is typically selected to be very weak, to allow activation of only a few of the donor fluorophores, e.g. effectively activate up to 1 or up to 10 fluorophores within a region of a size associated with diffraction spot of the optics used in the sample of fluorophores (possibly of the order of $10^{18}$-$10^{23}$ fluorophores in the sample). For example the activation signal may be sufficiently weak, as having activation probability of $1:10^{10}$ to $1:10^{23}$ of fluorophores.

A collection unit 304 of the system is configured for collecting the light emitted from the sample $EM(\lambda_j, t)$ over time, in response to illumination $IL(\lambda_i, t)$. The collection unit 304 is further configured to direct the emitted light $EM(\lambda_j, t)$ towards a detector 310 that may be part of the system 300 or external thereto. To this end, the collection unit 304 may include at least one spectral filer and one or more imaging lenses forming an imaging lens arrangement. The spectral filter is typically selected for transmitting light of third wavelength range (typically associated with emission of the donor fluorophores) for detection. The imaging lens arrangement (optical arrangement) may be configured for imaging one or more selected planes within the sample onto an image detection plane (e.g. where a detector unit is positioned). In some configuration, the collection unit is configured for general light collection, while not providing spatial image of the region of the sample, allowing detection of variation intensity of light emission from the donor fluorophores. The system may also include a processing circuitry 308, being integral part of the system or provided by an external processing circuitry (e.g. computer system). The processing circuitry 308 may be configured for transmitting light unit operational data LOPD for operating and controlling the light unit 302 to provide the desired illumination profile $IL(\lambda_i, t)$, and transmitting activation unit 306 operational data POPD for operating and controlling the photoactivation unit 306 to obtain the desired profile of photoactivation means PAM(t). The desired illumination profile $IL(\lambda_i, t)$ includes at least a desired intensity-modulated illumination profile suitable for exciting acceptor fluorophore in the sample at a selected known pattern.

FIG. 3B includes all the elements of FIG. 3A, therefore the description of the FIG. includes merely the additional/different elements with respect to FIG. 3A. In FIG. 3B the system 300 includes a detector 310 that is configured to detect the light emitted from the sample $EM(\lambda_j, t)$ and to generate detection data DD(t) indicative of the intensity profile of the emission over time. The detector 310 is further configured to transmit the collected data DD(t) on intensity variations to the processing circuitry 308 for processing thereof and identifying FRET events therein. As indicated above, the collected data may include general intensity variations, or be in the form of image data pieces providing spatial distribution of intensity emitted from fluorophores in the sample and variation thereof.

FIG. 3C includes all the elements of FIG. 3B, therefore the description of the figure includes merely the additional/different elements with respect to FIG. 3B. In FIG. 3C, the light unit 302 includes one or more light sources $312_k$ (e.g. two or three light sources), each light source $312_k$ is configured to illuminate light of a selected different wavelength $IL(\lambda_i, t)$ suitable for exciting different fluorophores. Typically, the light unit 302 may include first light source for the donor exciting wavelength and second light source for the acceptor exciting wavelength. In this embodiment, the activation unit 306 includes a photoactivation light source 314 configured for providing a photoactivation illumination PAIL(t) suitable for switching desired population of fluorophores from non-active state to photoactive state, namely to a state in which they can exhibit fluorescence. The illumination provided by of the light unit 302 and the by photoactivation unit 306 is directed towards a sample 301 generally positioned on (or in) a selected sample mount 316 defining location of the sample and may be configured for holding the examined sample 301.

In any of the embodiments exemplified in FIGS. 3A-3C, the processing circuitry may be configured for receiving and processing the detection data DD(t) (being image data and/or general intensity data) detected by the detector for identifying a FRET event. Generally, the system 300 as described herein may be operated in accordance with one or more detection schemes. In some embodiments, the activation unit 306 is operated to provide low activation signal (e.g. very low illumination intensity for photoactivation, or to small amount of activation chemicals) to switch only a few of the fluorophores to active state. The light unit 302 operates the respective light sources $312_k$ thereof, to provide illumination of a first, donor excitation, wavelength range and a second, acceptor excitation wavelength range, while the second, acceptor excitation wavelength range is modulated in a selected modulation profile. The collection unit 304 and the detector 310 are operated together for collecting temporal variations in emission of light associated with donor fluorescent wavelength (donor emission) and transmit data on collected light to the processing circuitry 308. The processing circuitry 308 is generally operated for processing of the collected signal. Generally, the processing is directed to identify, in the collected data of the donor emission signal, modulation profile corresponding to the modulation of illumination of the second, acceptor excitation, wavelength range. Detection such matching modulation and the intensity thereof indicates potential frustrated FRET events in the sample, associated with the sought molecular structure that allows nearby binding of the donor and acceptor fluorophores. The detection of the FRET events may generally be performed by selecting one more time windows in the detection data, associated with activation of the fluorophores by the activation unit 306, and analyse the data in these windows to identify variation of the intensity of the emission of the donor matching to the selected intensity-modulated illumination profile.

In the figures throughout the application, like elements of different figures are given similar reference numerals shifted by the number of hundreds corresponding to the number of the respective figure. For example, elements 402 in FIGS. 4A and 4B serve the same function as elements 302 in FIGS. 3A-3C.

Figure 4A:
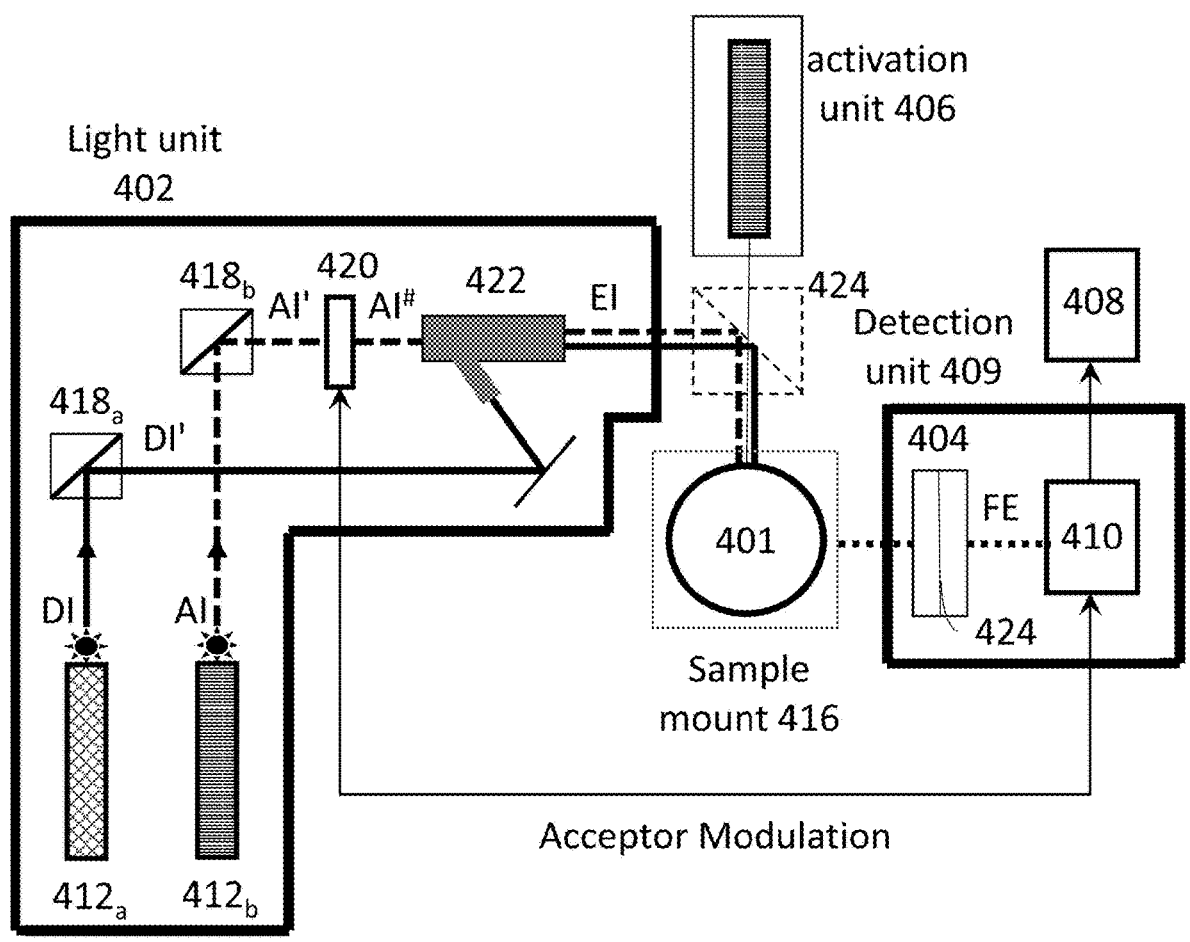
FIGS. 4A-4B are schematic illustrations of non-limiting examples of different embodiments of the system according to an aspect of the present disclosure.
Figure 4B:
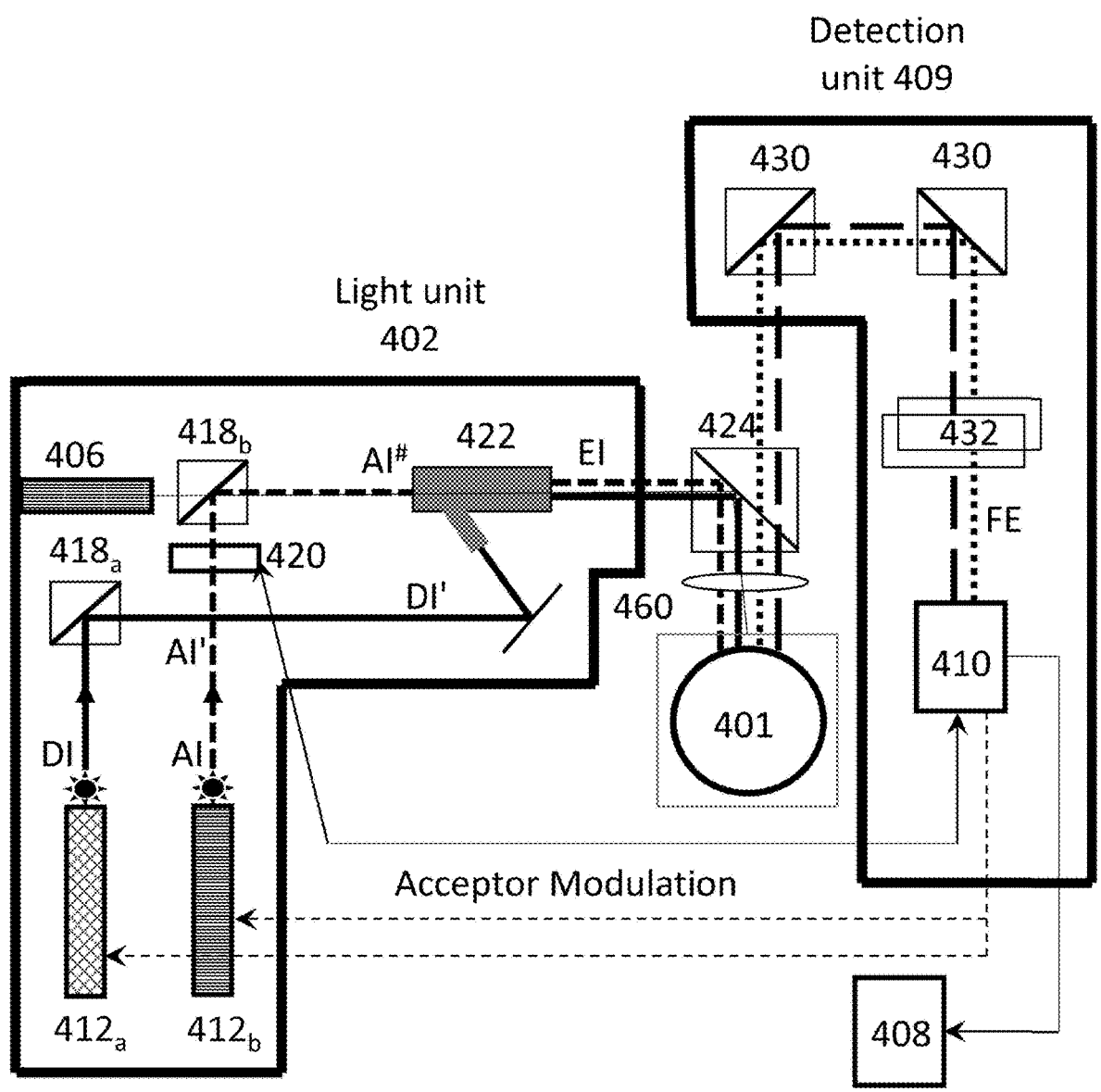

FIGS. 4A-4B are schematic illustrations of non-limiting examples of embodiments of the system of the present disclosure. FIG. 4A shows a system (e.g. fluorimeter system) that includes a light unit 402 configured for illuminating a sample 401, and a detection/collection unit 409 configured for collecting and detecting optical emission from the sample, activation unit 406, and a processing circuitry 408 operable for processing the collected data. The light unit 402 includes a first donor light source $412_a$ and a second acceptor light source $412_b$ for providing respectively illumination of first wavelength range DI suitable for excitation of selected donor fluorophores, and illumination of a second wavelength range AI suitable for exciting acceptor fluorophores. For example, the system may include donor and acceptor monochromators/spectral filters $418_a$ and $418_b$ for filtering the illuminations to obtain illumination of relatively narrow wavelength range, e.g. monochromatic donor illumination DI' and monochromatic acceptor illumination AI', respectively. Generally, such monochromators may not be used, when the light unit 402 utilizes monochromatic light sources $412_a$ and $412_b$ such as laser light sources. Light of the second wavelength range AI is modulated, e.g. by an acceptor modulation unit 420, or directly by modulating operation of light source 412b. the modulation generally includes a desired temporal acceptor illumination intensity profile $AI^\#$. For example, light unit 402 may operate to provide pulsed illumination of the second wavelength range, having selected pulse rate or selected profile of pulse train. The modulation may include variation profile of the intensity of illumination in the second wavelength range used to excite the acceptor fluorophores in the sample.

The light provides by first and second light sources $412_a$ and $412_b$ is further directed toward the sample, e.g. via beam combiner 422 configured for combining the two illuminations into a single excitation beam EI and directing it, e.g.

using one or more optical elements, towards the sample 401 generally located on (or in) sample mount/chamber 416.

Figure 5:
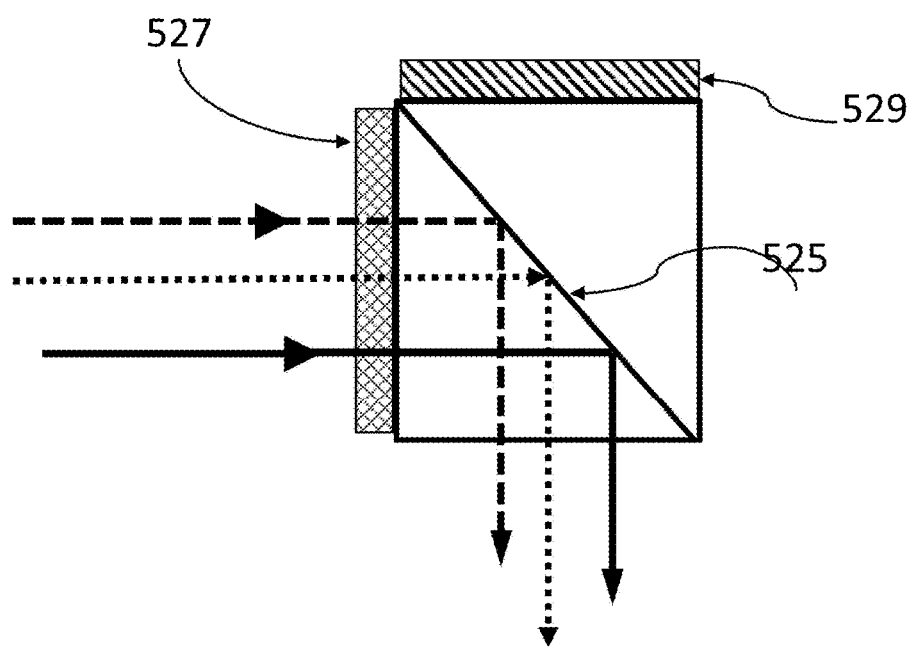
FIG. 5 is a schematic illustration of an example of a filter being used in the system of the present disclosure.

The system may include a filter cube 424 (shown in a dotted line in the figure). A non-limiting example of a configuration of a filter cube is shown in FIG. 5. The filter cube 524 includes a two-channel dichroic mirror 525, an excitation filter 527, and an emission filter(s) 529 having one or two transmission windows. In some embodiments, the filter cube includes merely the two-channel dichroic mirror to direct the modulated dichromatic excitation light beam to the sample chamber.

The detection/collection unit 409 generally includes a collection arrangement 404 and detector 410. The collection arrangement 404 (e.g. optical arrangement and selected wavelength filters) configured to collect light associated with emission of the fluorophores FE from the sample and direct it towards the detector 410, which in turn is configured for detecting the emitted light of the fluorophores and generating detection data pieces indicative of the intensity profile over time of the donor emission with a selected sampling rate. The collection arrangement includes one or more wavelength selective filters 424 positioned to filter collected light enabling detection of only selected wavelength range. Generally, the wavelength selective filter 424 is selected to allow collection of wavelength range associated with emission of the donor fluorophores (Em1). The collection arrangement 404 may include one or more imaging lenses for imaging a selected region of the sample onto an image/detection plane (where the detector 410 is positioned. In some configurations, the collection arrangement may be configured to integrate collected emission from the sample, thereby transmitting general intensity data to the detector 410, not specifically associated with image of the sample. The processing circuitry 408 is configured to receive data on the collected emission intensity over time and to process it to identify one or more FRET events therein. In some configuration the collected data may be in the form of detection data enabling processing of selected regions in the sample, in some other configuration the collection field of view may be limited, to allow collection from relatively small region of the sample, providing effectively single detection point. The detector sampling rate may be synchronized with modulation of the second wavelength range $AI^{\#}$, to provide sampling rate providing Nyquist condition for sampling (i.e. being at least double the fastest frequency of modulation of the second wavelength range).

The activation unit 406, exemplified herein as optical activation unit 406 is configured to provide selective activation signal to the sample, to activate small portion of the fluorophores in the sample, thereby enabling single molecule detection. As indicated above, the activation unit 406 may utilize an activation light source providing optical illumination (e.g. UV or blue wavelength, or any wavelength range suitable for activation of the selected fluorophores in the sample) to cause photoactivation of at least the donor fluorophores in the sample. In some configurations, the activation unit 406 may utilize a drip providing small amounts of chemical reagents to provide chemical activation of the fluorophores. In some configurations, the system may not include a physical activation unit 406, but may include instructions indicative of activation protocol of the fluorophores to enable activation of small amount of the fluorophores in accordance with single molecule localisation microscopy (SMLM) techniques.

As indicated above, the present technique may operate by illumination a region of the sample and collecting detection data pieces of the illuminated region, thereby performing field detection of FRET events in the sample. This configuration allows to localize the detected FRET events and thus determine location of the respective molecular structure that allow nearby binding of the donor and acceptor respective probes. In some other configurations, the system of the present technique may be configured to operate in a confocal microscope configuration, i.e. utilize an objective lens for directing the exciting (and activating) illumination onto a small point in the sample, and collect light smutted for the respective small point. This configuration allows scanning of the sample and may provide high resolution data, typically at the cost of time, alternatively, the confocal detection volume may remain stationary and molecules are replaced within through diffusion or flow.

To this end, FIG. 4B shows an exemplary configuration of the system of the present disclosure in the form of microscopic system allowing microscopy functionality and may operate for wide-field microscopy and/or as confocal microscope system. This configuration differs from that of FIG. 4A by that the collection unit includes guiding optics 430 and an emission filter 432 configured to transmit light associated with emission of the donor fluorophores or donor and acceptor emission in a sequence towards the detector 410, and optical lens 460 (e.g. objective lens unit) focusing the light and providing collection of light from a selected focal point in the sample 401. Furthermore, in this embodiment the filter cube 424 may be configured to receive and transmit the illumination of the two wavelength ranges to the sample chamber 416 and to filter out the emitted light from the sample and to transfer it to the detection unit 409. It should be noted that the activation unit 406 is not specifically shown herein, but may typically be used to provide optical activation, chemical activation or other activation techniques, to small amount of the fluorophores enabling single molecule localization microscopy techniques. In some configurations the use of confocal microscopy enables monitoring while not requiring selective activation of the fluorophores, this is partly due to the small region being inspected, that reduced the amount of fluorophores within the region.

Figure 6A:
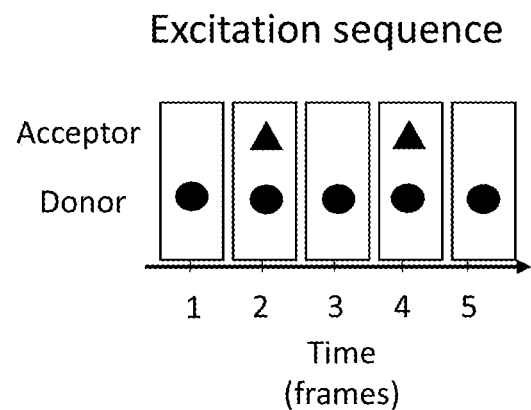
FIGS. 6A-6B are schematic illustrations demonstrating the excitation illumination sequencing and the detected illumination profile.
Figure 6B:
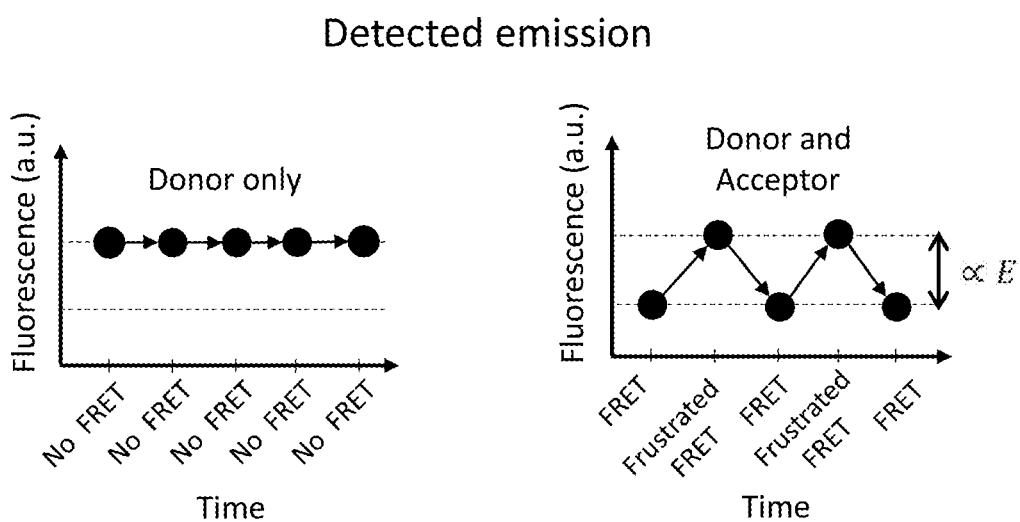
Figure 7A:
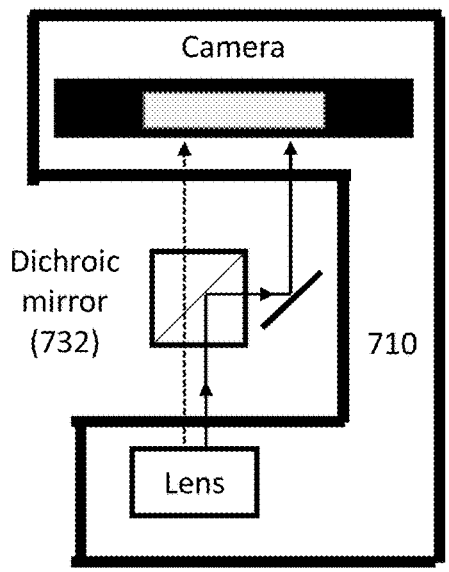
FIGS. 7A-7D are schematic illustrations of non-limiting embodiments of four different configurations of the detection unit of the system of the present disclosure.
Figure 7B:
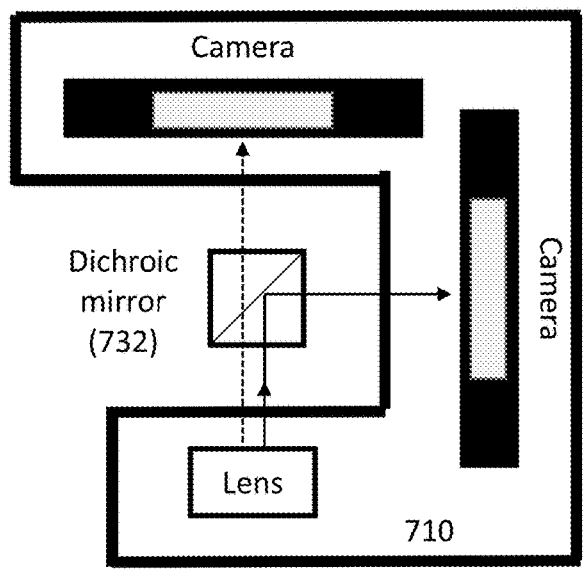
Figure 7C:
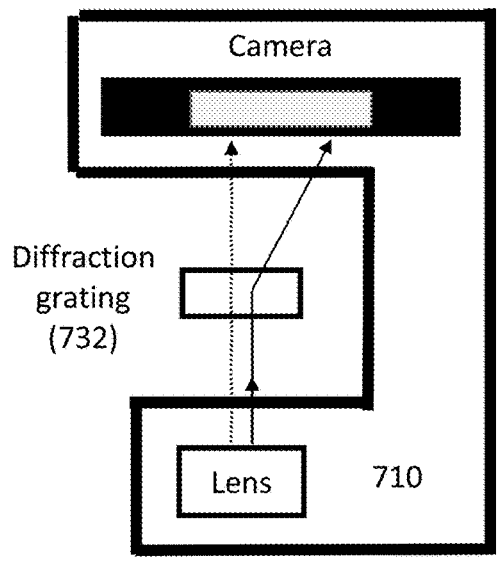
Figure 7D:
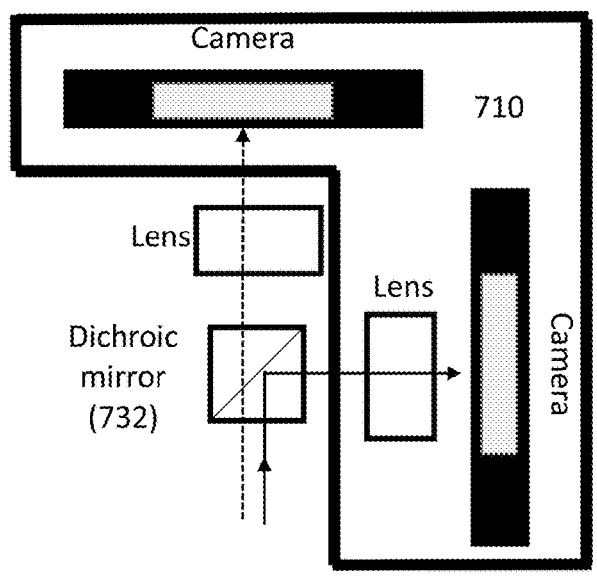

Reference is now made to FIGS. 6A-6B schematically demonstrating the excitation illumination sequencing during the imaging according to the present technique. FIG. 6A exemplifies modulated excitation of both the donor and the acceptor as a series of pulses over time, donor pulses are marked by cycle and acceptor pulses are marked by triangles. During monitoring/imaging the donor light source for donor excitation may operate continuously or by pulses to provide illumination within consecutive frames. The acceptor excitation light source is modulated, e.g. effectively providing illumination within alternate frames. FIG. 6B schematically shows that for a FRET donor-acceptor pair, the frustrated FRET caused by the acceptor-modulated excitation, results in modulation of the fluorescence emission intensity of the donor. The intensity difference between the frames with the frustrated FRET and with the regular FRET is linearly related to the FRET efficiency.

As seen in FIG. 6B, for a donor-only sample (e.g. when no acceptor fluorophore is close enough to any given donor fluorophore), no change in the donor intensity is detected. Modulating the excitation of the acceptor fluorophore in a known frequency domain, for example in alternate frames as shown in FIG. 6B, while the donor is excited, lead in turn to synchronised modulation in the emission intensity of the donor. This process makes it possible to use lock-in detection in order to differentiate between donor molecules that were part of the FRET pair and those that were not.

Reference is now made to FIGS. 7A-7D, which are schematic illustrations of non-limiting embodiments of four different configurations of the detection unit, in particular the configuration of the collection unit with respect to the detector, when configured to allow detection of donor and acceptor emission light. As shown, the collection unit 710 in these examples utilizes a dichroic mirror or diffractive grating, configured to direct light of wavelength range associated with donor emission to one detector (or a portion of a detector) and light of wavelength range associated with acceptor emission to another detector (or another part of the detector), thereby enabling to differentiate between donor and acceptor emission. It is to be noted that the processing circuitry may be in data communication with the light sources of the donor and acceptor to control their operation to obtain the desired illumination profile. In some embodiments, the detector and the processing circuitry are components of a mobile device, e.g. a smart phone or a tablet having suitable detection capabilities and computing power. The processing circuitry may transmit the results of the measurements to an external memory, which can be a mobile device (such as a smartphone), desktop computer, server, remote storage, internet storage, or diagnostics cloud.

FIGS. 8A-8C are flow diagrams of non-limiting examples of embodiments of the method according to an aspect of the present disclosure. FIG. 8A exemplifies a method that includes controlling a portion of activated (e.g. photoactivated) fluorophores in a sample 852. This can be performed by providing selected activation signal utilizing activation means such as illumination suitable for photoactivation, adding reactants to the sample to react with the fluorophores to activate them, or by passive means, namely by controlling the number of fluorophores in the sample that perform spontaneous photoactivation. By controlling number and/or density of the fluorophores, the sample can be designed such that at any time a desired relatively low number of fluorophores are photoactivated to allow single molecule localisation microscopy (SMLM) by using FRET techniques according to the present disclosure. For example, at any time, the number of active fluorophores (e.g. donor fluorophores) is sufficiently low to provide single molecule detection. The activation means are selected according to the fluorophores in the sample. Each type of fluorophores may be activated with a different approach, namely optic-based, chemically-based or spontaneous photoactivation. Generally, the portion of activated fluorophores may be in the order of one to several billion, one to trillions, or one to $10^{20}$ or more. Typically, the fluorophores may be activated in response to a selected activation signal. The activation signal is selected to be sufficiently weak so as to activate a very small amount of the fluorophores, providing a few single fluorophores in the sample being in active state. This can be done by providing very low intensity of optical activation, or very small amount of chemical reagents for chemical activation.

The method further includes illuminating the sample with a selected temporal profile of a first illumination wavelength 854 (e.g. continuous illumination, series of pulses etc.) suitable for excitation of donor fluorophores and a selected temporal profile of a second illumination wavelength 856 suitable for excitation of acceptor fluorophores. The temporal profile of the second illumination wavelength is different than the modulation of the first wavelength range, and is selected to provide clear variation in excitation of the acceptor fluorophores for similar excitation level of the donor fluorophores between sampling events. The illumination profiles are selected to result in a variation of the emission of the donor fluorophore over time in correlation to the second illumination profile. The acceptor is alternately saturated to alternately block the FRET process (frustrated FRET).

The method further includes collecting and detecting the emitted light from the sample 858 and generating sampling data (e.g. detection data sequence) indicative of the variation of the intensity of the detected light over time 860.

FIG. 8B is another example of the method that differs from that of FIG. 8A by including processing the detection data and identifying FRET events therein 862. The processing may include identifying sequences of sampling events following activation of a portion of the fluorophores in the sample, and identifying within such one or more sequences, variation in donor emission associated. The variation of donor emission is compared to the modulation of second acceptor excitation illumination, to indicate frustrated FRET events. For example, frequencies of the detected variation in donor emission may be compared to frequencies of modulation of the (second) acceptor exciting illumination within the relevant time windows. Analysing the relevant frequencies within time window, to determine correlation between the modulation frequencies of the detected emission and the temporal profile of the illumination of the second wavelength range, provides data indictive of FRET event and may include data on amount of such events, their location, and distance between the donor and acceptor in each event (based on intensity of the modulation). It is to be noted, that the analysis may also include determining the FRET interaction distances of each FRET event.

The example of FIG. 8C differs from that of FIG. 8B by including providing a sample and mixing it with a population of donor and acceptor fluorophores 850. As indicated above, the fluorophores are generally associated with molecular probes having affinity for bonding with selected molecular entities/structures (e.g. sequences) in the sample. The donor and acceptor fluorophores are adapted for association with binding sites of substances in the sample. The association with the selected binding sites may be specific to selected binding sites (using predetermined chemistry or recognition) or non-specific binding that may be through adsorption of the molecules to the substance on any of multiple possible sites.

The fluorophores are associated with the probes selected to be suitable for identifying specific substances in the sample. For example, the fluorophores may be associated with probes suitable for binding to binding sites of a substance, such that upon binding of the donor and acceptor to the target binding sites, a FRET interaction may be occurred and identified. The example of FIG. 8C further includes outputting output data 864 indicative of the detected FRET events and/or their parameters, e.g. interaction distances.

It is to be noted that the method of the present disclosure may be obtained by any combination of method elements described in any of the embodiments in FIGS. 8A-8C.

The inventors have conducted experimental research for improving and validating the present technique.

Examples

Figure 9A:
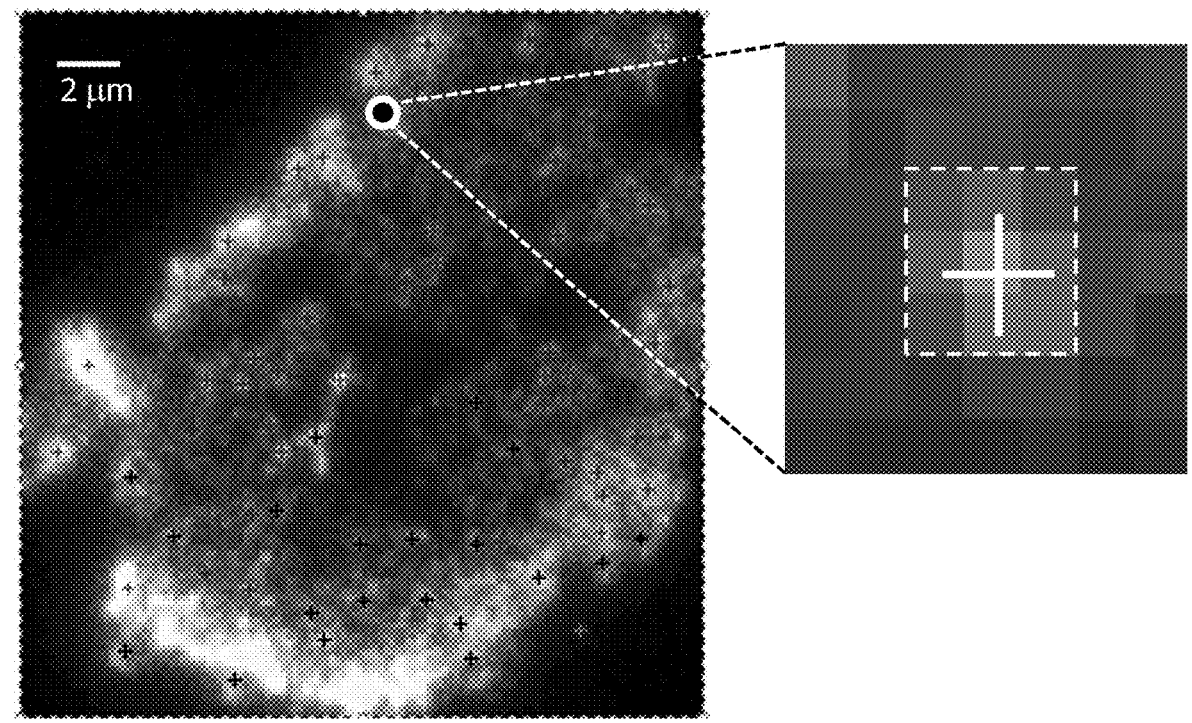
FIGS. 9A to 9D exemplify detection of single FRET event and localization of detected event according to the present technique.
Figure 9B:
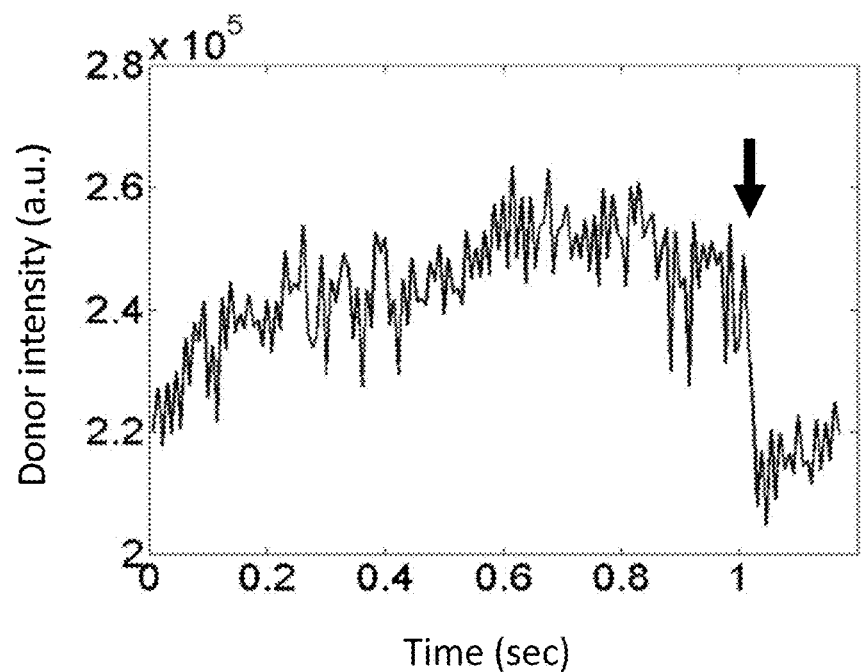
Figure 9C:
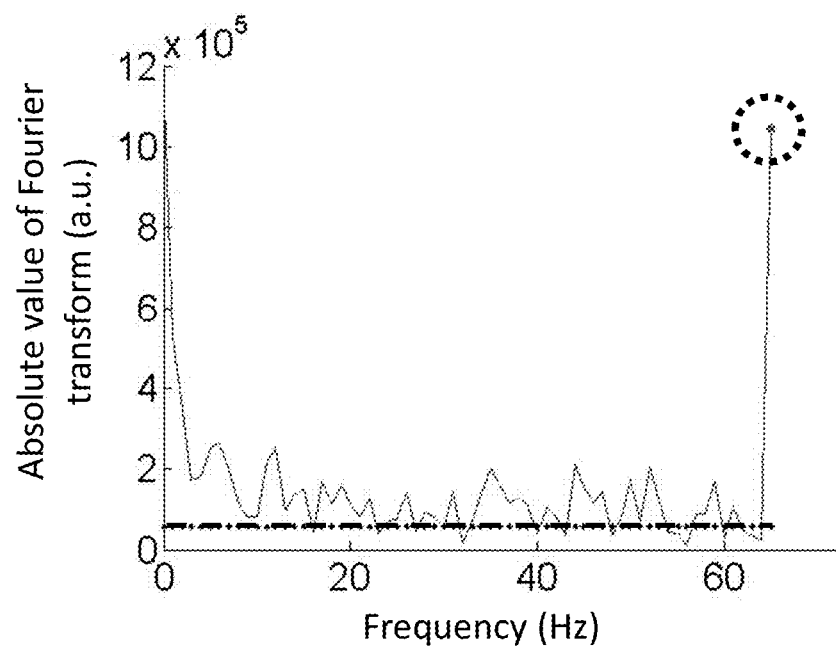
Figure 9D:
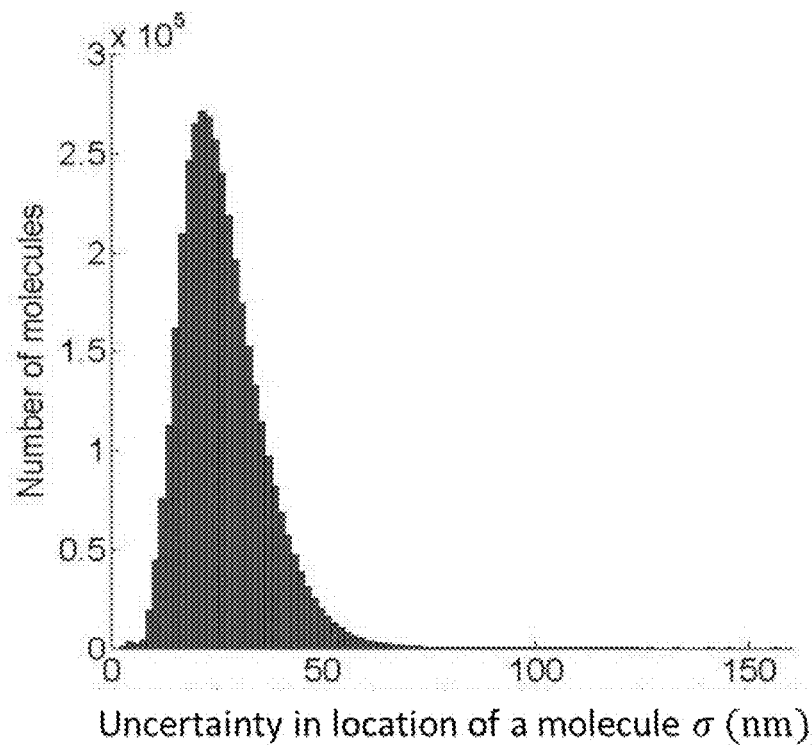

Reference is now made to FIGS. 9A-9D exemplifying detection of sites of single FRET events in a sample according to the present technique. FIG. 9A is one representative frame out of a movie of a cell acquired via an SMLM imaging technique known as direct Stochastic Optical Reconstruction Microscopy (dSTORM). In this figure the PAGFP Actin is conjugated to selected fluorophores (Alexa Fluor® 555 and Alexa Fluor® 647). FIG. 9B shows variation in collected donor emission intensity; FIG. 9C shows temporal frequencies of the collected intensity variations of FIG. 9B, and FIG. 9D shows histogram exemplifying uncertainty in localization of detected molecules. The PAGFP in this example is not initially excited and the emission of Alexa Fluor® 647 is filtered out. The crosses mark the position of single molecules that are localized in the analysis that is done after the imaging. The white square with a black cross in the center marks the position of a single molecule (in the magnified image in FIG. 9A), being analysed in FIGS. 9B-9C. The photons emitted by the molecule are collected from the pixel where the molecule is localised and the eight surrounding pixels.

FIG. 9B shows a time trajectory of the fluorescence intensity of the molecule. This molecule was detected over time in 132 consecutive frames. FIG. 9C shows the absolute value of the Fourier transform of the time trajectory of the intensity. The dashed circle with a dot in the center indicates the modulation frequency (sampling rate was selected to provide Nyquist frequency with respect to the modulation), the dashed line marks the median of the absolute values of the Fourier transform for all the frequencies. FIG. 9D demonstrates the accuracy of the experiment with the number of molecules as a function of uncertainty in location of a single molecule. In this example, the frequency data was determined using moving window temporal Fourier Transform on the collected emission intensity. The windowed Fourier transform includes varying time segments, ranging from 8 frames to 208 frames with jumps of 8 frames (i.e. segments with number of frames of 8, 16, 24, etc.) used in the analysis. The Figure of Merit (FOM) for each time segment was calculated and indicated further below. For each detected molecule, the highest FOM is chosen to be the FOM of the detected molecule.

Generally, in SMLM techniques, single peaks are identified in each frame and are grouped over space and time to yield the time-dependent emission of single molecules. The location of the single donor molecules was detected using an "ImageJ plug-in" algorithm In an exemplary system of the present disclosure, the size of each pixel in the camera was 160 nm. Diffraction limit was about 200 nm and so is the order of the size of the point spread function (PSF). Therefore, the photons that are emitted from a single molecule are also collected by the pixels of the camera that surround the pixel where the emitter is detected. As shown in FIG. 9A, the intensity of each emitter molecule in the frame is determined by summing the intensity of the pixel where the molecule is localized and the intensities of the eight surrounding pixels (the grouping distance is set as four times the average uncertainty of all detected peaks).

The signal from peaks are grouped in consecutive frames into time trajectories of molecules, without allowing their disappearance (i.e. a gap time of 0). The grouping distance is set as 105 nm, which is four times the average uncertainty of all detected peaks, as clearly seen in FIG. 9D. Importantly, ThunderSTORM algorithm is employed throughout the analyses to discriminate detections of single molecules via their single molecule characteristics, namely their spatial and temporal intensity profile (see FIG. 9B), and their localisation uncertainty (see FIG. 9D).

A Fourier transform is performed on the intensity time trajectory for every donor molecule. Every donor molecule that is a part of a FRET pair and is at an 'on' state long enough (>8 frames) had a distinct frequency component at the modulation frequency. In the present case (see FIG. 9C), this component is shown as a high peak at the Nyquist frequency on the power spectrum, when compared to the median of the power of all the other frequencies, excluding the 'direct current' (DC) signal (i.e. the signal at 0 temporal frequency).

After determining the grouping distance, the time trajectories of intensities of all individual donor emitter molecules are determined, followed by determining a criterion to distinguish between the molecules that are influenced by the modulation of the acceptor in a FRET pair and those that are not. That is done by defining a figure of merit (FOM) that represented the extent of the FRET process for each donor molecule. The FOM is set as the ratio between the absolute Fourier component at the Nyquist frequency and the median of the absolute Fourier components for all frequencies, except for the DC signal. Larger FOM values indicate higher strength of the modulation of the donor emission relative to the background, and thus, a higher confidence for the existence of a FRET pair. It should be noted that the inclusion of more extended surrounding pixels in the calculation of the intensity per the PSF results in much noisier background, and the effective reduction of the signal to background of the intensity measurement. This is since the acceptor also photobleaches and can be in the "on" state for only some of the time period that the donor is "on", windowed Fourier transform is used in order to calculate the FOM value.

For the frustrated FRET process, the acceptor should be fluorescently active. However, in the present measurements, it is observed that the frustrated FRET process became negligible after about 3.6 sec from the initiation of the measurements, because of acceptor photobleaching (or entering prolonged dark-states). Correspondingly, the frustrated FRET is not effective after that time. Since only the molecules that are emitting while the effect is still significant should be tracked, the focus is made only on the donor emitter molecules that appeared in the first 1.54 sec of each movie (which includes about 210 frames). The signal is grouped from peaks in consecutive frames into time trajectories of molecules, without allowing their disappearance (gap time of 0). As mentioned above, throughout our analyses the ThunderSTORM algorithm is employed to discriminate detections of single molecules via their single molecule characteristics (specifically, intensity and localisation uncertainty), and via their intensity drop to the background level when they disappeared (bold arrow in FIG. 9B). Indeed, the vast majority of detected molecules are outside of the saturated regions and most of the molecules are shown in sparse areas in each frame.

After identifying the donor emitter molecules in FRET pairs, the FRET values are assigned into a particular dSTROM image, and thus created an image that provides information both on the super-resolved locations and the interactions of the molecules. On average, 33 molecules per cell were detected that had the FRET with an acceptor molecule. A Fourier transform then is applied on the time trajectory of the intensity of each molecule separately.

To determine whether a molecule is a part of the FRET pair, the ratio between the power of the frustrated FRET modulation frequency and the median power of all the frequencies is measured. The next step after the threshold is used in order to identify emitter molecules that are part of the FRET pair, is to assign the energy transfer efficiencies E of each molecule to a particular dSTORM image.

In general, a dSTORM image is a super-resolved image which represents all the detected peaks in the form of a Gaussian. The width of every Gaussian is the uncertainty in the location of the molecule. In addition to the super-resolved location of each and every molecule, information about the FRET between single emitters from the image is desired. This means the energy transfer efficiency from the FOM can be evaluated based on the modulation of the donor intensity, as follows:

$$E = 1 - \left[\alpha_{sat}\left(\frac{I_{sat}^D}{I^D} + \alpha_{sat} - 1\right)^{-1}\right], \quad (1)$$

where $I^D$ and $I_{sat}^D$ are the background-subtracted donor intensity values with and without the FRET, respectively, and $\alpha_{sat}$ is the fraction of the acceptors that is undergoing saturation and become FRET incompetent. For an individual FRET acceptor, $\alpha_{sat}$ can also be interpreted as the fraction of time over which the acceptor is saturated (including its occupying time of short-lived and reversible dark states). In the present assay, $\alpha_{sat}$ was a-priori unknown. However, the present ensemble measurements result in the ensemble efficiency E value of 0.26. It was also found that the ratio ($I_{sat}^D)/I^D$ is 1.33, on average (N=10 cells). From these measurements and the above relation for E, it is concluded that $\alpha_{sat}$ is about 1 in the present assay.

The values of $I^D$ and $I_{sat}^D$ are obtained from the emission of single donor fluorophores in the FRET pairs. In order to do that, first, in each time trajectory of donor intensity, the segments, in which the donor was fluorescent and where it abruptly photobleached (or entered a prolonged dark state), are identified. The background is calculated from the segment after photobleaching. The donor intensity with and without acceptor saturation ($I_{sat}^D$ and $I^D$, respectively) is determined by averaging the intensity just before photobleaching, guided by the windowed Fourier analyses and by subtracting the background. This stage also assists in the exclusion of erroneous data that passes the FOM test.

Figures 10A, 10B:
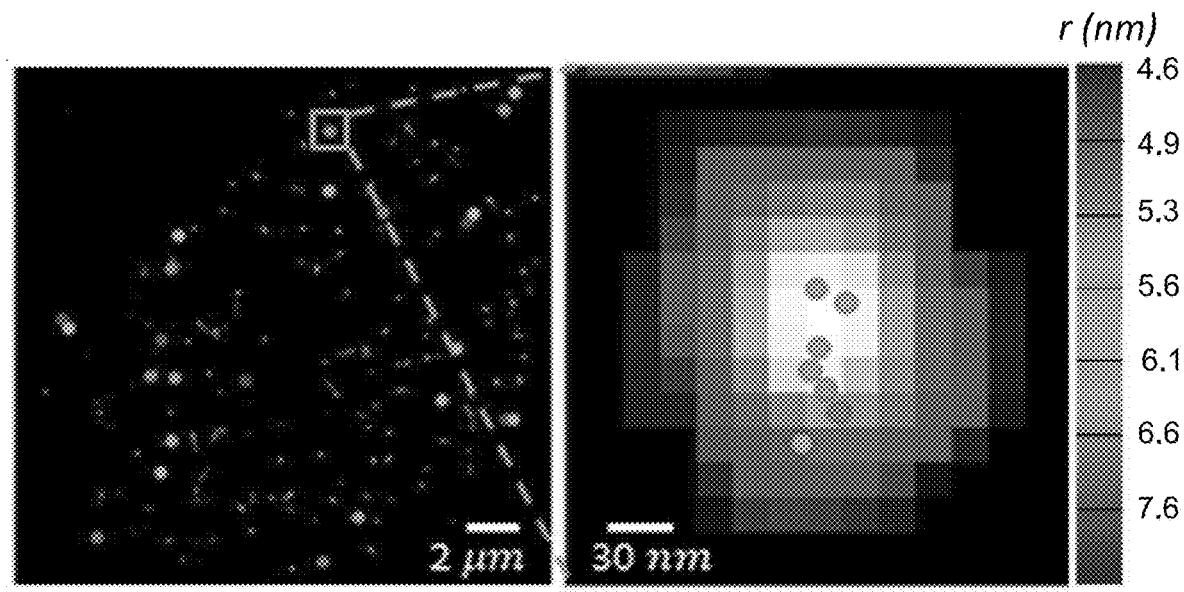
FIGS. 10A-10F exemplify sample images and corresponding magnification of selected target and respective detection histograms.
Figures 10C, 10D:
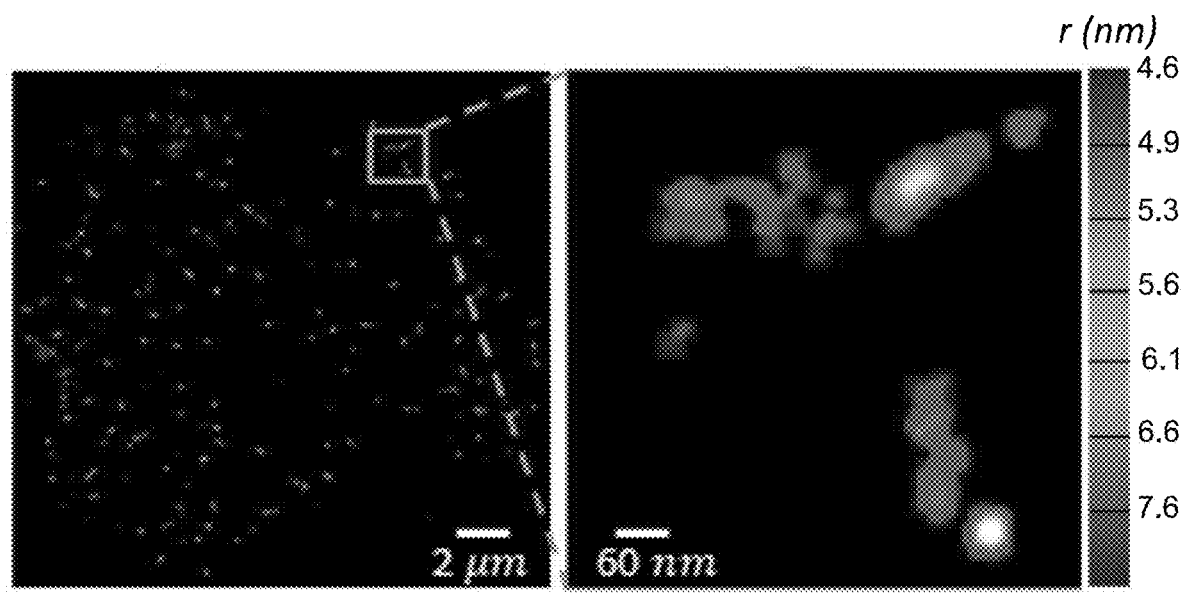

Reference is now made to FIGS. 10A-10F showing two STORM images and corresponding magnification of selected target and respective detection histograms. The image in FIG. 10A is for 'donor-acceptor', FIG. 10B shows magnification of a selected area of FIG. 10A, FIG. 10C shows 'donor only' field and FIG. 10D shows magnification of the selected region. In these images, the E values are assigned to the molecules that were detected as part of a FRET pair using a colour code (on right). The rest of the molecules that are detected in the cell, but are not part of FRET pairs, are not assigned with an E value. Note that the radii of the coloured discs representing individual FRET pairs are chosen to highlight the existence of multiple overlapping pairs in clusters (see the zoom in FIG. 10B and), and do not represent the localisation errors of these pairs.

In the full cell image (see FIG. 10A), the spots indicating emission from the individual pairs strongly overlap. The pixel size of the images demonstrated in FIGS. 10A-10D is 32 nm, which means that the resolution of the image is five times higher than the one that the camera provided. The bright pixels in all images represent identified emitter molecules. These molecules are found in the cell using the super-resolution dSTORM analysis for which no FRET value is assigned. The coloured Gaussians represent molecules for which the FOM is larger than the threshold of 4.5. The Gaussians with the assigned FRET is overlaid on top of the other molecules. The colour bars represent the energy transfer efficiency E calculated.

In the present example, we detected 47 molecules that had FRET interaction with an acceptor. FIGS. 10B and 10D show magnifications (zoom) of the corresponding pixels framed in FIGS. 10A and 10C. In FIG. 10B, three different molecules having different E values were detected under the magnification. The dSTORM-FRET image of a cell with the donor fluorophore only is shown in FIG. 10D. Only two molecules are detected in this cell, both are the false positive detections.

Figure 10E:
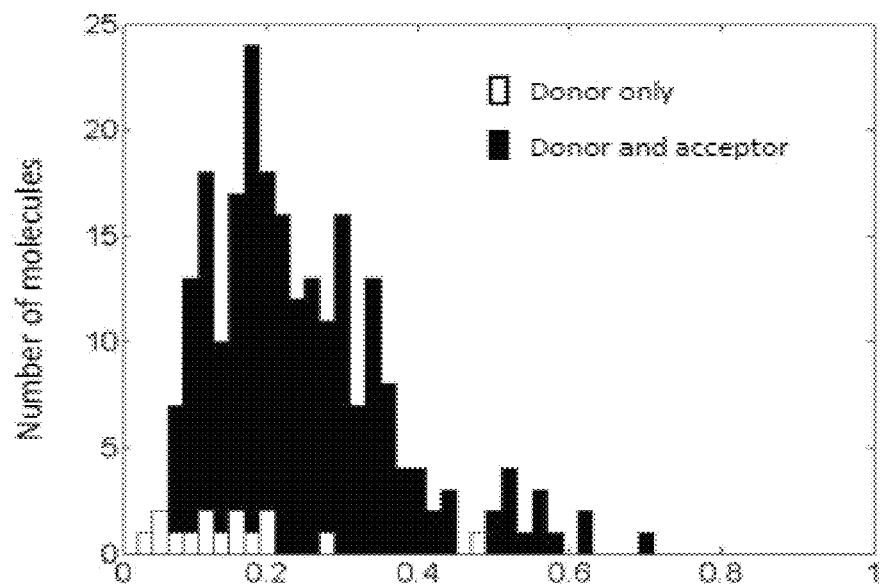
Figure 10F:
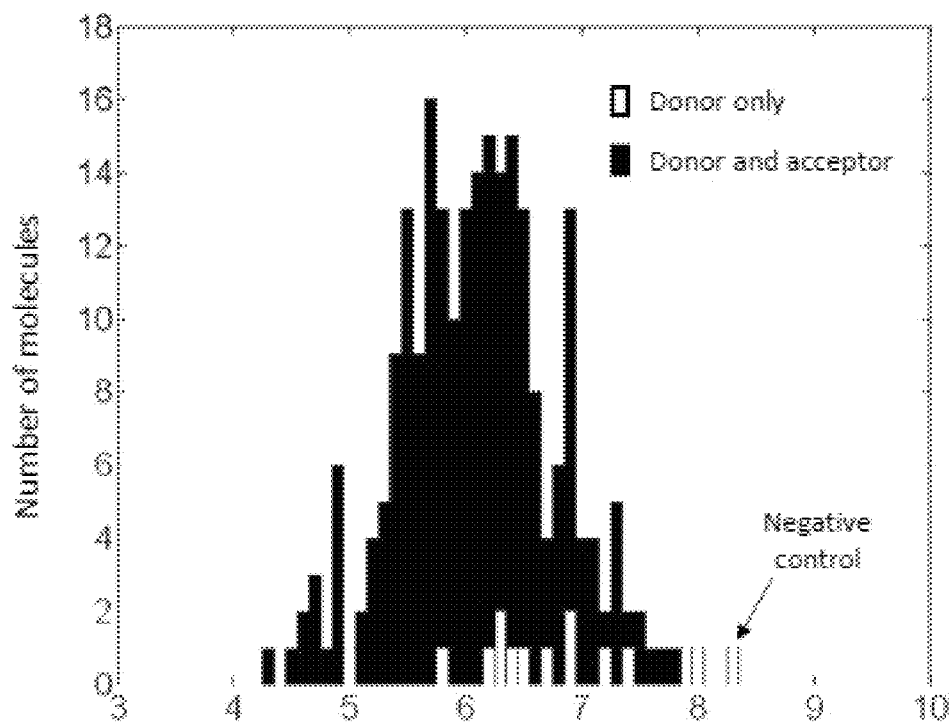

In FIGS. 10A-10D, the E values are assigned to the emitter molecules that are part of the FRET pair. The rest of the emitter molecules that are detected in cell are not assigned with any E value. Reference is now made to FIGS. 10E-10F showing the histogram of E (FIG. 10E) and the histogram of the distance distribution (FIG. 10F) calculated according to the first model for 18 cells having the donor and acceptor fluorophores. While the ensemble FRET measurements yield the average E and distance distribution, the use of single molecule FRET detection as described herein provides detailed information about the distribution for each detected site of a FRET event. Indeed, the FRET efficiency E values are not similar for all molecules and in the example of FIG. 10E range from 0.08 to 0.7. The average E value of the 18 cells was 0.260±0.018.

The ability of single molecule measurements to recover the ensemble averaged measurements is a critical test for the validity of the single molecule measurements. Indeed, it is noted that the average efficiency E value obtained by the dSTORM-FRET combined method of the present invention is within the error of the average E value of 0.226±0.040 found by the ensemble FRET measurements (for 10 cells).

The intermolecular distances between the donor and acceptor are determined from the measured FRET efficiency values. FIG. 10F shows the histogram of the intermolecular distance between the donor and the respective nearest acceptor, r. This data is calculated according to a nominal model of the physical system for 18 cells labelled with donor and acceptor fluorophores. The distance r ranged between 4 and 8 nm and averaged at 6.05±0.04 nm, as seen in this figure. The distances are calculated according to the first model with the total 527 emitter molecules in the cells. Heterogeneity in the E values and in the donor-acceptor distances is likely due to differences in the interaction geometry between fluorophore carrying probes and the target molecules, e.g. antibodies.

Thus, the developed method of single molecule FRET detection as described here, exemplified using dSTORM-FRET super-resolution techniques, allows to detect single interactions between primary and secondary antibodies in densely labelled cells. An upper limit to the distance between the donor and the acceptor fluorophore-labelled antibodies is then provided. Thus, for the first time, the present invention made it possible to obtain a super-resolved optical image of a cell in single-molecule detail and then to measure intermolecular distances that continuously span from single Angstroms to Microns.

The Förster theory provides a calculation for the distance between the donor and the acceptor assuming the energy transfer efficiency E is given. In the present assay, the primary antibody carried three donors. However, the present single molecule imaging approach ensures that there is a single donor fluorophore in each localization event under study, as the probability of having two donors in a fluorescent state at the same PSF is kept very low. Since the average number of Alexa Fluor® 647 fluorophores on the secondary antibody is 3 in the present disclosure, hence, the FRET between a single active donor and multiple acceptors may occur simultaneously.

Figure 11A:
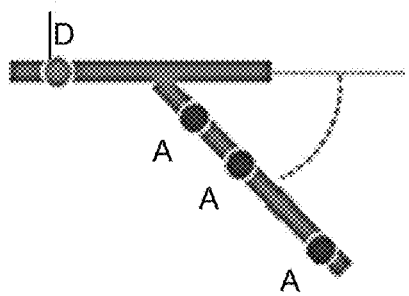
FIGS. 11A-11F exemplify a technique for determining distance between single donor fluorophore and respective (nearest) acceptor fluorophore according to some embodiments of the present technique.
Figure 11B:
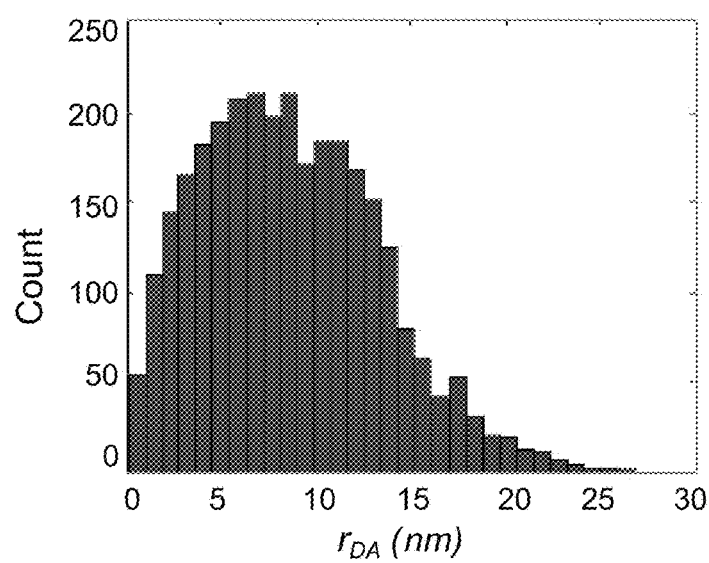
Figure 11C:
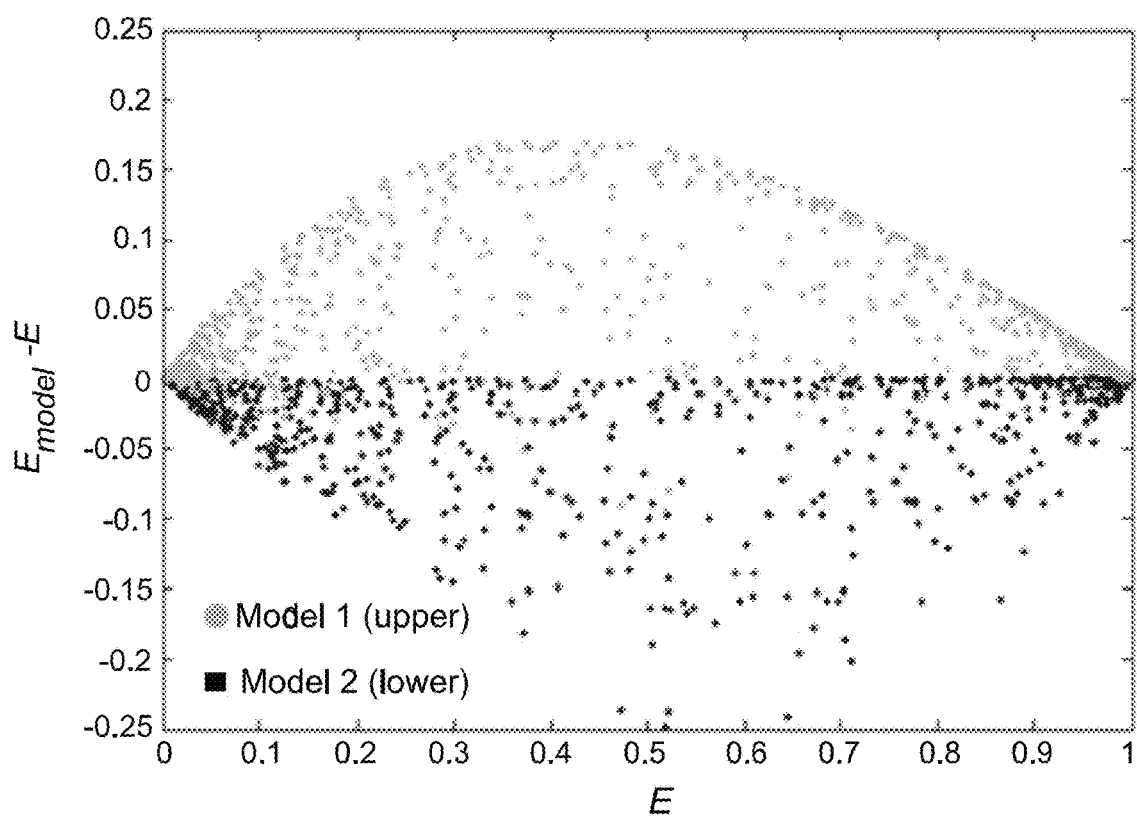
Figure 11D:
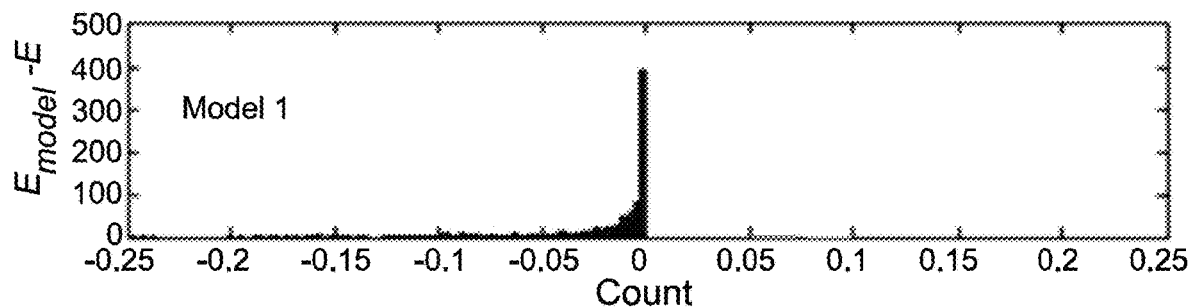
Figure 11E:
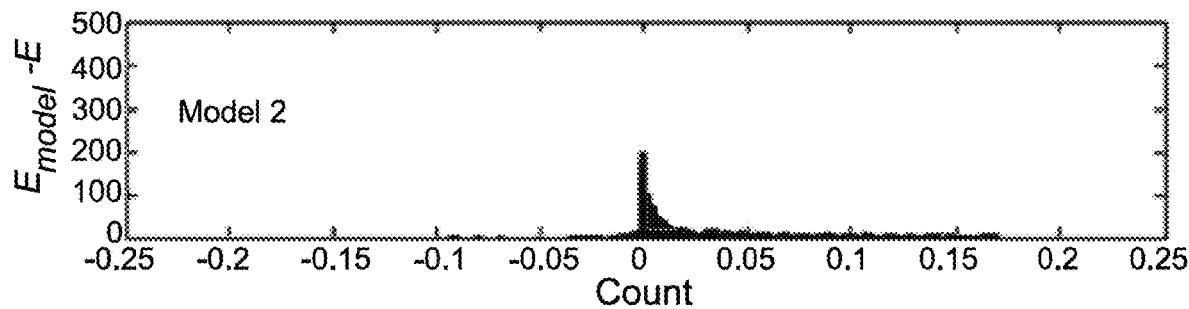
Figure 11F:
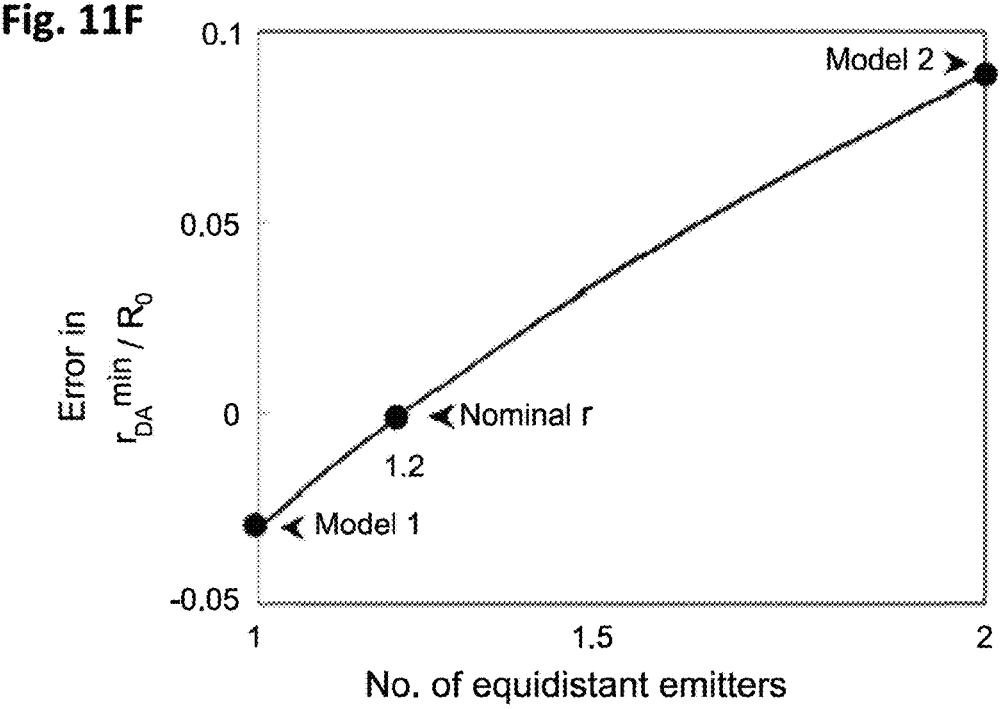

Reference is made to FIGS. 11A to 11F exemplifying a technique for determining distance between single donor fluorophore and respective (nearest) acceptor fluorophore according to some embodiments of the present technique. FIG. 11A exemplifies a model arrangement of single donor D associated with a molecular structure in vicinity to three acceptor fluorophores A. FIG. 11B is a histogram showing distribution of possible intermolecular donor-acceptor distances. FIG. 11C shows scattering graph of energy transfer efficiency and errors of the models in determining E (i.e. $E_{err}=E_{model}-E$) for all of the simulated realisations based on two selected models. FIGS. 11D and 11E show prediction errors of the two models $E_{M1}$-E and $E_{M2}$-E as a function of E. And FIG. 11F exemplifies an error plot for determining donor-acceptor distance.

First, two simple models are considered for the experimental system having a single donor and either a single or two-equidistant acceptors that are placed at the distance of the nearest acceptor, relative to the donor. Second, the experimental system having a single donor and three acceptors (see FIG. 11A) was modelled, multiple realisations of the system were simulated, and their distribution of all intramolecular donor-acceptor distances are shows in FIG. 11B.

Next, the two simple models are shown in FIG. 11C to serve as appropriate bounding cases for the detection of FRET event. From the distribution of the energetic errors, an effective model of the system that provides a nominal estimation for the transfer efficiency of the simulated experimental system is found. This effective model has a single donor and 1.2 equidistant acceptors.

Finally, each of the three models (models with n=1, 1.2 or 2 equidistant acceptors) are translated into estimates of the experimental donor acceptor distance $r_{DA}^{min}$, relative to a modelled $R_0$: n=1, yields the lower bound, n=2 yields the upper bound and n=1.2 yields a nominal estimate of $r_{DA}^{min}$.

For the estimation of donor acceptor distance $r_{DA}^{min}$, the distance between the single donor to the nearest acceptor, two models for the donor-acceptor interactions are used. The first model considers the FRET only between the donor to the single nearest acceptor. The contribution of the two other acceptors to the FRET process is neglected. The second model considers the FRET from the donor to two equidistant acceptors, placed instead of the nearest acceptor in the system. The contribution from the third, more distant acceptor, is neglected. As shown below, these models can serve to place lower- and upper-bounds to the $r_{DA}^{min}$ value. For that, the possible geometrical interactions between the primary (donor-carrying) and secondary (acceptor-carrying) antibodies were modelled (see FIG. 11A).

The two antibodies were modelled as thin rigid rods of length L=14 nm. This model accounts for the largest possible donor-acceptor distances in the experimental system. The locations of the donor along the primary antibody ($d_1$) and one of the three acceptors along the secondary antibody ($d_3^i$, where i=1, 2, 3) are set randomly along the antibodies' length.

The secondary antibody may bind the primary antibody at any point $d_2$ and at any angle θ which is proportional to [0, π] along the primary antibody length. With these definitions, the distance between the donor and any of the acceptors is given by:

$$r_{DA}^i = [(d_1 \sin θ)^2 + (d_2 + d_3 \cos θ - d_1)^2]^{0.5} \quad (A)$$

To test these models, we simulated 1000 random geometries. The distribution of $r_{DA}^i$ is shown in FIG. 11B. From these distributions, the effective energy transfer is determined based on the contribution of all of the acceptors ($E_T$) and the energy transfer due to the models $E_{M1}$ and $E_{M2}$, respectively. The contribution of each acceptor causes a relaxation rate of the donor:

$$k_t^i = 1 / τ_o \left(\frac{R_0}{r_i}\right)^6 \quad (B)$$

The effective relaxation rate due to the multiple acceptors is defined as:

$$k_T = \sum_{i=1}^{n} k_t^i \quad (C)$$

The sum of all relaxation rates of the donor is:

$$τ^{-1} = τ_0^{-1} + k_T \quad (D),$$

where $τ_0$ is the lifetime of the donor.

Accordingly, E is given by:

$$E = k_T τ = \frac{k_T}{τ_0^{-1} + k_T} \quad (E)$$

Based on Eq. (E), the $E_{M1}$ and $E_{M2}$ values of Model 1 (n=1) and Model 2 (n=2), respectively, are thus reduced to:

$$E_{M1} = \frac{k_t}{τ_0^{-1} + k_t} \quad (F)$$

$$E_{M2} = \frac{2k_t}{τ_0^{-1} + 2k_t} \quad (G)$$

FIGS. 11C-11E showing the prediction errors of the two models $E_{M1}$-E and $E_{M2}$-E as a function of E. It is noted that Model 1 yields a 100% lower bound of E, while Model 2 yields a 95% upper bound of E. Distribution of 50% positive and negative errors of the predicted E value requires a model where n=1.2. This model can now effectively replace the quantitative description of the present experimental system and serves as a baseline for the estimation of bounds to $r_{DA}^{min}$, as explained below.

The estimates for E are now translated into estimates for donor-acceptor distance $r_{DA}^{min}$. For Model 1, in order for a single acceptor fluorophore in this model to provide the measured (or simulated) energy transfer efficiency E, one needs to place it at a distance $r_{DA}^{M1}$ that is closer to the donor than in reality or in the simulations. Recall that the real (or simulated) system is now represented by a single donor and n=1.2 equidistant acceptors, located at $r_{DA}^{min}$. This is now chosen as a system of reference. Thus, the relation $r_{DA}^{M1} \leq r_{DA}^{min}$ can be set for 100% of the cases.

In order to determine $r_{DA}^{M1}$ in Model 1, the requirement $k_T = k_t$ is equivalent to the contribution of the reference system at distance:

$$r_{DA}^{M1} = \left(\frac{1}{1.2}\right)^{\frac{1}{6}} r_{DA}^{min}.$$

Conversely, for Model 2, in order for the two equidistant acceptors to provide the measured E, one needs to place them at a distance $r_{DA}^{M2}$ that is farther from the donor than in reality or in the simulations. Thus, the relation $r_{DA}^{M2} \geq r_{DA}^{min}$ can be set in 95% of the cases.

In order to determine $r_{DA}^{M2}$ in Model 2, the requirement $k_T = 2k_t$ is equivalent to the contribution of the reference system at distance:

$$r_{DA}^{M2} = \left(\frac{2}{1.2}\right)^{\frac{1}{6}} r_{DA}^{min}.$$

The position of this single acceptor can be interpreted as an effective upper bound on the distance of the nearest acceptor, which holds in 95% of the cases. Considering this as the nominal position of the nearest acceptor $r_{DA}^{min}$ yields a non-symmetric error on $r_{DA}^{min}$ of $-0.03 \times R_0$ and $+0.08 \times R_0$. (see FIG. 11F). Since in the present system, the value of $R_0$ was 51 Å, the obtained distance errors are $-1.5$ Å and $+4.5$ Å.

It should be noted that the present technique, when operated to enable single molecule detection of donor-acceptor FRET event may provide a well-defined system having single acceptor fluorophores in each FRET pair, therefore simplifying processing for determining donor-acceptor distance. In such a case, the errors in E typically excludes the ambiguity in the physical arrangements of multiple acceptors, and will is limited to errors defined by anisotropy of the measurements. As noted above, these errors are $\pm 3.8$ Å and may be reduced using optimal optical arrangement and super-resolution processing to be at least $\pm 3$ Å for the anisotropy values <0.05, and to less than $\pm 2$ Å for typical intramolecular FRET measurements.

Figure 12:
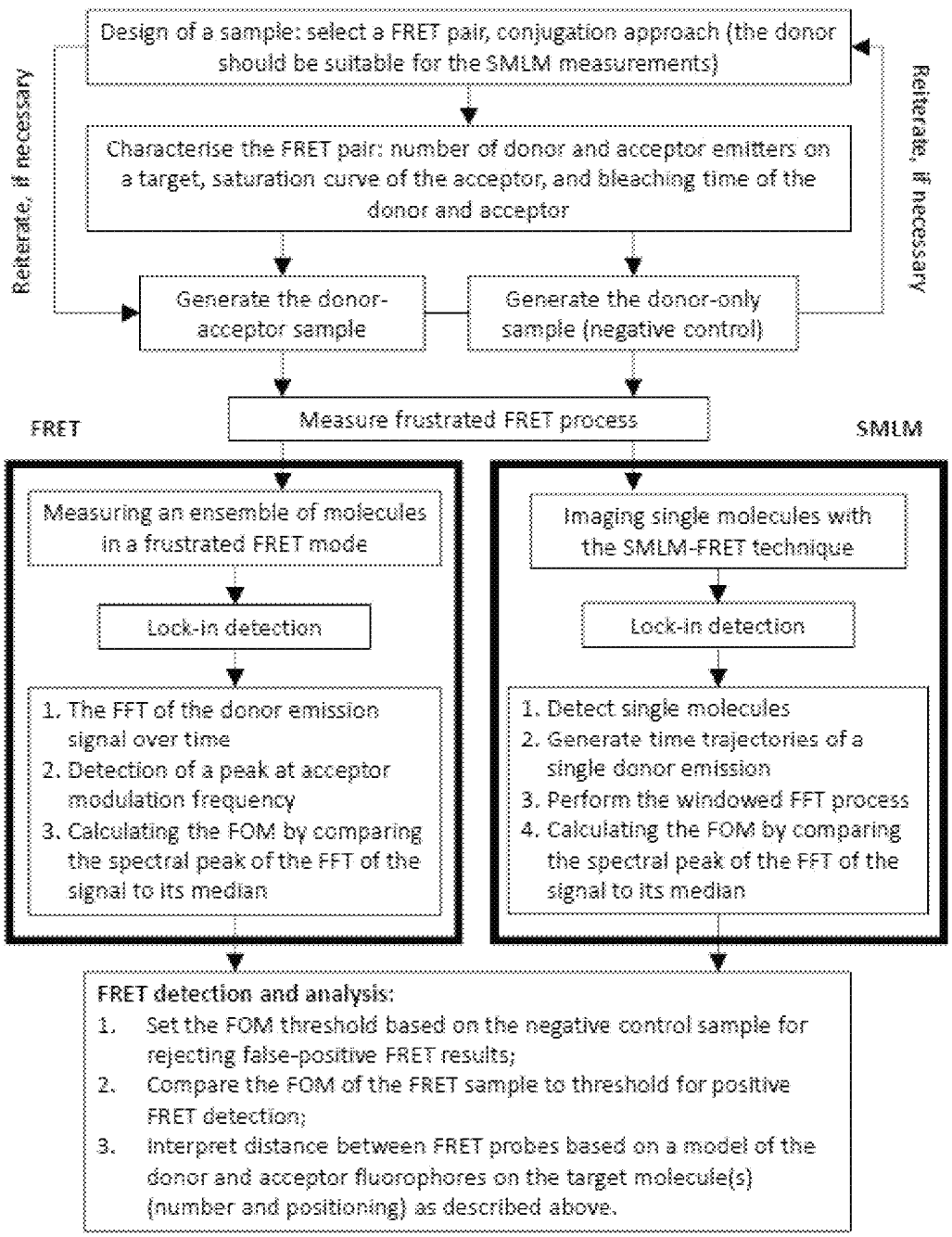
FIG. 12 schematically shows a flowchart for the FRET calculation used with the optical device of an aspect of the present invention operating in the frustrated FRET mode.
Figure 13:
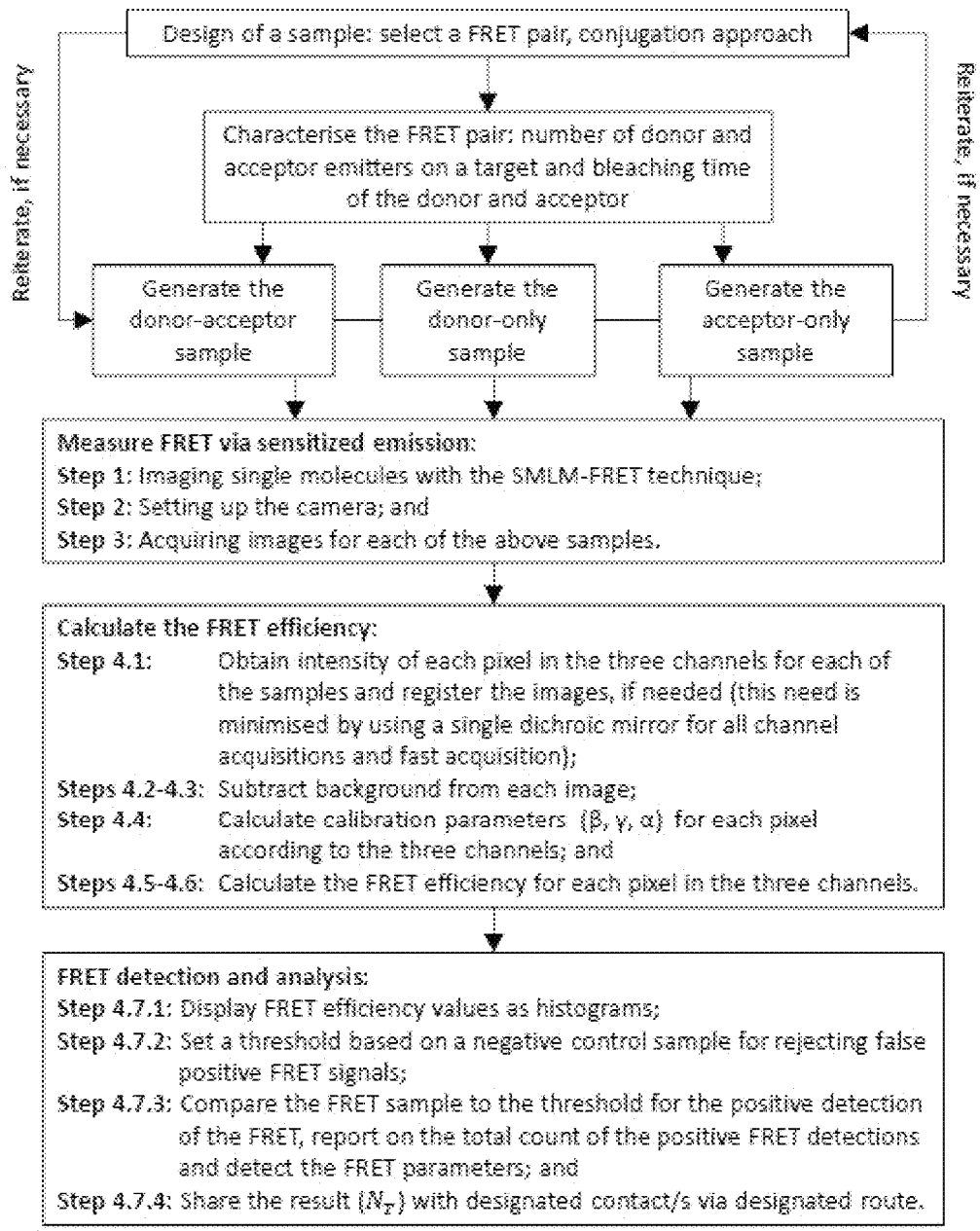
FIG. 13 schematically shows an algorithm for the FRET calculation used with the optical device of an aspect of the present invention operating in a sensitised emission mode.

Reference is now made to FIG. 12 showing a method according to an aspect of the present disclosure in a form of a scheme or algorithm. The scheme actually summarises the method of the invention combing the two applications (frustrated FRET and SMLM). The left branch in the scheme shows detection of low FRET signals in ensemble measurements, while the right branch shows the combination of both the frustrated FRET and SMLM in the same method.

In some embodiments, the optical device of the present disclosure is limited to use of the excitation filters and emission filter and is incorporated inside a microscope or constitutes a microscope. Such optical device of the present invention comprises:

A. An excitation module comprising:
  a) a first and second excitation source configured to emit a donor fluorophore excitation light (for example blue) and an acceptor fluorophore excitation light (for example red), respectively, for exciting said donor fluorophore and said acceptor fluorophore in the sample;
  b) a first excitation filter configured to convert said donor fluorophore excitation light into a donor fluorophore monochromatic excitation light beam, and transmit said donor fluorophore monochromatic excitation light beam to a beam combiner;
  c) a second excitation filter configured to convert said acceptor fluorophore excitation light into an acceptor fluorophore monochromatic excitation light beam; and transmitting said acceptor fluorophore monochromatic excitation light beam to a modulation unit;
  d) the modulation unit characterised in that it is designed to modulate excitation intensity of said acceptor fluorophore monochromatic excitation light beam by tuning excitation intensity of said acceptor fluorophore monochromatic excitation light beam from complete blocking to at least about 30% transmission, preferably at least about 50%, more preferably at least about 70%, such that said acceptor fluorophore becomes optically saturated to provide frustration (quenching) of said FRET process, and directing the modulated acceptor fluorophore monochromatic excitation light beam obtained to said beam combiner; and
  e) the beam combiner designed to combine said donor fluorophore monochromatic excitation light beam and said modulated acceptor fluorophore monochromatic excitation light beam into a single dichromatic excitation light beam;

B. A sample holder designed to hold a microscope slide or a coverslip, or another compatible holder designed to carry said sample, to which said dichromatic excitation light beam is directed; and C. An acquisition module comprising:
  a) an emission filter configured to transmit a narrow-wavelength beam of said donor fluorophore emission or donor and acceptor emission in a sequence;
  b) a detector configured to measure intensity of the fluorescence emission of said donor fluorophore and transfer the obtained fluorescence emission intensity data to a computing unit; and
  c) the computing unit characterised in that:
    said computing unit is designed to be synchronised with said detector and with said modulation unit, to analyse the fluorescent emission intensity data transferred from said detector, to control said modulation unit by providing a feedback to said modulation unit for further modulating excitation intensity of the acceptor fluorophore monochromatic excitation light beam (which results in modulating excitation intensity of the acceptor fluorophore itself) and thus, modulating fluorescence emission intensity of said donor fluorophore in a predetermined frequency domain, thereby resulting in reversible saturation of said acceptor fluorophore and consequently, frustration of the FRET process, to analyse microscope raw data images obtained from single-molecule localisation, to integrating said fluorescence emission intensity data and said microscope raw data and to provide information on the molecular interactions and on the nanometre proximity of single molecules in a readable format; and
    said computing unit comprising:
    (1) a fast data logger;
    (2) a first algorithm characterised in that it is designed to acquire and measure the frustrated FRET efficiency between the donor and acceptor fluorophores in the sample, adapted for a lock-in detection and suitable for resolving weak and rare molecular interactions between the donor and acceptor in the sample and transmitting data on said molecular interactions to the third algorithm;
    (3) a fast Fourier transform (FFT) algorithm for either a whole time-trajectory or part of it, said FFT algorithm is characterised in that it is designed to resolve molecular interactions between said donor fluorophore and said acceptor fluorophore in the sample, and to output information on said molecular interactions in a readable format;
(4) a second algorithm for analysing said microscopic raw data images obtained from single-molecule localisation, said second algorithm is characterised in that it is designed to localise the donor fluorophore in the sample and to transmit data on the localisation of said donor fluorophore molecules in said sample to a third algorithm; and
(5) the third algorithm designed to receive and integrate the analytical data produced by, and received from the first algorithm, the FFT algorithm and the second algorithm, and to output information on the molecular interaction and on nanometre proximity of the single donor and acceptor fluorophore molecules, in a readable format.

The optical device of the present invention may further incorporate additional components or functionalities of a microscope. The optical device of an aspect of the present invention having microscope functionalities, comprising:

A. An excitation module comprising:
  a) a first and second excitation source configured to emit a donor fluorophore excitation light (for example blue) and an acceptor fluorophore excitation light (for example red), respectively, for exciting said donor fluorophore and said acceptor fluorophore in the sample;
  b) a first excitation filter configured to convert said donor fluorophore excitation light into a donor fluorophore monochromatic excitation light beam, and transmit said donor fluorophore monochromatic excitation light beam to a beam combiner;
  c) a second excitation filter configured to convert said acceptor fluorophore excitation light into an acceptor fluorophore monochromatic excitation light beam; and transmitting said acceptor fluorophore monochromatic excitation light beam to a modulation unit;
  d) the modulation unit characterised in that it is designed to modulate excitation intensity of said acceptor fluorophore monochromatic excitation light beam by tuning excitation intensity of said acceptor fluorophore monochromatic excitation light beam from complete blocking to at least about 30% transmission, preferably at least about 50%, more preferably at least about 70%, such that said acceptor fluorophore becomes optically saturated to provide frustration (quenching) of said FRET process, and directing the modulated acceptor fluorophore monochromatic excitation light beam obtained to said beam combiner;
  e) the beam combiner designed to combine said donor fluorophore monochromatic excitation light beam and said modulated acceptor fluorophore monochromatic excitation light beam into a single dichromatic excitation light beam; and
  f) a filter cube comprising a two-channel dichroic mirror, an excitation filter, and at least one emission filter having two transmission windows, and configured to receive the single dichromatic excitation light beam, to transfer it to a sample holder for excitation of the sample, to filter out the emitted light from the sample and to transfer it to an acquisition module;

B. A sample holder designed to hold a microscope slide, a coverslip, or another compatible holder designed to carry said sample, to which said dichromatic excitation light beam is directed filtered from the filter cube said sample chamber is optionally equipped with an objective configured to gather the fluorescence emission light from the sample to produce a fluorescence image, and optionally focus the excitation light beam on the sample; and C. An acquisition module comprising:
  a) an emission filter configured to transmit a narrow-wavelength beam of the donor fluorophore emission or donor and acceptor emission in a sequence;
  b) a detector configured to measure intensity of the fluorescence emission of said donor fluorophore and transfer the obtained fluorescence emission intensity data to a computing unit, said detector is optionally equipped with a magnification eyepiece (ocular) for viewing, imaging, focusing and increasing the overall magnification of a fluorescent image; and
  c) the computing unit characterised in that:
    said computing unit is designed to be synchronised with said detector and with said modulation unit, to analyse the fluorescent emission intensity data transferred from said detector, to control said modulation unit by providing a feedback to said modulation unit for further modulating excitation intensity of the acceptor fluorophore monochromatic excitation light beam (which results in modulating excitation intensity of the acceptor fluorophore itself) and thus, modulating fluorescence emission intensity of said donor fluorophore in a predetermined frequency domain, thereby resulting in reversible saturation of said acceptor fluorophore and consequently, frustration of the FRET process, to analyse microscope raw data images obtained from single-molecule localisation, to integrating said fluorescence emission intensity data and said microscope raw data and to provide information on the molecular interactions and on the nanometre proximity of single molecules in a readable format; and
    said computing unit comprising:
    (1) a fast data logger;
    (2) a first algorithm characterised in that it is designed to acquire and measure the frustrated FRET efficiency between the donor and acceptor fluorophores in the sample, adapted for a lock-in detection and suitable for resolving weak and rare molecular interactions between the donor and acceptor in the sample and transmitting data on said molecular interactions to the third algorithm;
    (3) a fast Fourier transform (FFT) algorithm for either a whole time-trajectory or part of it, said FFT algorithm is characterised in that it is designed to resolve molecular interactions between said donor fluorophore and said acceptor fluorophore in the sample, and to output information on said molecular interactions in a readable format;
    (4) a second algorithm for analysing said microscopic raw data images obtained from single-molecule localisation, said second algorithm is characterised in that it is designed to localise the donor fluorophore in the sample and to transmit data on the localisation of said donor fluorophore molecules in said sample to a third algorithm; and
    (5) the third algorithm designed to receive and integrate the analytical data produced by, and received from the first algorithm, the FFT algorithm and the second algorithm, and to output information on the molecular interaction and on nanometre proximity of the single donor and acceptor fluorophore molecules, in a readable format.

The acquisition module of the optical device of the above embodiment may further comprise a pair of two-channel dichroic mirrors capable of transmitting the emitted dichromatic light beam from the filter cube to the emission filter.

In some embodiments, the beam combiner and modulation unit may further comprise additional excitation filters, if either the first excitation source or the second excitation source, or both, have a wide-spectrum excitation. In a specific embodiment, the sample chamber or holder further comprises an objective configured to directly gather emission light from the sample being observed and to focus the emission light rays to produce a real image for observation by a user. The objective used in the present invention can be a single lens or mirror, or combinations of several optical elements. The numerical aperture for the lenses used in the present objective can range from 0.10 to 1.49, corresponding to focal lengths of about 40 mm to 2 mm, respectively. The magnification achieved with this objective can range from ×4 to ×100. The objective can be further equipped with a magnification eyepiece ranging from ×2 to ×20 to increase the overall magnification of the fluorescent image.

In a further embodiment, the filter cube in the present configuration, comprises a two-channel dichroic mirror matching the donor and acceptor excitation and emission wavelength (reflecting two excitations and transmitting two emissions), an excitation filter and emission filter having two transmission windows. In another embodiment, the emission filter is a rotating filter designed to transmit either donor emission or acceptor emission. In some embodiments, the emission filter is a diffraction grating. In yet further embodiment, the emission filter is a dichroic mirror. It may further comprise dichroic mirrors or polarisation filters for allowing anisotropy measurements.

As mentioned above, the detector can be an electron-multiplying charge-coupled device (EMCCD) imager, a charge-coupled device (CCD) imager, scientific complementary metal-oxide-semiconductor (sCMOS) imager or CMOS imager of a mobile phone camera, optionally with a focusing apparatus and a computer link. In the present configuration, the detector (19) can be optionally equipped with a magnification eyepiece (ocular) ranging from ×2 to ×20 to assist in focusing and increase the overall magnification of the fluorescent image.

In some embodiments, the communication link from the computing unit may directly control excitations of the donor and acceptor from their corresponding excitation sources. In yet further particular embodiment, the detector and computing unit are components of a mobile phone or any personal gadget having the similar functionalities and computing power as a smartphone. The processing unit may transmit the results of the measurements to an external memory, which can be a mobile device (such as a smartphone), desktop computer, server, remote storage, internet storage, or diagnostics cloud.

In one particular embodiment, the optical device of the present invention is a fluorometer. In another particular embodiment, the optical device of the present invention is a combined fluorometer and fluorescence microscope.

Using the optical device of the present embodiment, which applies the single interaction localisation microscopy (SILM), allows to identify numerous molecules that constitute single FRET pairs and to localise them in densely labelled cells. An example of such FRET pair is the donor-acceptor pair consisting of Alexa Fluor® 555 as a donor fluorophore on a primary antibody and Alexa Fluor® 647 as an acceptor fluorophore on a secondary antibody. An upper limit in this case to the energy transfer efficiency E between the donor and acceptor undergoing the FRET process is as low as 1-3% with a resolution of about 0.01%. Intramolecular donor-acceptor distances of 4-8 nm were measured with the resolution down to approximately 4-5 Å and will be demonstrated in the Examples section below. Thus, the present invention provides for the first time a super-resolved optical image of a cell in a single molecule detail and with distance measurements that continuously span from Angstroms to Microns. The present invention also provides optimisation steps to improve the detection efficiency of the method of the invention, which will be described next. These optimisation steps include the optimisation of fluorophores for the process of the frustrated FRET, the optical configuration of the system, the modulation frequency and the decoding algorithm.

In yet further aspect, the present disclosure provides a method for increasing the resolution of a microscope capable of single-molecule localisation and imaging single molecular interactions by detecting single inter- or intramolecular interactions between a first molecular target labelled with a donor fluorophore and a second molecular target labelled with an acceptor fluorophore capable of forming the FRET interactions with said donor fluorophore, or measuring the nanometre proximity between said first and second molecular targets, in a sample, said method being carried out by placing said sample on a microscope slide in a sample holder of said microscope with which the optical device of the invention is combined, and comprising the steps of:

(i) illuminating said sample with a dichromatic excitation light beam having two wavelengths corresponding to the excitation wavelength of said donor fluorophore and to the excitation wavelength of said acceptor fluorophore;

(ii) imaging said sample with said microscope to thereby generate, using a super-resolution microscopy technique, microscope raw data, and transferring said microscope raw data to said computing unit of said optical device;

(iii) analysing said microscope raw data for localisation of molecules of said first molecular target labelled with said donor fluorophore;

(iv) measuring the fluorescence emission intensity of said localised donor fluorophore molecules during said FRET, transferring the measured fluorescence emission intensity data to the computing unit, and optionally displaying said fluorescence emission intensity data or single molecule localisation data in a readable format;

(v) modulating the excitation intensity of said acceptor fluorophore in a predetermined frequency domain and intensity range, considering the predetermined saturation curve of said acceptor fluorophore and the bleaching time of the donor and acceptor fluorophores, based on the analysed fluorescence emission intensity data, for reversible acceptor fluorophore saturation that leads to said FRET frustration;

(vi) measuring said FRET frustration by modulating the excitation intensity of said acceptor fluorophore thereby modulating said donor fluorophore emission;

(vii) lock-in detection of said frustrated FRET for said donor fluorophore labelling said first molecular target, for distinguishing between donor fluorophore molecules labelling said first molecular target and free donor fluorophore molecules in said sample, and (viii) interpreting the distance between said first molecular target labelled with said donor fluorophore and said second molecular target labelled with said acceptor fluorophore according to a model of number and positioning of said donor fluorophore and said acceptor fluorophore, thereby detecting single inter- or intramolecular interactions between said first molecular target and said second molecular target, and outputting information on the nanometre proximity between said first and second molecular targets in a readable format;

wherein said donor fluorophore is either:

a photoactivatable fluorophore capable of switching from a non-emissive to an emissive state upon excitation with the third excitation source at an activating wavelength and then emitting fluorescence upon excitation at an excitation wavelength in a defined region of space at a given interval of time, or a photoswitchable fluorophore capable of switching from one emissive state to another emissive state upon excitation with the third excitation source at an activating wavelength.

In a particular embodiment, the super-resolution microscopy technique used in the present invention is either photoactivated localisation microscopy (PALM) or direct stochastic optical reconstruction microscopy (dSTORM). However, the present invention is not limited to these techniques, but may use other super-resolution techniques, such as point accumulation for imaging in nanoscale topography (PAINT), binding activated localisation microscopy (BALM), reversible saturable optical fluorescence transitions (RESOLFT), spectral precision distance microscopy (SPDM), or super-resolution optical fluctuation imaging (SOFI).

In certain embodiments, the lock-in detection comprises the steps of:

(A) performing a windowed Fourier transform (FFT) on fluorescence emission of said donor fluorophore over time for either the whole-time trajectory of said donor fluorophore emission or a part of it, to obtain the FFT spectrum;

(B) detecting the spectral peak of said FFT spectrum at a modulation frequency of said acceptor fluorophore; and (C) calculating the Figure of Merit (FOM) of individual donor molecules within said sample by optional removal of a non-modulated part of said FFT spectrum, followed by comparison of said spectral peak to its median value, wherein said non-modulated part of said FFT spectrum corresponds to a DC signal resulting from a non-specific background or from fluorescence emission of free donor fluorophore molecules.

The FOM in the above lock-in detection is essentially used for the detection of the FRET interactions (rejection of the false detections) as follows:

(i) setting a threshold value for said FOM based on a negative control sample for rejecting false positive FRET signals; and (ii) comparing said FOM of individual donor molecules within said sample to said threshold value for detection of said FRET;

wherein said negative control sample comprises either only said donor fluorophore, or a mixture of said donor fluorophore on said target molecule and said acceptor fluorophore on a second target molecule that is incapable of forming molecular interaction with said target molecule, and thus does not demonstrate FRET with said donor fluorophore.

In some embodiments, the first molecular target and the second molecular target are fragments of the same molecule, thereby undergoing the intramolecular interactions. In other embodiments, the first molecular target and the second molecular target are different molecules, thereby undergoing the intermolecular interactions. In a specific embodiment, the first and second molecular targets each independently is an antigen, antibody, antibody fragment, enzyme, substrate or inhibitor, receptor, protein or organic molecule, lectin, sugar, DNA, RNA, or aptamer.

In a specific embodiment, the donor fluorophore or said acceptor fluorophore is a fluorescent protein, a synthetic dye, or a quantum dot. In some embodiments, the acceptor fluorophore is a fluorescence quencher. In certain embodiments, the donor fluorophore is a photoluminescent emitter.

Thus, in order to avoid the aforementioned problems of the donor bleed-through and acceptor direct excitation, the FRET is measured in the present invention by observing the intensity of the donor in the frustrated FRET mode rather than the intensity of the acceptor. Observation of both the acceptor emission and the donor emission may contribute to the detection but is not required. The method of the present aspect is essentially based on modulation of the donor emission via modulation of the acceptor availability for the FRET process. Excitation of the acceptor consequently introduces frustration to the FRET, since the FRET can only occur as long as the acceptor is in the ground state and is available to receive energy. When the acceptor is excited, it is no longer available for energy transfer, which manifests in increased emission intensity of the donor.

Applications of the optical devices and methods of the present invention, based on sensitive detection of very low FRET signals, are many and include, but not limited to, finding biomarker interactions, including weak or sporadic molecular interactions in cells and in tissues. Such interactions may report on the activity of cells, for example, via the report on enzyme-substrate interactions or the assembly of dimers or multi-molecular complexes of proteins or nucleic acids, the assembly of virus particles inside cells, the specific binding of antibodies to their target, the pathways of labelled drugs in the cell and more. Importantly, aberrant protein interactions may be involved in malignancies, and thus the optical devices and methods of the present invention can serve as a diagnostic tool for such malignancies. In a particular embodiment, the molecular targets used in the present invention are hybridisation, hydrolysis or similar (e.g. Scorpion® or Molecular Beacon) probes that are suitable for binding closely to a common target DNA or RNA template, thereby facilitating the process of the FRET between them and detecting the target.

(Scorpion®: www dot premierbiosoft dot com forward slash tech underscore notes forward slash Scorpion dot html)

(Molecular Beacon: www dot premierbiosoft dot com forward slash tech underscore notes forward slash molecular underscore beacons dot html)

The sample required for measurements with the optical devices and methods of the present invention is very small (as small as a single cell) and the detection can be performed either via a non-imaging system (for example, a miniature dedicated system, a flow cytometer, or a plate reader), or a microscope.

To sum-up, there are two major modes of operation of the optical devices of some aspects of the present disclosure:

1) Sensitised Emission

In this mode, the first and second excitation sources and are alternated. At the same time, the emission filter is rotated to capture either the donor or acceptor emission. In this mode, the optical device generates three images which are typically used:

F—the donor excitation/acceptor emission (F),

D—the donor excitation/donor emission (DD) for determining the scalar factor $\beta$, and A—the acceptor excitation/acceptor emission (AA) for determining the scalar factor $\delta$.

2) Frustrated FRET

In this mode, the donor excitation source operates continuously (or in every frame), while the acceptor excitation source is modulated. Only the donor emission is detected for further processing by the computing unit. In order to do this, the donor emission is isolated with the emission filter as described above. In this mode, the optical device of the invention generates a movie of typically hundreds or thousands of frames. An algorithm for the calculation of the frustrated FRET used with the optical device of the present disclosure is shown in FIG. 12 and discussed above.

Although these two modes can be operated independently or in tandem using the optical device of the present invention, the device will primarily use the FRET mode to detect inter or intra-molecular FRET process between donor- and acceptor-labelled molecules. This approach allows for highly sensitive measurements of FRET pairs in densely labelled samples, being either in vivo (i.e. in cells), or in vitro. In-vitro measurements of prime interest include sensitive measurements for pathogen detection using either labelled DNA probes, antibodies or antibody fragments. The method is especially valuable when most of the donor and acceptor molecules are free (i.e. they do not constitute FRET pairs), therefore giving rise to a large background in typical FRET measurements (such as sensitised emission) due to the problems of 'direct-excitation' and 'bleed-through'.

The FRET information is given for each FRET pair and is interpreted to report on the distance between them with very high spatial resolution (down to sub-nanometres). The outcome data is presented and shared either in a detailed fashion (e.g. histograms) or as binary (e.g. the particular pathogen is detected or not).

Regarding the sensitised emission mode, this mode is an assisting mode, which is also supported by the device of the present invention, since the device is capable of detecting and comparing both the donor and acceptor emissions. In comparison to the frustrated FRET mode, the sensitised emission can be taken relatively quickly (requiring essentially three frames) with minimal exposure of the sample to excitation light, particularly avoiding the repeated fluorophore excitations and acceptor saturation of the frustrated FRET mode. Still, it requires relatively high number of FRET pairs relative to a low number of free donor and acceptor fluorophores (i.e. low background). It also typically averages the FRET results across multiple FRET pairs. Therefore, the sensitised emission mode is employed before employing the frustrated FRET in the following exemplary cases:

1) Calibration or calibration verification of the device. Measurements of donor emission, acceptor emission and FRET via sensitised emission serve for calibration of the device or a simple check of its calibration. Such calibration or verification requires dedicated test samples with high concentration of the FRET pairs (donor and acceptor fluorophores typically conjugated test molecules that may be different than the analytes of interest). These measurements may occur sporadically (e.g. before or after assembly or shipment of the device), and may occur much before the device is operated in the frustrated FRET mode.
2) Preliminary measurement before employing the frustrated FRET mode. Such measurement is useful for a quick and crude evaluation of the sample. The minimal sample exposure (and hence its possible photobleaching) during this measurement then allows for a more detailed and sensitive detection with the frustrated FRET mode. Moreover, the results of the sensitised emission measurement may be used to optimise the frustrated FRET process measurement (e.g. its duration, modulation frequency and/or spectral detection range).

Thus, the present inventors developed a method to image and measure single intermolecular (protein-protein) interactions in cells. This method, that the inventors named 'single interaction localisation microscopy' (SILM), is a FRET-SMLM combined technique. In order to overcome the FRET problems of acceptor direct-excitation and donor bleed-through, the process of the FRET was measured by observing intensity of the donor emission.

The donor emission was further modulated by reversible acceptor saturation that led to FRET frustration. The lock-in detection of this modulation made it possible to detect smFRET and localise the measured molecules in densely labelled cells.

So far, most of the smFRET measurements have been performed on macromolecules outside of cells. These measurements required high energy transfer efficiencies (>0.4), and very low density of labelled molecules (<30 molecules in 30 $\mu m^2$). In fact, the method of the present invention allows to work with ensemble FRET averages as low as of 1-3% against high background of free molecules, due to combination with lock-in detection proposed in the present invention. Moreover, the combination of the FRET with dSTORM made it possible to work with a much higher density of donor molecules (about 100,000 molecules per 1,600 $\mu m^2$, which is by a factor of five larger) than that was used in the previous smFRET studies described by Huppa et al in "*TCR-peptide-MHC interactions in situ show accelerated kinetics and increased affinity*", Nature 463 (7283), 963-7 (2010).

Figure 14:
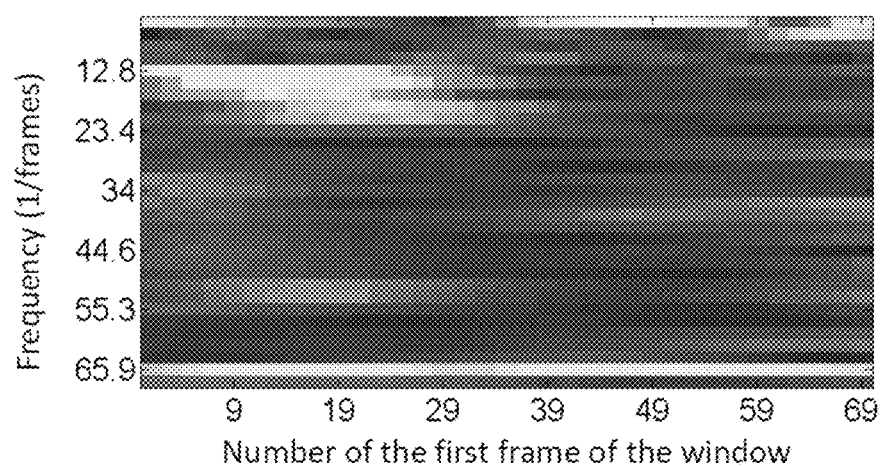
FIG. 14 shows a spectrogram that was built in MATLAB® for the windowed Fourier transform of a single molecular trajectory.

Reference is now made to FIG. 14 showing a spectrogram built in MATLAB® for the windowed Fourier transform of a single molecular trajectory. Time segments from 8 frames to 208 frames with jumps of 8 frames (i.e. segments with number of frames of 8, 16, 24, etc.) were used in the analysis. The FOM for each time segment was then calculated. For each detected molecule, the highest FOM was chosen to be the FOM of the detected molecule.

Figure 15:
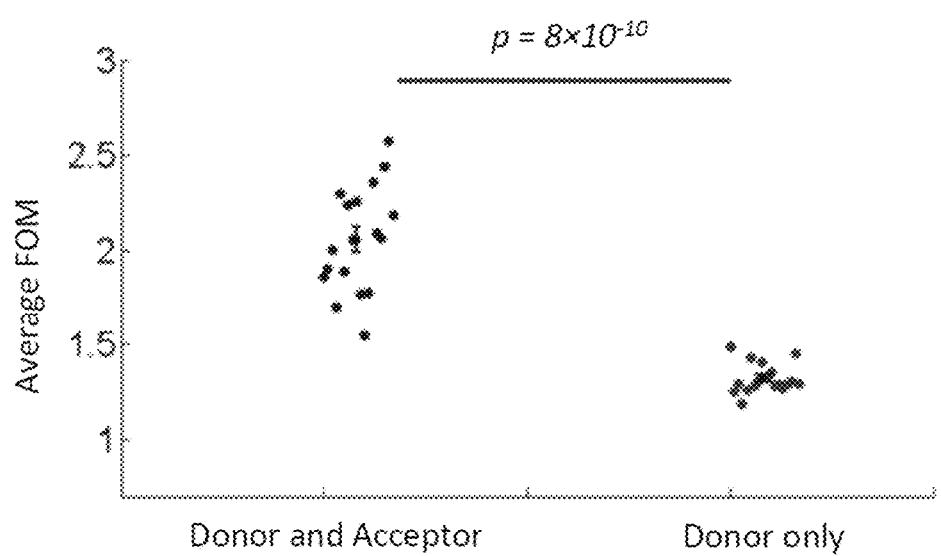
FIG. 15 shows the comparative average FOM against all trajectories that were longer than a minimal length for the 'donor-acceptor' sample versus the 'donor-only' sample. Each dot marks the average FOM of all the molecules in a single cell. The average FOM is 2.05±0.06 for the donor-acceptor sample and 1.32±0.02 for the 'donor-only' sample. The p-value of the populations is $8\times10^{-10}$. The error bars show the SEM (standard error of the mean).

Reference is further made to FIG. 15 showing the comparative average FOM against all trajectories that were longer than a minimal length for the 'donor-acceptor' sample versus the 'donor-only' sample Importantly, when the average FOM of the 'donor-only' sample and the 'donor-acceptor' sample was examined, it was found that there was a significant difference between the populations even when considered the short trajectories of eight frames. The ratio between the percentage of detections of the emitter molecules that were part of the FRET pair in the 'donor-only' sample and the 'donor-acceptor' sample provided the false positive ratio as a function of the threshold FOM value. Applying a thresholding FOM of 4.5 for a representative cell, 47 molecules which were part of a FRET pair were identified in the cell with both donor and acceptor (with 10% false positive). In a representative 'donor-only' cell, only two molecules were identified.

The median was an estimation for the contribution of the background. The calculation of the FOM was done by dividing the absolute value of the Fourier transform of the modulation frequency by the median of the absolute value. The same process was also done with windowed Fourier transform on different parts of the time trajectory. Calculation of the FOM with the Fourier transform yielded a value of 9.3. See further results on the FOM in FRET and control experiments in the examples below.

The imaging sequence in this experiment was as follows. The first (donor) excitation source was operating continuously while the second (acceptor) excitation source was turned on and off in a predetermined frequency. Since the on-time of a fluorophore until it photobleaches ranges between milliseconds to seconds, we modulated the excitation of the acceptor as fast as possible. As a result, this frequency was actually set by the Nyquist frequency, which is half of the frame rate of the EMCCD camera that we used (130 fps). Every donor molecule that was a part of the FRET pair and was 'on' long enough had a distinct frequency component at the frequency of modulation. As seen in FIG. 9C, this component showed as a high peak at the Nyquist frequency on the power spectrum, when compared to the median of the power of all the other frequencies. Such identification of the emission modulation at the modulation frequency of the excitation source is known as "lock-in detection". This method can detect a faint signal with a known frequency in an overwhelmingly noisy environment.

Thus, the present technique provides a system and corresponding method enabling detection of one or more single FRET event in a sample. The present technique enables simple detection of molecular structures, e.g. DNA sequence using proper selection of molecular probes associated with selected fluorophore mounted on the probes.

Furthermore, the present disclosure relates to a new device and method employed by the device to image and measure single intermolecular (protein-protein) interactions in cells. The method is the combination of the FRET and the SMLM technique. In order to overcome the FRET problems of acceptor direct-excitation and donor bleed-through, the FRET was measured by detecting intensity of the donor emission. This emission was modulated by reversible acceptor saturation that led to the FRET frustration. The lock-in detection of this modulation allows to detect smFRET occurring between individual FRET pairs, and to localise them in densely labelled cells.

So far, most smFRET measurements have been conducted on macromolecules outside of cells and required a very low density of labelled molecules (about 0.1-0.2 spots/$\mu m^2$). Various methods have been introduced to resolve bimolecular interactions in the cells. For instance, the fluorescence enhancement of diffusing fluorophores upon binding to different macromolecular entities in the cell has been used for SMLM. However, all these attempts do not provide distance measurements.

The ensemble FRET measurement via sensitised emission, yielded an average energy transfer efficiency E=0.226±0.040. The device of the present invention measured the single-molecule E to be on average 0.260±0.018, thus recovering the ensemble E measurements, as expected from unbiased single molecule measurements.

To determine the accuracy of the SILM in measuring the donor-acceptor distances, two models of fluorophore configurations on the labelled antibodies were used with a boot-strapping approach to simulate multiple cases of realisations and showed that these two models can serve as confidence limits to intermolecular distance, $r_{DA}^{min}$, determined by the SILM method of the present invention. The error, combined with errors related to the orientation of the fluorophores, totaled in a range of −4 to +5.6 Å. A more deterministic approach for labelling (e.g. using specific amino-acids such as cysteines) and low enough anisotropy (<0.05) may further reduce this error to ≤±3 Å.

To sum-up, the optical device and the methods of the present disclosure have made it possible for the first time to detect single interactions between primary and secondary antibodies in densely labelled cells and to further determine the intramolecular distance between the donor- and the acceptor-labelled antibodies with the Angstrom resolution. Thus, for the first time, a super-resolved optical image of a cell in single molecule detail and with distance measurements that continuously span Angstroms to microns was provided. The present application has a strong proof of concept approach supported by Examples and is based on a fairly simple but ubiquitous case of protein-protein interactions between a primary and a secondary antibody. However, the device of the present invention and the methods employing thereof are not limited to these examples.

Another aspect of the present disclosure is the ability to use smartphone technologies, such as the CMOS camera chip, within the device of the invention for acquisition of the single molecule images and analysis of the inter-molecular interaction. This concept is revolutionary in all aspects as it allows significant miniaturisation and simplification of the devices and methods for point-of-care diagnostics, not mentioning the availability of further immediate technological advancements in this field.

While certain features of the present application have been illustrated and described herein, many modifications, substitutions, changes, and equivalents will be apparent to those of ordinary skill in the art. It is, therefore, to be understood that the appended claims are intended to cover all such modifications and changes as fall within the true spirit of the present application.

The invention claimed is:
1. A system for monitoring a sample, comprising:
a light unit configured for illuminating the sample in at least a first, donor fluorophore excitation wavelength range and a second, acceptor fluorophore excitation wavelength range;
a collection unit configured for collecting a light emitted from the sample in at least a third wavelength range and directing said emitted light towards at least one detector;
an activation unit configured for providing activation signal to selectively activate at least a portion of donor fluorescent substance in the sample, said activation signal is at least one of: (i) controllable illumination of selected temporal activation illumination intensity profile, or (ii) controllable releasing of chemical reactant into said sample; and
a processing circuitry configured for operating the light unit to determine a selected temporal illumination profile of said at least first and second wavelength ranges and for operating the activation unit for controllable activation, wherein said third wavelength range comprises wavelength associated with donor fluorescence emission;
said at least one detector is configured for detecting light of said third wavelength range, collected by said collection unit and generating at least one stream of data pieces indicative of intensity pattern of collected light at a selected sampling rate,
wherein said temporal illumination profile is selected to result in alternating saturation of acceptor fluorophores in the sample causing a variation of emission of said donor fluorescence emission over time, said temporal illumination profile comprises (i) a continuous illumination of the first wavelength range, or a lower modulation frequency and temporally overlapping with respect to modulation frequency of the second wavelength range and (ii) a selected temporal intensity modulation of said second wavelength range of a selected modulation pattern, wherein the processing circuitry is configured for receiving and processing said at least one stream of data pieces associated with intensity of collected light to identify modulated intensity profile of said collected light within one or more time windows to provide output data thereof, and wherein said one or more time windows is associated with a selected duration following provision of activation signal for activation of fluorophores in the sample.

2. The system of claim 1, wherein the light unit comprises at least a donor illumination light source for providing the donor fluorophore excitation light wavelength range and an acceptor illumination light source for providing the acceptor fluorophore excitation light wavelength range.

3. The system of claim 1, wherein the activation unit comprises an activation light source configured to provide illumination with a fourth, activating illumination wavelength range.

4. The system of claim 3, wherein said temporal activation illumination of the fourth wavelength range comprising at least one of: a pulse temporal pattern and continuous illumination pattern.

5. The system of claim 1, wherein said activation unit is configured for releasing chemical reactant into said sample or for providing illumination at amount or intensity sufficient for activating up to 10 fluorophores within a region of diffraction limited spot in the sample for a given activation signal, the diffraction limited spot is determined by optical elements used of the collection unit.

6. The system of claim 1, wherein the light unit comprises an optical arrangement adapted for directing said at least first and second wavelength ranges towards a common selected region of the sample.

7. The system of claim 1,
wherein said at least one detector is one of: (1) a detector that comprises a pixel array positioned at an image plane with respect to at least a region of the sample; or (2) a single pixel detector.

8. The system of claim 7,
wherein the processing circuitry is configured to select said one or more time windows by identifying time variation of intensity profile in said at least one stream of data pieces associated with intensity of collected light.

9. The system of claim 8, wherein the processing circuitry is configured to determine FRET interaction distances in said identified modulated intensity profile utilizing level of modulation of the collected light.

10. The system of claim 8, wherein the processing circuitry is configured to determine temporal frequency components of said at least one stream of data pieces in said one or more time windows.

11. A method for monitoring a sample, comprising:
providing activation signal to the sample for activating a selected amount of fluorophores in the sample, said activation signal is at least one of: (i) controllable illumination of selected temporal activation illumination intensity profile, or (ii) controllable releasing of chemical reactant into said sample;
illuminating at least a region of the sample with a temporal illumination profile of a first, donor fluorophore excitation, illumination wavelength range and a temporally modulated second, acceptor fluorophore excitation wavelength range, wherein said temporal illumination profile is selected to result in alternating saturation of acceptor fluorophores in the sample causing a variation of emission of donor fluorescence emission over time, said temporal illumination profile comprises (i) a continuous illumination of the first wavelength range, or a lower modulation frequency and temporally overlapping with respect to modulation frequency of the second wavelength range and (ii) a selected temporal intensity modulation of said second wavelength range of a selected modulation pattern;
collecting and detecting from the region of the sample light of a third wavelength range to provide data pieces associated with intensity profile of emission from said region of the sample, wherein said third wavelength range comprises wavelength associated with said donor fluorescence emission;
processing said data pieces associated with intensity of collected light to identify modulated intensity profile of said collected light within one or more time windows to provide output data thereof, and
wherein said one or more time windows are associated with a duration following providing said activation signal to the sample.

12. A control unit connectable to illumination unit, activation unit and a detector unit and comprising:
at least one processing circuitry comprising
operation module configured for operating the illumination unit for
illuminating at least a region of the sample with a temporal illumination profile of (i) a first, donor fluorophore excitation illumination wavelength range and (ii) a temporally modulated second, acceptor fluorophore excitation wavelength range, wherein said temporal illumination profile is selected to result in alternating saturation of acceptor fluorophores in the sample causing a variation of said donor fluorescence emission over time, and
operating the activation unit for providing one or more activation signals for activating selected portion of fluorophores in said sample, said one or more activation signals is at least one of: (i) controllable illumination of selected temporal activation illumination intensity profile, or (ii) controllable releasing of chemical reactant into said sample;
detection module configured for operating the detector unit for collecting light of a third wavelength range and generating data pieces associated with intensity profile of the collected light, wherein said third wavelength range comprises wavelength associated with donor fluorescence emission;
a processing module configured for receiving and processing said image data pieces for identifying modulated intensity profile of said collected light within one or more time windows, and generating output data indicative of said modulated intensity profile,
wherein said one or more time windows are associated with a duration following providing said one or more activation signals to the sample.

13. A system for monitoring a sample, comprising:
a light unit configured for illuminating the sample in at least a first donor fluorophore excitation wavelength range and a second, acceptor fluorophore excitation wavelength range;
a collection unit configured for collecting a light emitted from the sample in at least a third wavelength range and directing said emitted light towards at least one detector;

an activation unit configured for providing activation signal to selectively activate at least a portion of donor fluorescent substance in the sample, said activation signal is at least one of: (i) controllable illumination of selected temporal activation illumination intensity profile or (ii) controllable releasing of chemical reactant into said sample; and a processing circuitry configured for operating the light unit to determine a selected temporal illumination profile of said at least first and second wavelength ranges and for operating the activation unit for controllable activation, wherein said third wavelength range comprises wavelength associated with donor fluorescence emission;

said at least one detector is configured for detecting light of said third wavelength range, collected by said collection unit and generate at least one stream of data pieces indicative of intensity pattern of collected light at a selected sampling rate;

wherein said temporal illumination profile is selected to result in alternating saturation of acceptor fluorophores in the sample causing a variation of said donor fluorescence emission over time, said illumination profile comprises (i) a continuous illumination of the first wavelength range, or a lower modulation frequency and temporally overlapping with respect to modulation frequency of the second wavelength range and (ii) a selected temporal intensity modulation of said second wavelength range of a selected modulation pattern;

wherein the processing circuitry is configured for receiving and processing said at least one stream of data pieces associated with intensity of collected light to identify modulated intensity profile of said collected light within one or more time windows to provide output data thereof;

wherein said one or more time windows are associated with a duration following providing said activation signal to the sample; and wherein the processing circuitry is configured to select said one or more time windows by identifying time variation of intensity profile in said at least one stream of data pieces associated with intensity of collected light.

* * * * *